US010935953B2

(12) United States Patent
Koga

(10) Patent No.: US 10,935,953 B2
(45) Date of Patent: Mar. 2, 2021

(54) NUMERICAL CONTROLLER

(71) Applicant: FANUC CORPORATION, Yamanashi (JP)

(72) Inventor: Daijirou Koga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 4 days.

(21) Appl. No.: 15/993,857

(22) Filed: May 31, 2018

(65) Prior Publication Data

US 2018/0373219 A1    Dec. 27, 2018

(30) Foreign Application Priority Data

Jun. 22, 2017    (JP) .............................. JP2017-122480

(51) Int. Cl.
*G05B 19/19*    (2006.01)

(52) U.S. Cl.
CPC .... *G05B 19/19* (2013.01); *G05B 2219/34015* (2013.01); *G05B 2219/34083* (2013.01)

(58) Field of Classification Search
CPC .......... G05B 19/19; G05B 2219/34015; G05B 2219/34083; G05B 19/418; G05B 19/41815; G05B 19/4103; G05B 2219/40287
See application file for complete search history.

(56) References Cited

U.S. PATENT DOCUMENTS

| 4,446,408 A | 5/1984 | Ebermann et al. |
| 8,024,068 B2 | 9/2011 | Gray |
| 2002/0049960 A1* | 4/2002 | Monz ................. G05B 19/4069 717/109 |
| 2007/0032905 A1* | 2/2007 | Nagatsuka ............ B25J 9/1682 700/245 |
| 2013/0166059 A1* | 6/2013 | Terada ................. G05B 19/182 700/189 |

FOREIGN PATENT DOCUMENTS

| CN | 1824471 | 8/2006 |
| CN | 102959483 | 3/2013 |
| CN | 103890670 | 6/2014 |
| CN | 104965483 | 10/2015 |
| JP | 6-71580 | 3/1994 |

(Continued)

OTHER PUBLICATIONS

Office Action dated Sep. 9, 2019 in Chinese Patent Application No. 201810638382.9.

(Continued)

*Primary Examiner* — James J Lee
*Assistant Examiner* — Shon G Foley
(74) *Attorney, Agent, or Firm* — Wenderoth, Lind & Ponack, L.L.P.

(57) ABSTRACT

To provide a numerical controller capable of performing synchronous control and superimposed control easily with respect to a machine having a complicated configuration. A numerical controller comprises: an elements relationship setting unit that sets a relationship between a first element and a second element; an elements relationship output calculation unit that calculates a relationship output from the relationship between the first element and the second element; and an elements relationship control unit that performs relationship control on the basis of the relationship output.

21 Claims, 64 Drawing Sheets

(56) References Cited

FOREIGN PATENT DOCUMENTS

| JP | 6-143089 | 5/1994 |
| JP | 2012-27607 | 2/2012 |
| JP | 2012-56023 | 3/2012 |
| WO | 2012/172594 | 12/2012 |
| WO | 2013/061445 | 5/2013 |
| WO | 2014/128916 | 8/2014 |
| WO | 2016-157395 | 10/2016 |

* cited by examiner

112: HOMOGENEOUS MATRIX $M_A$ REPRESENTING POSITION AND POSTURE OF CONNECTION POINT 120
113: HOMOGENEOUS MATRIX $M_B$ REPRESENTING POSITION AND POSTURE OF CONNECTION POINT 110

MACHINE CONFIGURATION ∠— 300

MACHINE ZERO POINT

MACHINE CONFIGURATION TREE

G54.0 COORDINATE SYSTEM $y_{MO}$  // SELECT FIRST COORDINATE SYSTEM
G43.0 CONTROL POINT $x_{NO}$  // SELECT FIRST CONTROL POINT
G99.0  // CONTROL START WITH RESPECT TO FIRST CONTROL POINT ON FIRST COORDINATE SYSTEM
G01 X_ Y_ Z_;  // IMPART FIRST COMMAND VALUE ON FIRST COORDINATE SYSTEM WITH RESPECT TO FIRST CONTROL POINT

FIG. 27A

G54.9 COORDINATE SYSTEM $y_{M1}$   // SELECT SECOND COORDINATE SYSTEM
G43.9 CONTROL POINT $x_N$   // SELECT SECOND CONTROL POINT
G99.9   // CONTROL START WITH RESPECT TO SECOND CONTROL POINT ON SECOND COORDINATE SYSTEM
G01 X_ Y_ Z_;   // IMPART SECOND COMMAND VALUE ON SECOND COORDINATE SYSTEM WITH RESPECT TO SECOND CONTROL POINT

FIG. 27B

G54.9 COORDINATE SYSTEM $y_{M1}$    // SELECT SECOND COORDINATE SYSTEM
G43.9 CONTROL POINT $x_N$    // SELECT SECOND CONTROL POINT
G99.6 [1, 0, 0, 0] [0, 1, 0, 0] [0, 0, -1, 0] [0, 0, 0, 1] // SET POSITION CONVERSION MATRIX $M_M$
G99.7 [1, 0, 0, 0] [0, 1, 0, 0] [0, 0, -1, 0] [0, 0, 0, 1] // SET POSTURE CONVERSION MATRIX $M_P$
G99.9    // CONTROL START WITH RESPECT TO SECOND CONTROL POINT ON SECOND COORDINATE SYSTEM
G01 X_ Y_ Z_;    // IMPART SECOND COMMAND VALUE ON SECOND COORDINATE SYSTEM WITH RESPECT TO SECOND CONTROL POINT

FIG. 27C

G54.9 COORDINATE SYSTEM $y_{M1}$  // SELECT SECOND COORDINATE SYSTEM
G43.9 CONTROL POINT $x_N$  // SELECT SECOND CONTROL POINT
G99.8 CONTROL POINT $z_L$ COORDINATE SYSTEM $y_{M2}$  // SET COMMAND ON FIRST COORDINATE SYSTEM $y_{M2}$ WITH RESPECT TO FIRST CONTROL POINT $z_L$ TO BE SECOND COMMAND VALUE
G99.9  // CONTROL START WITH RESPECT TO SECOND CONTROL POINT ON SECOND COORDINATE SYSTEM
// ←EVEN WHEN THERE IS NO COMMAND VALUE, FIRST COMMAND VALUE IS AUTOMATICALLY SET TO BE SECOND COMMAND VALUE

FIG. 27D

G54.9 COORDINATE SYSTEM $y_{M1}$
G43.9 COMMAND POINT $x_N$
G99.9

```
G54.9 COORDINATE SYSTEM  y_M1
G43.9 COMMAND POINT  x_N
G99.9
G01  X_Y_Z_;
```

G54.9 COORDINATE SYSTEM $y_M$
G43.9 COMMAND POINT $x_N$
G99.9
G99.6 [1, 0, 0, 0] [0, 1, 0, 0] [0, 0, -1, 0] [0, 0, 0, 1]
G99.7 [1, 0, 0, 0] [0, 1, 0, 0] [0, 0, -1, 0] [0, 0, 0, 1]
G99.8 COMMAND POINT $z_L$ COORDINATE SYSTEM $y_M$
G01 X_Y_Z_;

G54.9 COORDINATE SYSTEM $y_{M1}$
G43.9 COMMAND POINT $x_N$
G99.9
G99.6 [-1, 0, 0, 0] [0, -1, 0, 0] [0, 0, 1, 0] [0, 0, 0, 1]
G99.7 [-1, 0, 0, 0] [0, -1, 0, 0] [0, 0, 1, 0] [0, 0, 0, 1]
G99.8 COMMAND POINT $z_L$   COORDINATE SYSTEM $y_{M2}$
G01   X_Y_Z_;

```
if( COMMAND POINT yM <COORDINATE SYSTEM y1>.x > 100
&& COMMAND POINT yM <COORDINATE SYSTEM y1>.x < 200 ){
    COMMAND POINT xN <COORDINATE SYSTEM x1>.z = COMMAND POINT yM <COORDINATE SYSTEM y1>.x - 200;
}else if( COMMAND POINT yM <COORDINATE SYSTEM y1>.x >= 200 ){
    COMMAND POINT xN <COORDINATE SYSTEM x1>.z = 0;
}else {
    COMMAND POINT xN <COORDINATE SYSTEM x1>.z = -200;
}
```

FIG. 45

```
if( CONTROL POINT yM< COORDINATE SYSTEM y1>.x > 100
&& CONTROL POINT yM< COORDINATE SYSTEM y1>. x  < 200 ){
    CONTROL POINT xN< MACHINE COORDINATE SYSTEM >.  z = CONTROL POINT yM< COORDINATE SYSTEM y1>.x -  200;
}else if(CONTROL POINT yM< COORDINATE SYSTEM y1>. x  >= 200 ){
    CONTROL POINT xN< MACHINE COORDINATE SYSTEM >.z = 0;
}
```

```
if( CONTROL POINT B<COORDINATE SYSTEM A>.x > -5
&& CONTROL POINT B<COORDINATE SYSTEM A>. x < 5
&& CONTROL POINT B<COORDINATE SYSTEM A>.z > - 100 ){
    SIGNAL A = 1;
}else{
    SIGNAL A = 0 ;
}
```

NUMERICAL CONTROLLER

This application is based on and claims the benefit of priority from Japanese Patent Application No. 2017-122480, filed on 22 Jun. 2017, the content of which is incorporated herein by reference.

BACKGROUND OF THE INVENTION

Field of the Invention

The present invention relates to a numerical controller capable of performing synchronous and superimposed control with respect to designated control point and coordinate system.

Related Art

When synchronous control is performed in a numerical controller, normally, for example, a workpiece is held at both ends, or a workpiece is machined from both surfaces, by copying a movement amount in a physical axis of one path to a movement amount in a physical axis of another path. Particularly, as shown in FIG. 64, when a workpiece 500 is held at both ends by a grip unit 510 installed in a straight axis Z1 of a path 1, and a grip unit 520 installed in a straight axis Z2 of a path 2, to be machined by a tool 530 installed in the straight axis X1 of the path 1, the straight axis Z2 of the system 2 is moved for the same amount as that of the straight axis Z1 of the path 1 by copying a movement amount in the straight axis Z1 of the path 1 to a movement amount in the straight axis Z2 of the path 2. Thereby, the workpiece 500 is moved while both ends of the workpiece 500 are gripped.

When superimposed control is performed in a numeral control device, normally, while the synchronous control described above is performed, a command by own path is further added, and thereby, different types of machining are performed at the same time in a plurality of paths with respect to the same workpiece. Particularly, as shown in FIG. 65, when a workpiece 550 is gripped by a grip unit 560 installed in the straight axis Z1 of the path 1, and side surfaces of the workpiece 550 are machined by a tool 570 installed in the straight axis X1 of the path 1, while the grip unit 560 and the straight axis Z2 of the path 2 are moved by synchronous control, superimposing command is performed to a tool 580 installed in the axis Z2. Thereby, a movement amount of drilling operation is added to the axis Z2, and drilling to an end surface of the workpiece 550 is performed.

For this feature, for example, Patent Document 1 discloses an invention in which, in order to correctly perform dual arm cooperation, when a dual arm cooperation operation command is issued to a control unit of a master and a control unit of a slave, a passing point in which a master arm is to move is calculated as data represented by a common coordinate system of the master and the slave, and a point in which a slave arm is to move is determined on the basis of the data.

Patent Document 1: Japanese Unexamined Patent Application, Publication No. H06-071580

SUMMARY OF THE INVENTION

However, when a movement direction of an axis dynamically changes, for example, when, in accordance with rotation of one rotary axis, another axis physically connected the rotary axis moves, it is necessary that a plurality of axes are moved in consideration of an actual movement direction.

For example, in synchronous control shown in FIG. 66, a straight axis Z1 is installed on a rotary axis B1 of a path 1, a straight axis Z2 is installed perpendicular to a straight axis X2 of a path 2, and a rotary axis B2 is installed on the straight axis Z2. When a workpiece 600 is gripped by a grip unit 610 and a grip unit 620 installed in each of the straight axis Z1 and the rotary axis B2, in order to maintain the grip of the workpiece 600, it is necessary that the straight axis Z2, the straight axis X2, and the rotary axis B2 are moved in a composite manner in accordance with movement of the straight axis Z1 and the rotary axis B1.

Similarly, in superimposed control shown in FIG. 67, the straight axis Z1 is installed on the rotary axis B1 of the path 1, the straight axis Z2 is installed perpendicular to the straight axis X2 of the path 2, and the rotary axis B2 is installed on the straight axis Z2. When drilling is performed by a tool 670 installed in the rotary axis B2, while workpiece 650 is gripped by a grip unit 660 installed in the straight axis Z1, it is necessary that the straight axis Z2 and the rotary axis X2 are moved in a composite manner in consideration of a coordinate value of the straight axis Z1 and the rotary axis B1. In this way, currently, it is difficult to perform synchronous control and superimposed control with respect to a machine having a complicated configuration such as a configuration in which a movement direction of an axis dynamically changes.

An object of the present invention is to provide a numerical controller capable of performing synchronous control and superimposed control easily and flexibly with respect to a machine having a complicated configuration.

(1) According to the present invention, a numerical controller (for example, a numerical controller 100 described later) is provided, the numerical controller including: elements relationship setting unit (for example, an elements relationship setting unit 113 described later) that sets a relationship between a first element and a second element; an elements relationship output calculation unit (for example, an elements relationship output calculation unit 114 described later) that calculates a relationship output from the relationship between the first element and the second element; and an elements relationship control unit (for example, an elements relationship control unit 115 described later) that performs relationship control on the basis of the relationship output.

(2) In the numerical controller according to (1), the elements relationship setting unit may set a first control point as the first element, and set a second control point as the second element, the elements relationship output calculation unit may include a first control point movement destination generation unit (for example, a first control point movement destination generation unit 131 described later) that generates a first movement destination on a first coordinate system of the first control point, and a second control point movement destination generation unit (for example, a second control point movement destination generation unit 132 described later) that generates a second movement destination on a second coordinate system of the second control point, the elements relationship output calculation unit may output the first movement destination and the second movement destination as a relationship output, the elements relationship control unit may include a first each axis movement destination generation unit (for example, a first each axis movement destination generation unit 141 described later) that generates from the first movement destination a first each axis movement destination that is a movement destination of each axis composing the first control point and the first coordinate system, a second each axis movement destination generation unit (for example, a second each axis movement destination generation unit 142 described later) that generates from the second movement destination and the first each axis movement destination a second each axis movement destination that is a movement destination of each axis composing the second control point and the second coordinate system, a first movement performing unit (for example, a first movement performing unit 143 described later) that moves each axis composing the first control point and the first coordinate system to the first each axis movement destination, and a second movement performing unit (for example, a second movement performing unit 144 described later) that moves each axis composing the second control point and the second coordinate system to the second each axis movement destination.

(3) In the numerical controller according to (2), the first control point movement destination generation unit may include a first current position calculation unit (for example, a first current position calculation unit 151 described later) that calculates a first current position on the first coordinate system of the first control point, a first current posture calculation unit (for example, a first current posture calculation unit 152 described later) that calculates a first current posture on the first coordinate system of the first control point, and a first interpolation information generation unit (for example, a first interpolation information generation unit 153) that generates from a first command value imparted on the first coordinate system with respect to the first control point, first command position movement information and first command posture changing information for every interpolation period, the first control point movement destination generation unit may calculate the first movement destination from the first current position, the first current posture, the first command position movement information, and the first command posture changing information, the second control point movement destination generation unit may include a second current position calculation unit (for example, a second current position calculation unit 161 described later) that calculates a second current position on the second coordinate system of the second control point, and a second current posture calculation unit (for example, a second current posture calculation unit 162 described later) that calculates a second current posture on the second coordinate system of the second control point, and the second control point movement destination generation unit may calculate the second movement destination from the second current position and the second current posture.

(4) In the numerical controller according to (2), the first control point movement destination generation unit may include a first current position calculation unit (for example, a first current position calculation unit 151 described later) that calculates a first current position on the first coordinate system of the first control point, a first current posture calculation unit (for example, a first current posture calculation unit 152 described later) that calculates a first current posture on the first coordinate system of the first control point, and a first interpolation information generation unit (for example, a first interpolation information generation unit 153 described later) that generates from a first command value imparted on the first coordinate system with respect to the first control point, first command position movement information and first command posture changing information for every interpolation period, the first control point movement destination generation unit may calculate the first movement destination from the first current position, the first current posture, the first command position movement information, and the first command posture changing information, the second control point movement destination generation unit may include a second current position calculation unit (for example, a second current position calculation unit 161 described later) that calculates a second current position on the second coordinate system of the second control point, a second current posture calculation unit (for example, a second current posture calculation unit 162 described later) that calculates a second current posture on the second coordinate system of the second control point, and a second interpolation information generation unit (for example, a second interpolation information generation unit 163 described later) that generates from a second command value imparted on the second coordinate system with respect to the second control point, second command position movement information and second command posture changing information for every interpolation period, and the second control point movement destination generation unit may calculate the second movement destination from the second current position, the second current posture, the second command position movement information, and the second command posture changing information.

(5) In the numerical controller according to (3) or (4), the first interpolation information generation unit may include a first command position movement information conversion unit (for example, a first command position movement information conversion unit 171 described later) that converts the first command position movement information by position conversion information, and a first command posture changing information conversion unit (for example, a first command posture changing information conversion unit 172 described later) that converts the first command posture changing information by posture conversion information.

(6) In the numerical controller according to (4), the second interpolation information generation unit may include a second command position movement information conversion unit (for example, a second command position movement information conversion unit 181 described later) that converts the second command position movement information by position conversion information, and a second command posture changing information conversion unit (for example, a second command posture changing information conversion unit 182 described later) that converts the second command posture changing information by posture conversion information.

(7) In the numerical controller according to (4), the first command value as it is may be set to be the second command value.

(8) In the numerical controller according to (2) to (7), the first coordinate system and the second coordinate system may be the same.

(9) In the numerical controller according to (1), the elements relationship setting unit may include a relationship formula acquisition unit (for example, a relationship formula acquisition unit 121 described later) that acquires a relationship formula, and a syntax analysis unit (for example, a syntax analysis unit 122 described later) that analyzes the relationship formula, the elements relationship setting unit may set an analysis result of the syntax analysis unit to be a relationship between the first element and the second element, the elements relationship output calculation unit may include a relationship circulation unit (for example, a relationship circulation unit 133 described later) that circulates in each relationship formula element of the relationship between the first element and the second element, the relationship circulation unit may include a relationship output processing unit (for example, a relationship output processing unit 134 described later) that performs relationship output processing in accordance with a type of each relationship formula element that the relationship circulation unit has reached.

(10) In the numerical controller according to (9), the relationship formula may include as the relationship formula element, at least any one of information of a first control point as the first element, information of a first coordinate system as the first element, information of a second control point as the second element, information of a second coordinate system as the second element, first position relationship information on the first coordinate system of the first control point, second position relationship information on the second coordinate system of the second control point, a control syntax, an arithmetic operation instruction, a constant, a variable, type information of the variable, and command value information with respect to a control point, information representing an inside state of the numerical controller, input information to the numerical controller, and output information from the numerical controller.

(11) In the numerical controller according to (9), the syntax analysis unit may generate a syntax tree as an analysis result, and the relationship circulation unit may recursively circulate in each relationship formula element of the syntax tree.

(12) In the numerical controller according to (11), the syntax analysis unit may include a syntax list generation unit (for example, a syntax list generation unit 191 described later) that generates a syntax list, and a syntax conversion unit (for example, a syntax conversion unit 193 described later) that converts the syntax list to a syntax tree, and the syntax analysis unit may set the syntax tree to be an analysis result.

(13) In the numerical controller according to (9), the syntax analysis unit may generate a syntax list as an analysis result, and the relationship circulation unit may sequentially circulate each relationship formula element of the syntax list.

(14) In the numerical controller according to (13), the syntax analysis unit may include a syntax tree generation unit (for example, a syntax tree generation unit 192 described later) that generates a syntax tree, and a syntax conversion unit (for example, a syntax conversion unit 193 described later) that converts the syntax tree to a syntax list, and the syntax analysis unit may set the syntax list to be an analysis result.

(15) In the numerical controller according to (9), the relationship output processing unit may include at least any one of a control point information processing unit (for example, a control point information processing unit 201 described later) that processes control point information, a coordinate system information processing unit (for example, a coordinate system information processing unit 202 described later) that processes coordinate system information, a control point position information processing unit (for example, a control point position information processing unit 203 described later) that processes position information of a control point, a control syntax processing unit (for example, a control syntax processing unit 204 described later) that processes a control syntax, an arithmetic operation processing unit (for example, an arithmetic operation processing unit 205 described later) that processes an arithmetic operation instruction, a constant processing unit (for example, a constant processing unit 206 described later) that processes a constant, a variable processing unit (for example, a variable processing unit 207 described later) that processes a variable, a type information processing unit (for example, a type information processing unit 208 described later) that processes type information of a variable, a control point command value processing unit (for example, a control point command value processing unit 209 described later) that processes a command value with respect to a control point, an inside information processing unit (for example, an inside information processing unit 210 described later) that processes inside information of the numerical controller, an input information processing unit (for example, an input information processing unit 211 described later) that processes input information to the numerical controller, and an output information processing unit (for example, an output information processing unit 212 described later) that processes output information from the numerical controller.

(16) In the numerical controller according to (1), the elements relationship control unit may include an output operation unit (for example, an output operation unit 145 described later) that operates output information of the numerical controller on the basis of the relationship output calculated by the elements relationship output calculation unit.

(17) In the numerical controller according to (16), the relationship output may include an axis movement output, the output operation unit (for example, an output operation unit 145 described later) may include a control point movement unit (for example, a control point movement unit 221 described later) that calculates a coordinate value of each axis composing the each control point and the each coordinate system, and moves each axis so that each control point is in a movement destination that has been set in each coordinate system on the basis of the axis movement output.

(18) In the numerical controller according to (16), the relationship output may include a signal output, and the output operation unit (for example, an output operation unit 145 described later) may include a signal control unit (for example, a signal control unit 222 described later) that controls so that an output value is a value in which each signal is set on the basis of the signal output.

(19) In the numerical controller according to (16), the relationship output may include a variable output, and the output operation unit (for example, an output operation unit 145 described later) may include a variable control unit (for example, a variable control unit 223 described later) that controls so that an output value is a value in which each variable is set on the basis of the variable output.

(20) In the numerical controller according to (16), the relation output may include a communication information output, and the output operation unit (for example, an output operation unit 145 described later) may include a communication information control unit (for example, a communication information control unit 224 described later) that controls so that an output value is a value in which each piece of communication information is set on the basis of the communication information output.

(21) In the numerical controller according to (1) to (20), machine configuration information may be included in a graph form, and a control point and a coordinate system may be defined in all nodes of this graph.

(22) In the numerical controller according to (21), a first coordinate system as the first element, and a second coordinate system as the second element may be defined in the same node.

According to the present invention, synchronous control and superimposed control can be performed easily and flexibly with respect to a machine having a complicated configuration.

BRIEF DESCRIPTION OF THE DRAWINGS

FIG. 27A is a sentence example of a command of a control start command in the embodiment of the present invention.

FIG. 27B is a sentence example of the command of the control start command in the embodiment of the present invention.

FIG. 27C is a sentence example of the command of the control start command in the embodiment of the present invention.

FIG. 27D is a sentence example of the command of the control start command in the embodiment of the present invention.

FIG. 45 is an example of a relationship formula of synchronous control in the embodiment of the present invention.

DETAILED DESCRIPTION OF THE INVENTION

Hereinafter, an embodiment of the present invention will be described in detail with reference to FIG. 1 to FIG. 63B. A configuration of a numerical controller according to the embodiment of the present invention will be described.

[1. Configuration of Invention]

Figure 1:
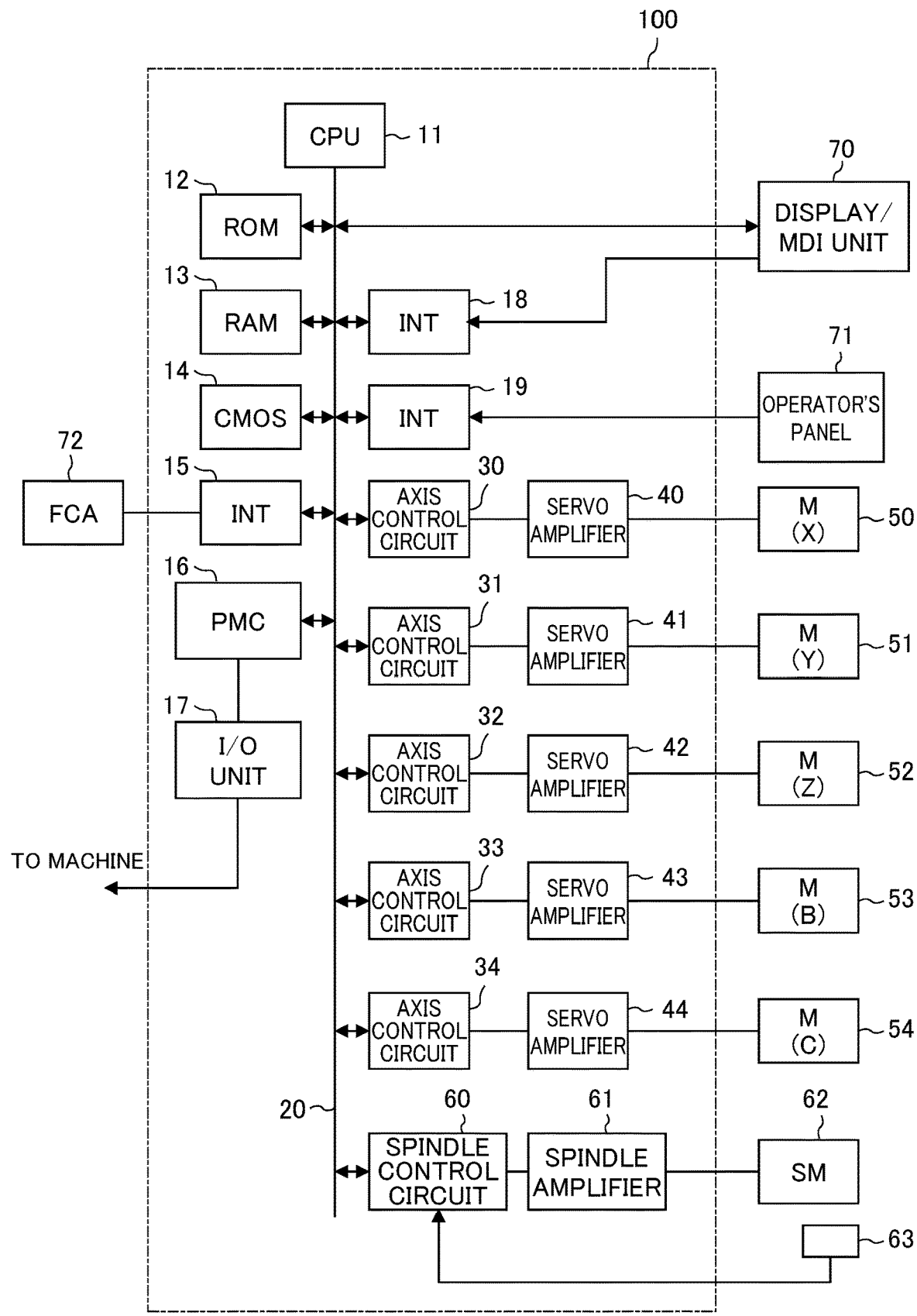
FIG. 1 is a diagram showing a configuration example of a numerical controller according to an embodiment of the present invention.

FIG. 1 shows a configuration example of a numerical controller 100 according to an embodiment of the present invention. The numerical controller 100 mainly includes a CPU 11, a ROM 12, a RAM 13, a CMOS 14, an interface 15, 18, 19, a programmable machine controller (PMC) 16, an I/O unit 17, axis control circuits 30 to 34, servo amplifiers 40 to 44, a spindle control circuit 60, and a spindle amplifier 61.

The CPU 11 is a processor that performs overall control the numerical controller 100. The CPU 11 reads a system program stored in the ROM 12 via a bus 20, and controls the entire numerical controller 100 in accordance with the system program.

Temporal calculation data and display data, and various data input by an operator via a display/an MDI unit 70 are stored in the RAM 13.

The CMOS memory 14 is configured as a non-volatile memory in which backup is performed by a battery not shown, and even when a power of the numerical controller 100 is turned off, a storage state is maintained. A machining program read via the interface 15, a machining program input via the display/MDI unit 70, and the like are stored in the CMOS memory 14.

In the ROM 12, various system programs for performing processing of an edit mode required for creating and editing of a machining program, and processing for automatic operation are written in advance.

Various machining programs such as a machining program for performing the present invention can be input via the interface unit 15, the display/MDI unit 70, and can be stored in the CMOS memory 14.

The interface 15 enables connection between the numerical controller 100 and external equipment 72 such as an adopter. A machining program, various parameters and the like are read from the external equipment 72 side. A machining program edited in the numerical controller 100 can be stored in an external storage means via the external equipment 72.

The programmable machine controller (PMC) 16 is a sequence program incorporated in the numerical controller 10, and controls by outputting a signal to an auxiliary device (for example, an actuator such as a robot hand for tool exchange) of a machine tool via the I/O unit 17. The PMC 16 receives a signal such as various switches of an operator's panel disposed in a body of the machine tool, perform necessary signal processing, and then, transmits the signal to the CPU 11.

The display/MDI unit 70 is a manual data input device including a display, a keyboard, and the like. The interface 18 receives a command and data from the keyboard of the display/MDI unit 70, and transmits the command and data to the CPU 11. The interface 19 is connected to an operator's panel 71 including a manual pulse generator, and the like.

Axis control circuits 30 to 34 of each axis receive a movement command amount of each axis from the CPU 11, and output a command of each axis to servo amplifiers 40 to 44.

The servo amplifiers 40 to 44 receive the command, and drive the servo motors 50 to 54 of each axis. The servo motors 50 to 54 of each axis incorporate a position and speed detector, feedback a position and speed feedback signal from the position and speed detector to the axis control circuits 30 to 34, and perform feedback control of position and speed. The feedback of position and speed is omitted in the block diagrams.

The spindle control circuit 60 receives a spindle rotation command to the machine tool, and outputs a spindle speed signal to a spindle amplifier 61. The spindle amplifier 61 receives the spindle speed signal, and rotates the spindle motor 62 of the machine tool to drive a tool.

The spindle motor 62 is coupled with a pulse encoder 63 by a gear, a belt, or the like. The pulse encoder 63 outputs a feedback pulse synchronously with rotation of a spindle. The feedback pulse is read by the CPU 11 via the bus 20.

In the configuration example of the numerical controller 100 shown in FIG. 1, five axis control circuits that are the axis control circuits 30 to 34, and five servo motors that are the servo motors 50 to 54 are shown. However, the present invention is not limited thereto, and can include any number of the axis control circuits and the servo motors.

Figure 2:
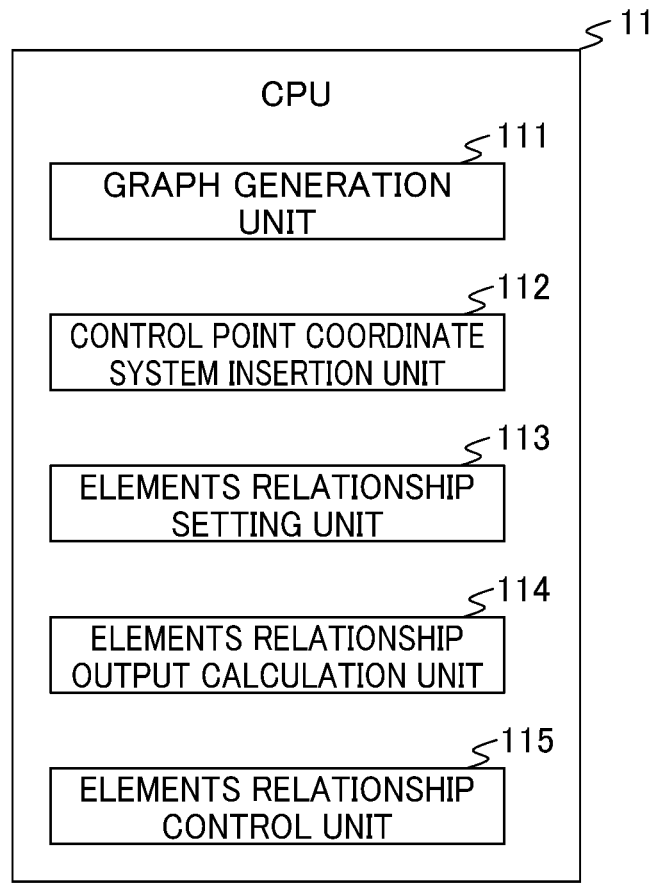
FIG. 2 is a functional block diagram of a control processing unit (CPU) included in the numerical controller according to the embodiment of the present invention.

FIG. 2 is a functional block diagram showing a function that is realized by reading a system program and an application program stored in the ROM 12 by the CPU 11 described above (hereinafter, also referred to as a "control unit 11") via the bus 20, and is realized in accordance with the system program and the application program. The CPU 11 includes a graph generation unit 111, a control point coordinate system insertion unit 112, an elements relationship setting unit 113, an elements relationship output calculation unit 114, and an elements relationship control unit 115.

The graph generation unit 111 generates a machine configuration of a control target, in a graph form. Detailed operation of the generation will be described in detail in "2. Generation of machine configuration tree" below.

The control point coordinate system insertion unit 112 inserts a control point and a coordinate system to the graph of the machine configuration. Detailed operation of the insertion will be described in detail in "3. Automatic insertion of control point and coordinate value" below.

When a control point of a master is set to be a "first control point", and a control point of a slave is set to be a "second control point", the elements relationship setting unit 113 sets the first control point to be a first element, sets the second control point to be a second element, and sets a relationship between the first element and the second element. The "first element" and the "second element" are not limited to control points. The elements relationship output calculation unit 114 calculates a relationship output from the relationship between the first element and the second element. The elements relationship control unit 115 performs control of the relationship on the basis of the relationship output. Detailed operation of the control will be described in detail in "4. Synchronous and superimposed control method" below.

Figure 3:
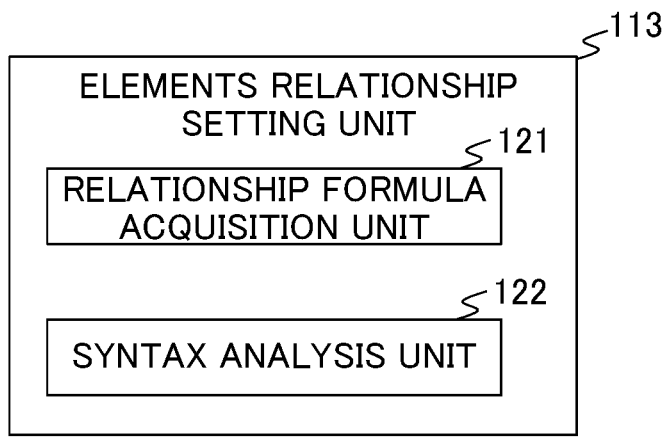
FIG. 3 is a functional block diagram of an elements relationship setting unit included in the numerical controller according to the embodiment of the present invention.

FIG. 3 is a functional block diagram of the elements relationship setting unit 113. The elements relationship setting unit 113 includes a relationship formula acquisition unit 121, and a syntax analysis unit 122.

When the numerical controller 100 performs control by using a relationship formula described later, as described later, the relationship formula acquisition unit 121 acquires the relationship formula, and the syntax analysis unit 122 analyzes the relationship formula. When the numerical controller 100 generates a syntax tree as described later, the syntax analysis unit 122 generates the syntax tree as an analysis result. Otherwise, when the numerical controller 100 generates a syntax list as described later, the syntax analysis unit 122 generates the syntax list as an analysis result. Further, the elements relationship setting unit 113 sets the analysis result of the syntax analysis unit 122 to be the relationship between the first element and the second element.

Figure 4:
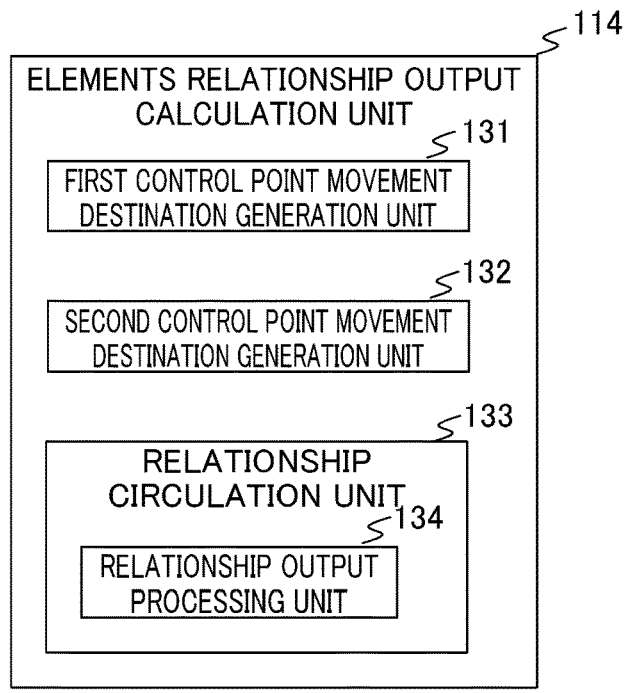
FIG. 4 is a functional block diagram of an elements relationship output calculation unit included in the numerical controller according to the embodiment of the present invention.

FIG. 4 is a functional block diagram of the elements relationship output calculation unit 114. The elements relationship output calculation unit 114 includes a first control point movement destination generation unit 131, a second control point movement destination generation unit 132, and a relationship circulation unit 133. The relationship circulation unit 133 includes a relationship output processing unit 134.

The first control point movement destination generation unit 131 generates a first movement destination on a first coordinate system of the first control point, and a second control point movement destination generation unit 132 generates a second movement destination on a second coordinate system of the second control point. In this case, the elements relationship output calculation unit 114 outputs the first movement destination and the second movement destination as the relationship output.

When the numerical controller 100 performs control by using a relationship formula between elements as descried later, the relationship circulation unit 133 circulates each relationship element of the relationship between the first element and the second element, and the relationship output processing unit 134 performs relationship output processing in accordance with a type of each relationship formula element that the relationship circulation unit 133 reach. When the numerical controller 100 generates the syntax tree as described later, the relationship circulation unit 133 recursively circulates each relationship element of the syntax tree. When the numerical controller 100 generates the syntax list, the relationship circulation unit 133 sequentially circulates each relationship formula element of the syntax list.

Figure 5:
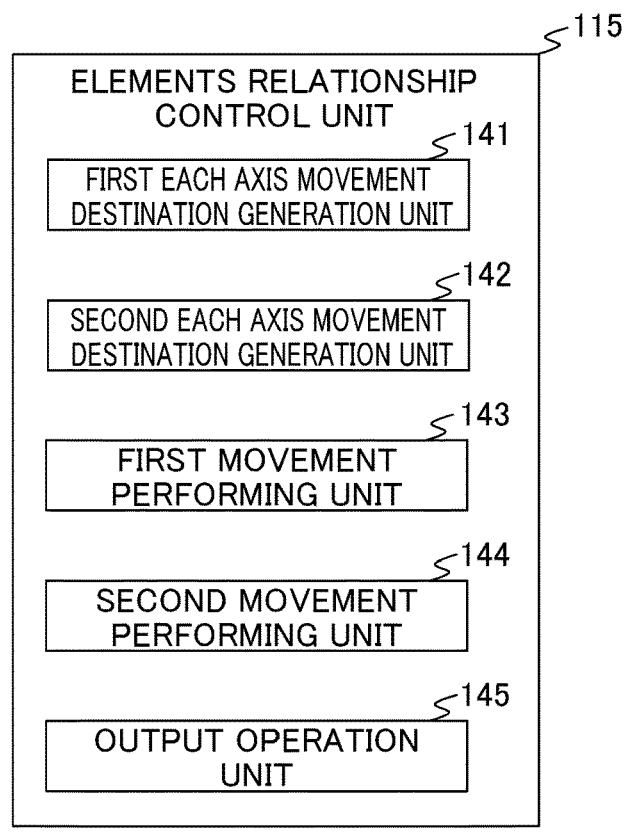
FIG. 5 is a functional block diagram of an elements relationship control unit included in the numerical controller according to the embodiment of the present invention.

FIG. 5 is a functional block diagram of the elements relationship control unit 115. The elements relationship control unit 115 includes a first each axis movement destination generation unit 141, a second each axis movement destination generation unit 142, a first movement performing unit 143, a second movement performing unit 144, and an output operation unit 145.

The first each axis movement destination generation unit 141 generates a first each axis movement destination that is a movement destination of each axis composing the first control point and the first coordinate system from the first movement destination. The second each axis movement destination generation unit 142 generates a second each axis movement destination that is a movement destination of each axis composing the second control point and the second coordinate system from the second movement destination and the first each axis movement destination. The first movement performing unit 143 moves each axis composing the first control point and the first coordinate system to the first each axis movement destination. The second movement performing unit 144 moves each axis composing the second control point and the second coordinate system to the second each axis movement destination. When the numerical controller 100 performs control by using the relationship formula between the elements, the output operation unit 145 operates output information of the numerical controller 100 on the basis of the relationship output calculated by the elements relationship output calculation unit 114. The "each axis" refers to a physical axis such as a straight axis, a rotary axis, and the like.

Figure 6:
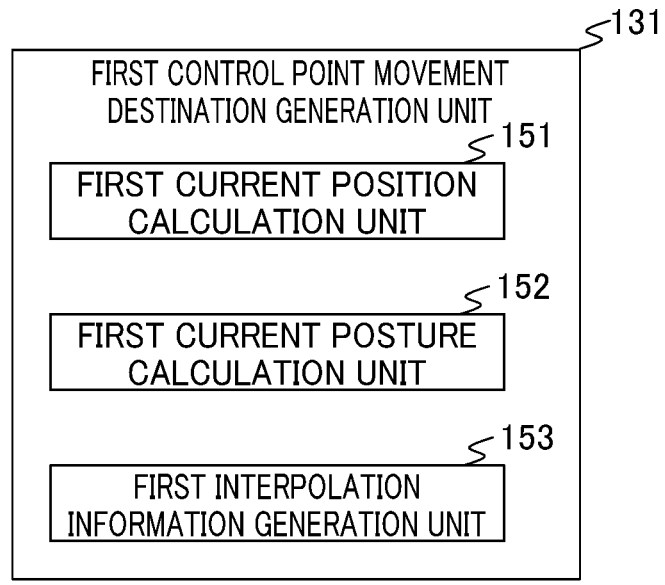
FIG. 6 is a functional block diagram of a first control point movement destination setting unit included in the numerical controller according to the embodiment of the present invention.

FIG. 6 is a functional block diagram of the first control point movement destination generation unit 131. The first control point movement destination generation unit 131 includes a first current position calculation unit 151, a first current posture calculation unit 152, and a first interpolation information generation unit 153.

The first current position calculation unit 151 calculates a first current position on the first coordinate system of the first control point. The first current posture calculation unit 152 calculates a first current posture on the first coordinate system of the first control point. The first interpolation information generation unit 153 generates first command position movement information and first command posture changing information for every interpolation period from the first command value imparted on the first coordinate system with respect to the first control point. The first control point movement destination generation unit 131 calculates the first movement destination from the first current position, the first current posture, the first command position movement information, and the first command posture changing information.

Figure 7:
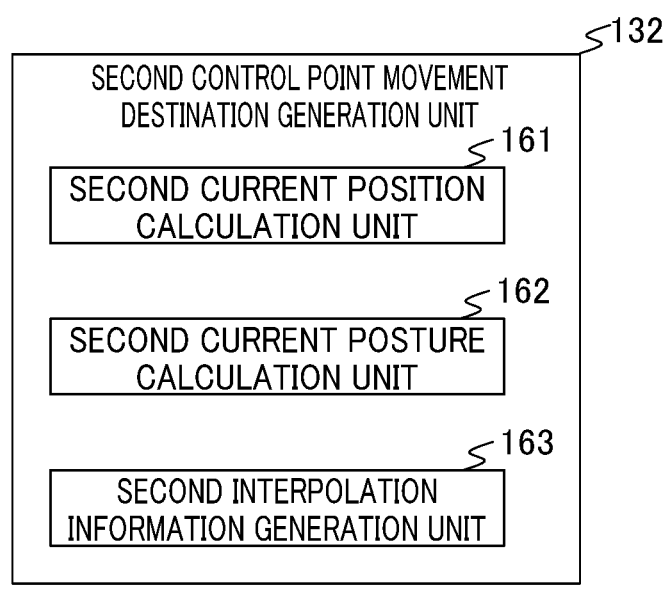
FIG. 7 is a functional block diagram of a second control point movement destination generation unit included in the numerical controller according to the embodiment of the present invention.

FIG. 7 is a functional block diagram of the second control point movement destination generation unit 132. The second control point movement destination generation unit 132 includes a second current position calculation unit 161, a second current posture calculation unit 162, and a second interpolation information generation unit 163.

The second current position calculation unit 161 calculates a second current position on the second coordinate system of the second control point. The second current posture calculation unit 162 calculates a second current posture on the second coordinate system of the second control point. The second interpolation information generation unit 163 generates second command position movement information and second command posture changing information for every interpolation period from the second command value imparted on the second coordinate system with respect to the second control point. The second control point movement destination generation unit 132 calculates the second movement destination from the second current position and the second current posture in a case of synchronous control, and in addition, the second command position movement information and the second command posture changing information in a case of superimposed control.

Figure 8:
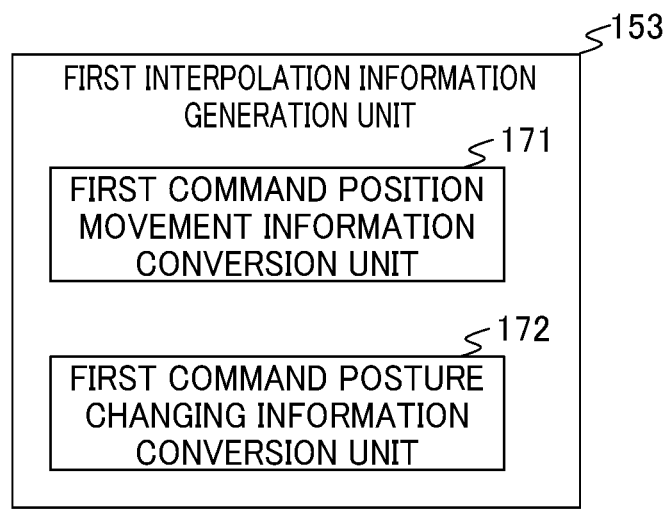
FIG. 8 is a functional block diagram of a first interpolation information generation unit included in the numerical controller according to the embodiment of the present invention.

FIG. 8 is a functional block diagram of the first interpolation information generation unit 153. The first interpolation information generation unit 153 includes a first command position movement information conversion unit 171, and a first command posture changing information conversion unit 172.

The first command position movement information conversion unit 171 converts the first command position movement information by position conversion information. The first command posture changing information conversion unit 172 converts the first command posture changing information by posture conversion information.

Figure 9:
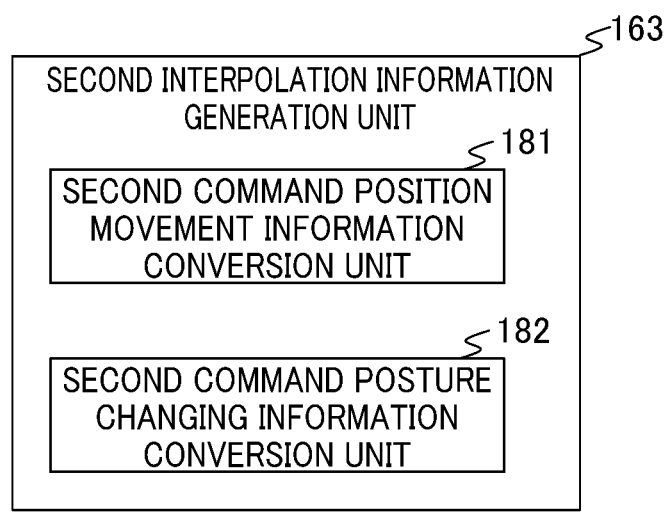
FIG. 9 is a functional block diagram of a second interpolation information generation unit included in the numerical controller according to the embodiment of the present invention.

FIG. 9 is a functional block diagram of the second interpolation information generation unit 163. The second interpolation information generation unit 163 includes a second command position movement information conversion unit 181, and a second command posture changing information conversion unit 182.

The second command position movement information conversion unit 181 converts the second command position movement information by the position conversion information. The second command posture changing information conversion unit 182 converts the second command posture changing information by the posture conversion information.

Figure 10:
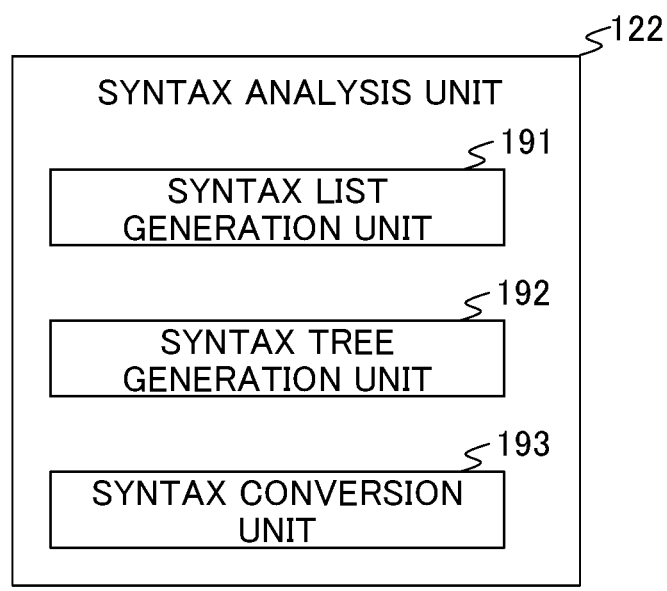
FIG. 10 is a functional block diagram of a syntax analysis unit included in the numerical controller according to the embodiment of the present invention.

FIG. 10 is a functional block diagram of the syntax analysis unit 122. The syntax analysis unit 122 includes a syntax list generation unit 191, a syntax tree generation unit 192, and a syntax conversion unit 193.

The syntax list generation unit 191 generates the syntax list. The syntax tree generation unit 192 generates the syntax tree. The syntax conversion unit 193 converts the syntax list to the syntax tree, or syntax tree to the syntax list. The syntax analysis unit 122 may set the syntax list generated by the syntax list generation unit 191 to be an analysis result, and may set the syntax tree generated by the syntax tree generation unit 192 to be the analysis result. When the syntax conversion unit 193 converts the syntax list to the syntax tree, the syntax analysis unit 122 sets the syntax tree to be an analysis result. When the syntax conversion unit 193 converts the syntax tree to the syntax list, the syntax analysis unit 122 sets the syntax list to be an analysis result.

Figure 11:
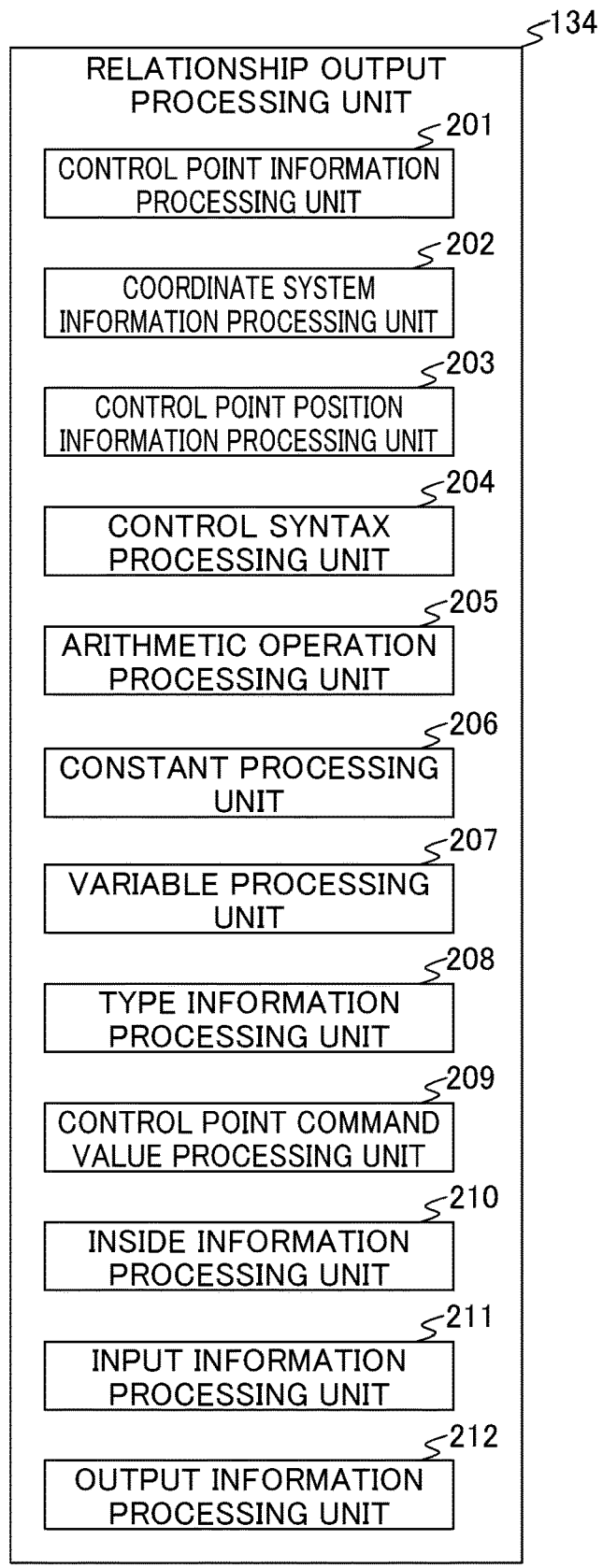
FIG. 11 is a functional block diagram of relationship output processing included in the numerical controller according to the embodiment of the present invention.

FIG. 11 is a functional block diagram of the relationship output processing unit 134. The relationship output processing unit 134 includes a control point information processing unit 201, a coordinate system information processing unit 202, a control point position information processing unit 203, a control syntax processing unit 204, an arithmetic operation processing unit 205, a constant processing unit 206, a variable processing unit 207, a type information processing unit 208, a control point command value processing unit 209, an inside information processing unit 210, an input information processing unit 211, and an output information processing unit 212.

The control point information processing unit 201 processes the control point information. The coordinate system information processing unit 202 processes the coordinate system information. The control point position information processing unit 203 processes the position information of the control point. The control syntax processing unit 204 processes the control syntax. The arithmetic operation processing unit 205 processes an arithmetic operation instruction. The constant processing unit 206 processes a constant. The variable processing unit 207 processes a variable. The type information processing unit 208 processes type information of the variable. The control point command value processing unit 209 processes a command value with respect to the control point. The inside information processing unit 210 processes inside information of the numerical controller 100. The input information processing unit 211 processes input information to the numerical controller 100. The output information processing unit 212 processes output information from the numerical controller 100.

Figure 12:
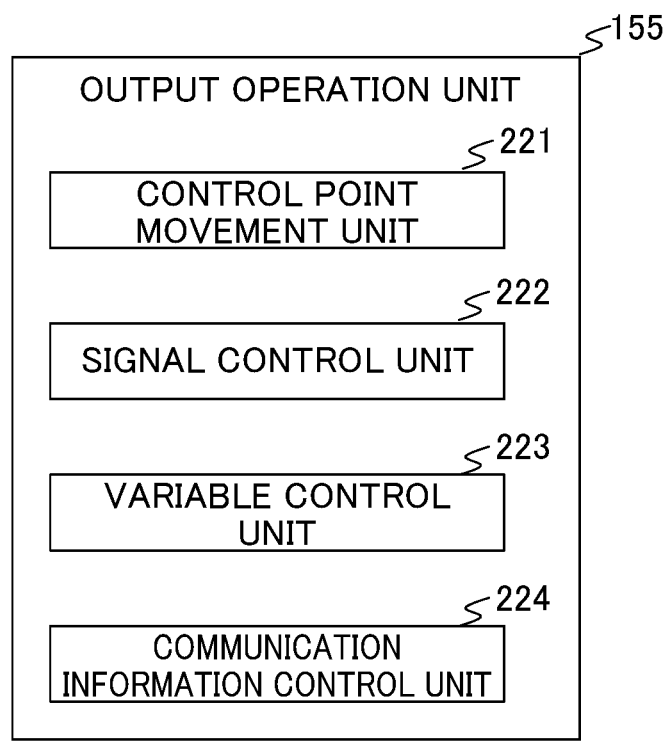
FIG. 12 is a functional block diagram of an output operation unit included in the numerical controller according to the embodiment of the present invention.

FIG. 12 is a functional block diagram of the output operation unit 145. The output operation unit 145 includes a control point movement unit 221, a signal control unit 222, a variable control unit 223, and a communication information control unit 224.

When the relationship output includes an axis movement output, the control point movement unit 221 calculates a coordinate value of each axis composing each control point and each coordinate system, and moves each axis so that each control point is in a movement destination that has been set, in each coordinate system on the basis of the axis movement output.

When the relationship output includes a signal output, the signal control unit 222 controls so that each signal is an output value that has been set, on the basis of the signal output.

When the relationship output includes a variable output, the variable control unit 223 controls so that each variable is an output value that has been set, on the basis of the variable output.

When the relationship output includes the communication information output, the communication information control unit 224 controls so that each piece of communication information is an output value that has been set, on the basis of the communication information output.

The "relationship formula" described above includes as a relationship formula element, at least any one of first control point information, first coordinate system information, second control point information, second coordinate system information, first position relationship information on the first coordinate system of the first control point, second position relationship information on the second coordinate system of the second control point, a control syntax, an arithmetic operation instruction, a constant, a variable, type information of the variable, command value information with respect to the control point, information representing an inside state of the numerical controller 100, input information to the numerical controller 100, and output information from the numerical controller 100. The "control syntax" may include, for example, any one or more of an IF sentence, a FOR sentence, a WHILE sentence, a SWITCH sentence, a GOTO sentence, a ELSE sentence, an ELSE IF sentence, a DO sentence, a BREAK sentence, and a CONTINUE sentence. The "arithmetic operation instruction" may include, for example, any one or more of four arithmetic operations, a relational operation, a logical operation, an assignment operation, a trigonometric function, an exponential function, and a logarithmic function. The "variable" may include any one or more of single data, an array data, a class object, and an array of the class object. The "type information" may include, for example, any or more of an integer type, a floating-point type, a character type, a character string type, and a class type. The "input information to the numerical controller 100" may include, for example, any one or more of a signal input, a sensor, a communication information, and information related to a feedback value. The "output information from the numerical controller 100" may include, for example, any one or more of a command to the motors 50 to 54, a signal output, and information related to communication information.

As described later, when the superimposing command is a command with respect to the first control point itself, the first command value itself may be set to the second command value. At the time of synchronous control, the first coordinate system and the second coordinate system may be the same. The numerical controller 100 may have machine configuration information in a graph form, and a control point and a coordinate system may be defined in all nodes of the graph. In this case, the first coordinate system and the second coordinate system may be defined in the same node.

The "first command position movement information", the "first command posture changing information", the "second command position movement information", the "second command posture changing information", the "position conversion information", and the "posture conversion information" may be a matrix, a vector form, or a roll, pitch, and yaw form.

[2. Generation of Machine Configuration Tree]

The numerical controller 100 according to the embodiment of the present invention first generates a graph representing a machine configuration. A generation method of generating a machine configuration tree as an example of the graph will be described in detail with reference to FIG. 13 to FIG. 19.

Figure 13:
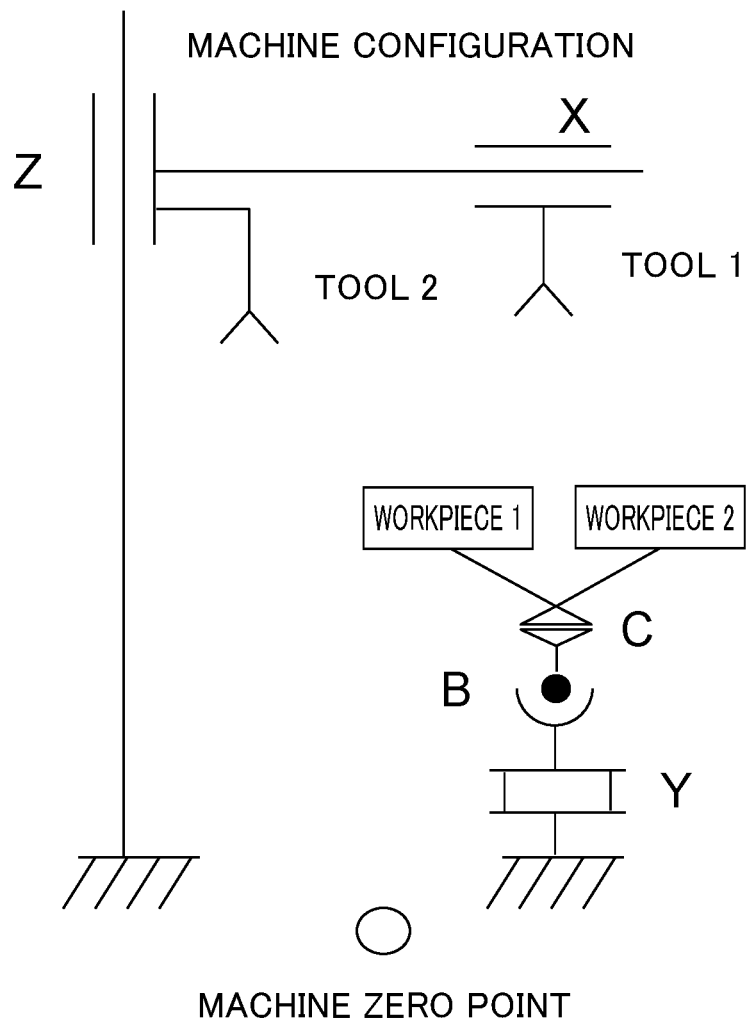
FIG. 13 is an explanation diagram of a generation method of a machine configuration tree in the embodiment of the present invention.

As an example, a generation method of a machine configuration tree representing a configuration of a machine shown in FIG. 13 will be described. In the machine of FIG. 13, it is assumed that an X axis is set to be perpendicular to a Z axis, a tool 1 is installed in the X axis, and a tool 2 is installed in the Z axis. On the other hand, it is assumed that a B axis is set on a Y axis, a C axis is set on the B axis, and a workpiece 1 and a workpiece 2 are installed in the C axis. A method of representing the machine configuration as the machine configuration tree is as follows.

Figure 14:
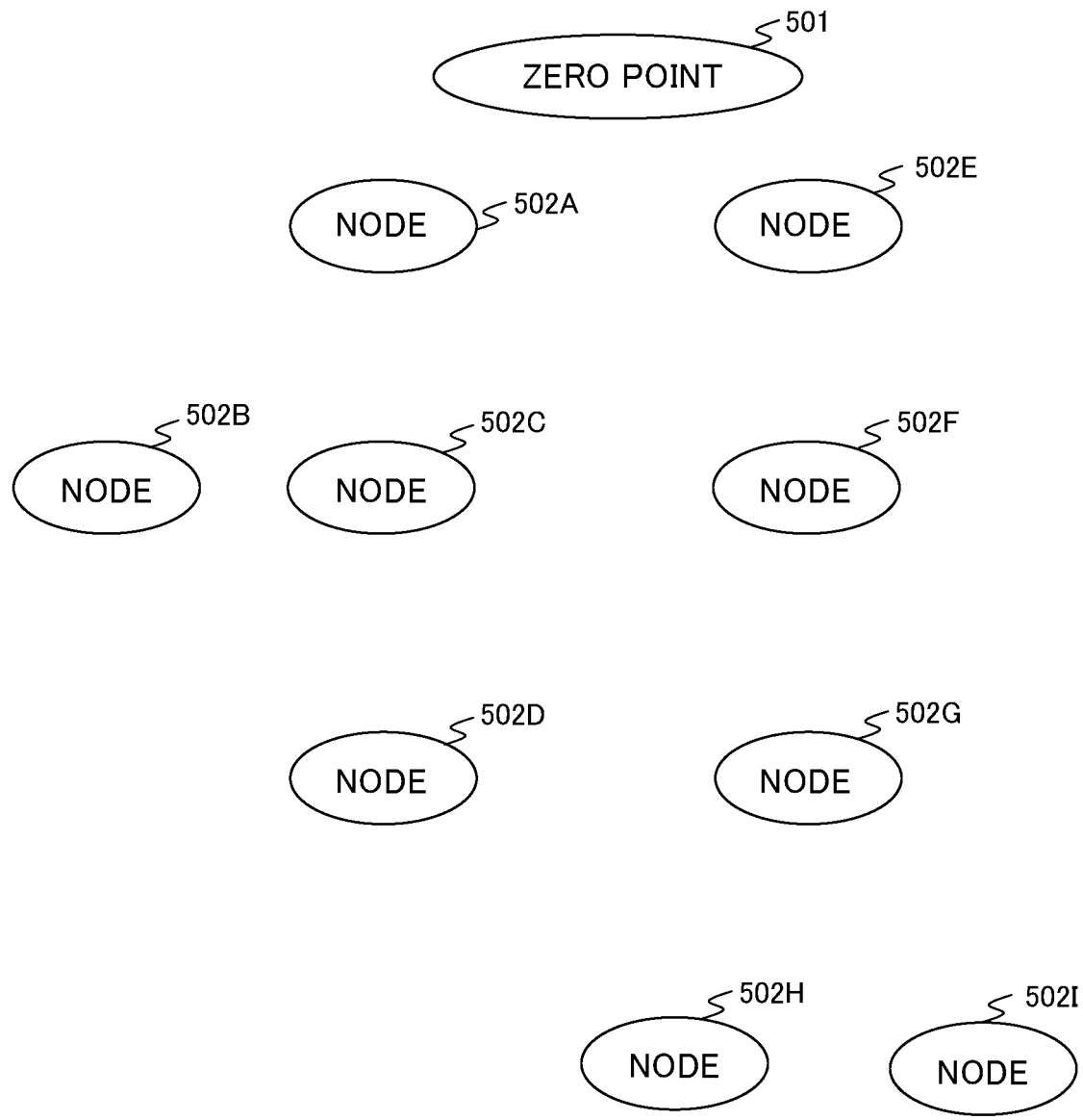
FIG. 14 is an explanation diagram of the generation method of the machine configuration tree in the embodiment of the present invention.

First, as shown in FIG. 14, only a zero point 501 and nodes 502A to 502I are arranged. In this stage, there is no connection between the zero point 501 and the nodes 502, and between the nodes 502, and there is no name set for the zero point and each node.

Figure 15:
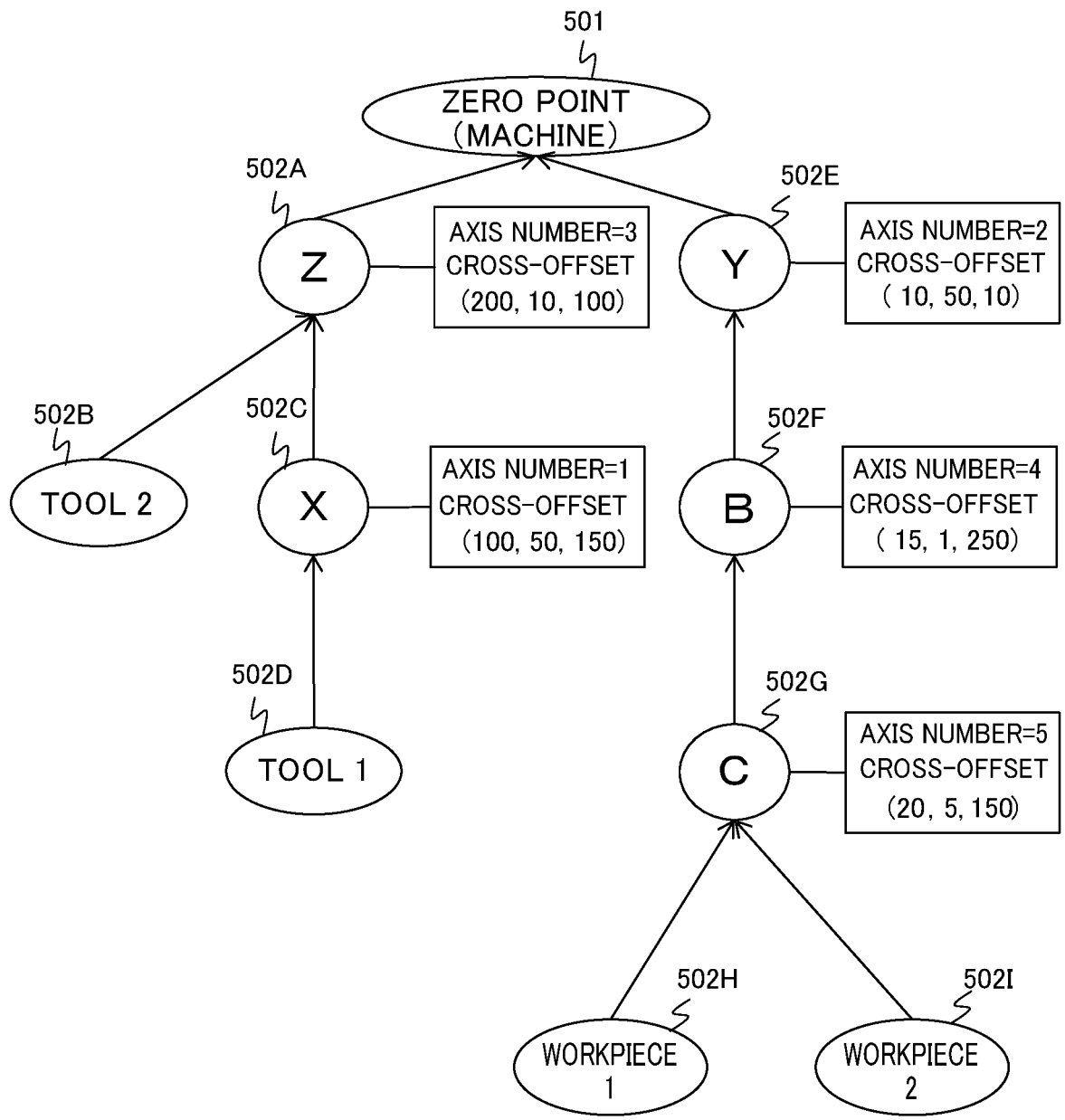
FIG. 15 is an explanation diagram of the generation method of the machine configuration tree in the embodiment of the present invention.

Next, an axis name (axis type) of each axis, a name of each tool, a name of each workpiece, a name of each zero point, and a physical axis number (axis type) of each axis are set. Next, a parent node (axis type) of each axis, a parent node of each tool, and a parent node of each workpiece are set. Lastly, a cross-offset (axis type) of each axis, a cross-offset of each tool, and a cross-offset of each workpiece are set. As a result, the machine configuration tree shown in FIG. 15 is generated.

Each node of the machine configuration tree is not limited to each information described above, and may have or may not have, for example, identifier (name), an identifier of a parent node of itself, an identifier of all child nodes having itself as a parent, a relative offset (cross-offset) with respect to the parent node, a relative coordinate value with respect to the parent node, a relative movement direction (unit vector) with respect to the parent node, a node type (straight axis/rotary axis/unit (described later)/control point/coordinate system/zero point, or the like), a physical axis number, information related to a conversion formula of an orthogonal coordinate system and a physical coordinate system.

A value is set to each node in this way, and thereby, data having a data structure of a machine configuration tree shape is generated in the numerical controller 100. Even when another machine (or robot) is added, a zero point can be added, and a node can be further added.

Figure 16:
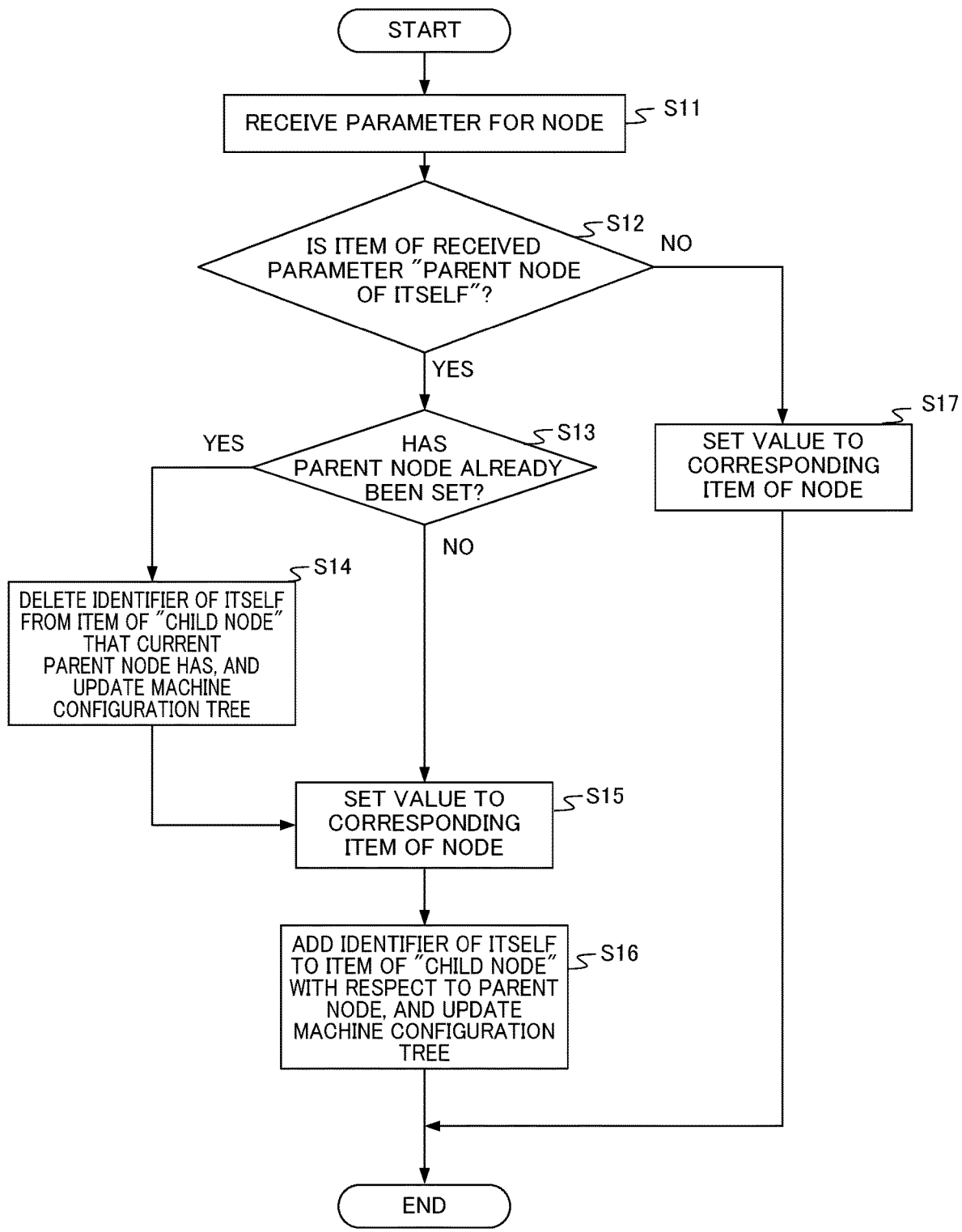
FIG. 16 is a flowchart showing the generation method of the machine configuration tree in the embodiment of the present invention.

FIG. 16 shows a flowchart of a generalized machine configuration tree generation method described above, particularly, a method of setting each value to each node.

At step S11, the graph generation unit 111 receives a value of a parameter to be set to a node. At step S12, when an item of a set parameter is "parent node of itself" (S12: Yes), the processing proceeds to step S13. When it is not the "parent node of itself" (S12: No), the processing proceeds to step S17.

At step S13, when a parent node has been already set to a node in which a parameter is set (S13: YES), the processing proceeds to step S14. When a parent node has not been set (S13: No), the processing proceeds to step S15.

At step S14, the graph generation unit 111 deletes an identifier of itself from an item of a "child node" that the current parent node has, of a node in which a parameter is set, and updates the machine configuration tree.

At step S15, the graph generation unit 111 sets a value to a corresponding item of a node in which a parameter is set.

At step S16, the graph generation unit 111 adds the identifier of itself to an item of a "child node" with respect to a parent node, updates the machine configuration tree, and ends a flow.

At step S17, the graph generation unit 111 sets a value to a corresponding item of a node in which a parameter is to be set, and ends a flow.

Figure 17A:
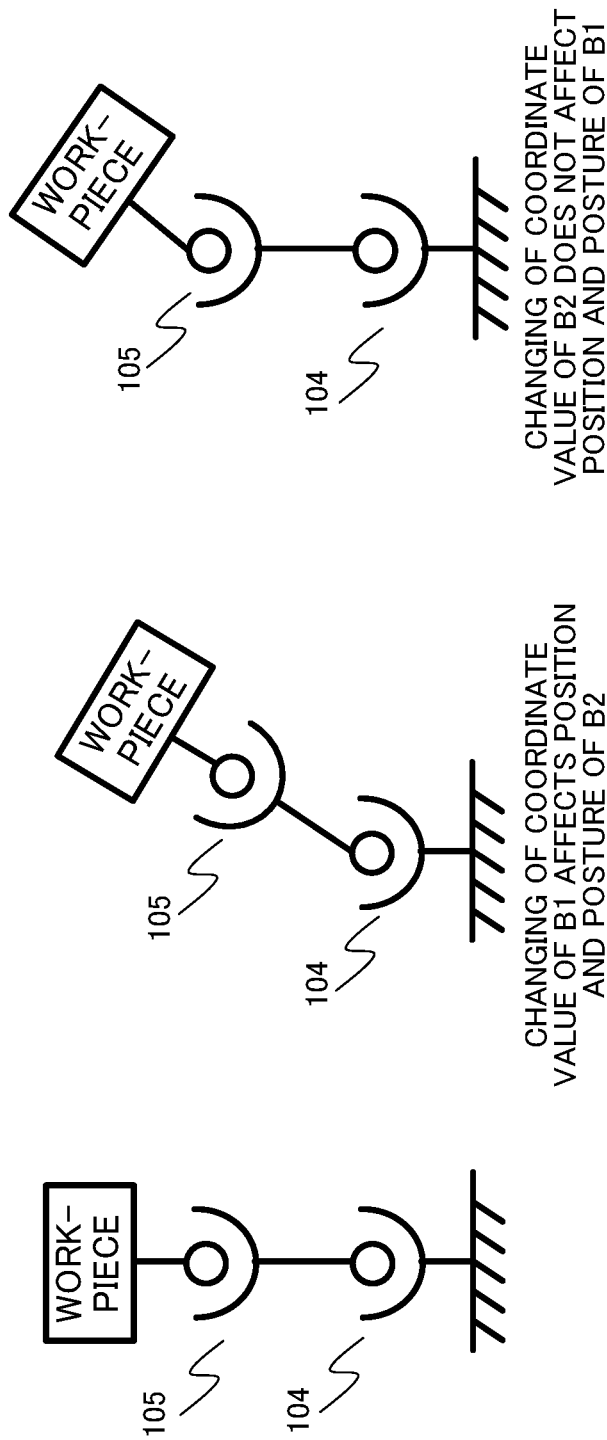
FIG. 17A is an explanation diagram of a parent-child relationship of components of a machine in the embodiment of the present invention.
Figure 17B:
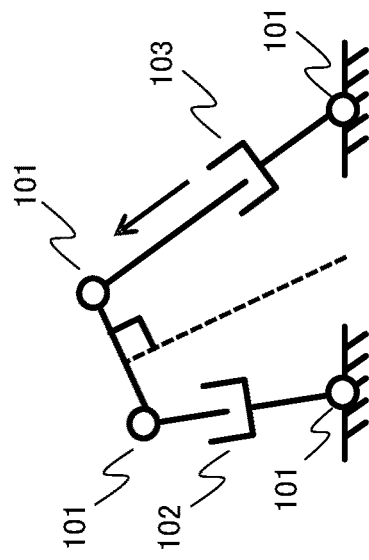
FIG. 17B is an explanation diagram of the parent-child relationship of the components of the machine in the embodiment of the present invention.
Figure 17B:
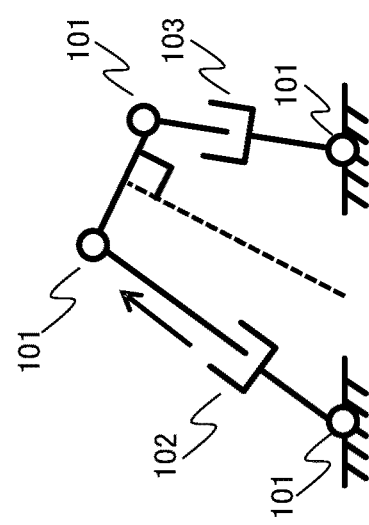
Figure 17B:
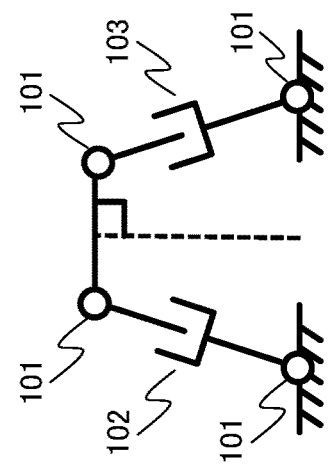

A parent-child relationship between components of a machine can be set by using a generation method of data having the data structure of the machine configuration tree shape described above. The parent-child relationship, for example, as shown in FIG. 17A, refers to a relationship in which, when there are two rotary axis nodes 104, 105, a change of a coordinate value of one node 104 affects unilaterally to a geometric state (typically, position and posture) of the other node 105. In this case, it is considered that the nodes 104, 105 are in the parent-child relationship, and the node 104 is referred to as a parent, the node 105 is referred to as a child. However, for example, as shown in FIG. 17B, in a machine configuration composed of two straight axis nodes 102, 103, and four free joints 101, there is a mechanism that affects mutually, in which a change of a coordinate value (length) of one of the nodes 102, 103 changes not only the geometric state of the other, but also the geometric state of itself. In such case, it can be considered that both of them are parents and are children. That is, the parent-child relationship is bilateral.

Figure 18A:
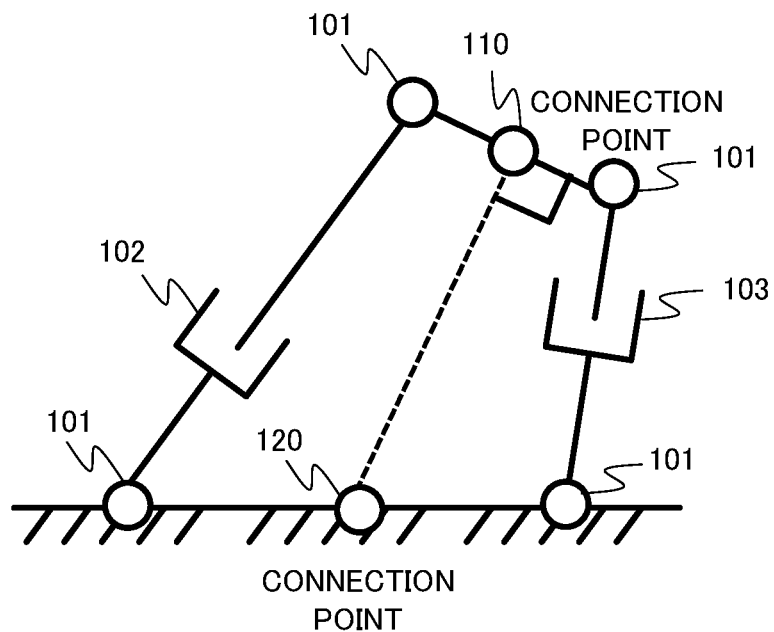
FIG. 18A is an explanation diagram of a method of inserting a unit to a machine configuration machine.
Figure 18B:
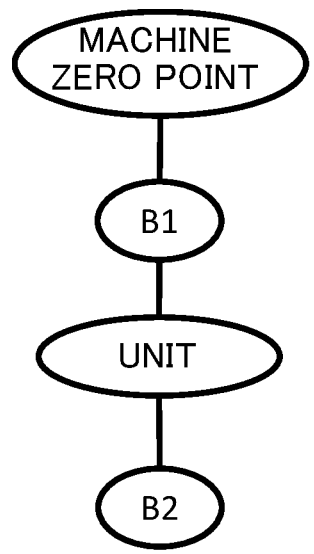
FIG. 18B is an explanation diagram of the method of inserting the unit to the machine configuration machine.
Figure 18C:
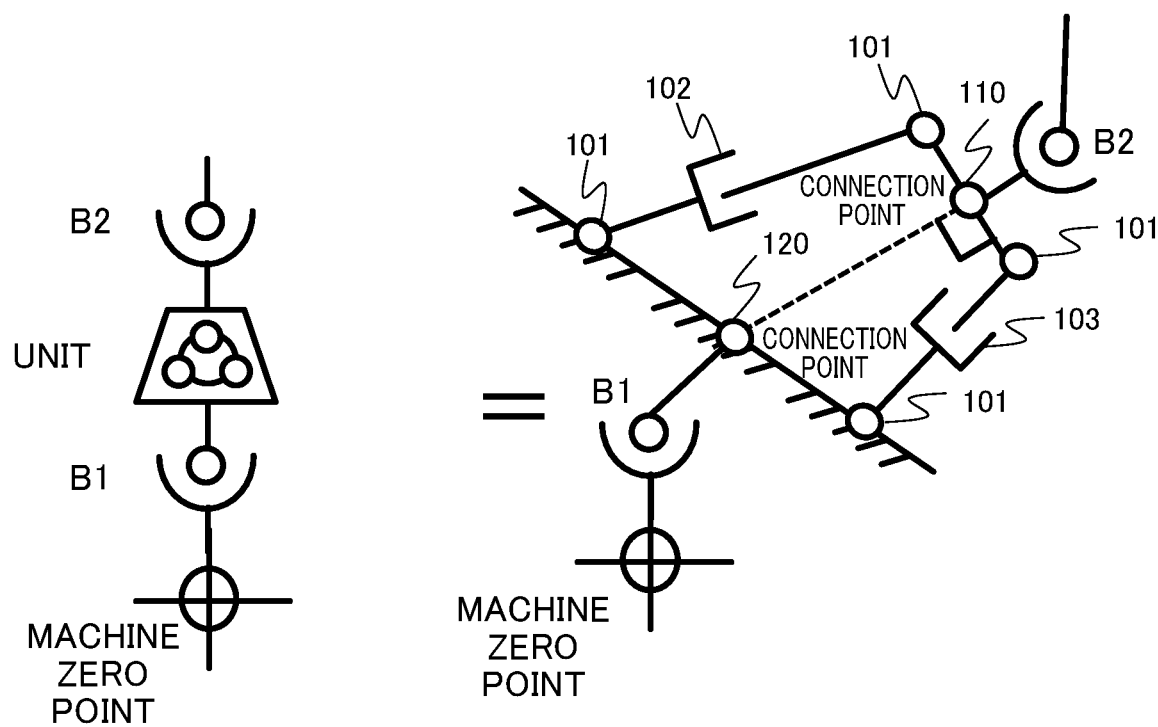
FIG. 18C is an explanation diagram of the method of inserting the unit to the machine configuration machine.
Figure 19:
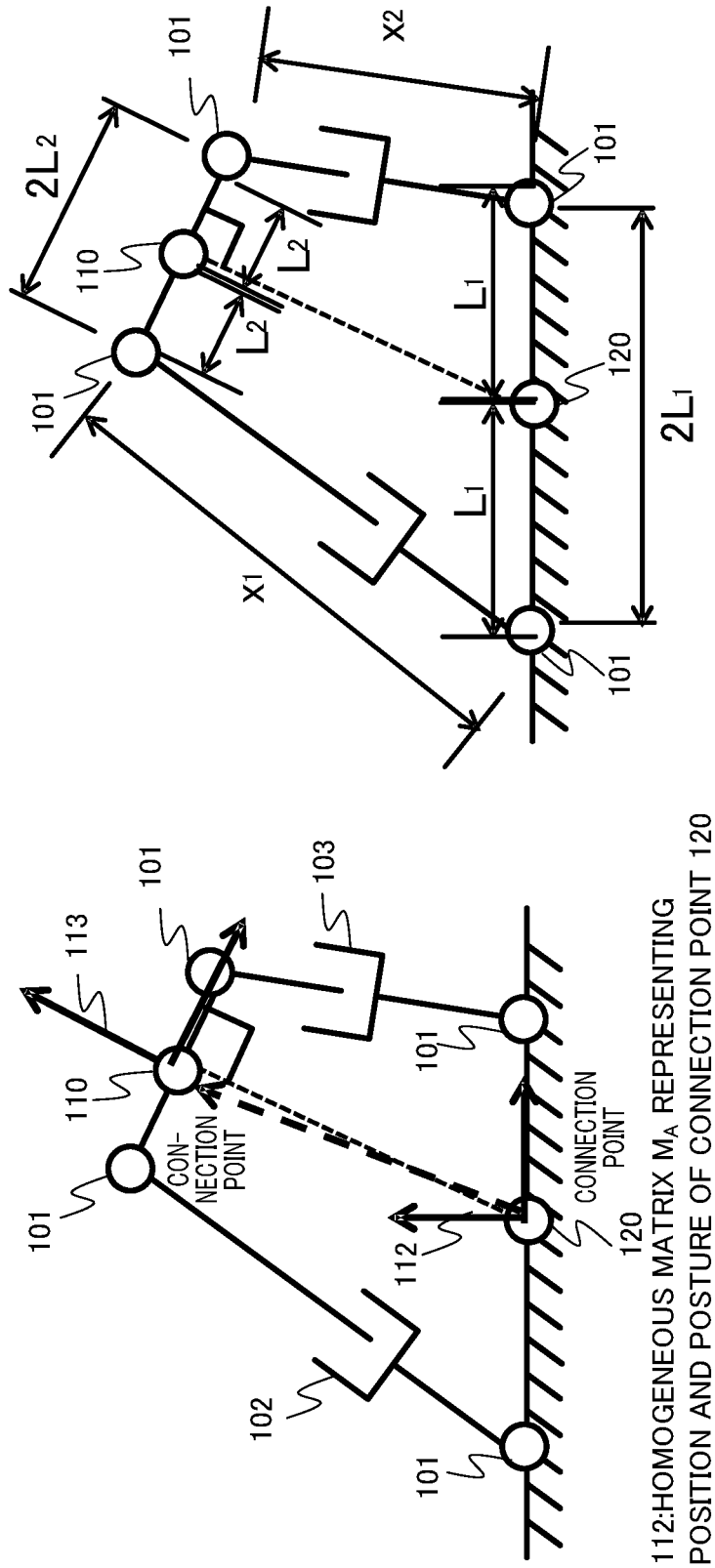
FIG. 19 is a diagram showing an example of a machine configuration according to the embodiment of the present invention.

In this way, a mechanism in which a change of one node affects mutually with the other node, is considered as one unit from a point of view of convenience. The unit is inserted to the machine configuration tree, and thereby, the entire machine configuration tree is generated. The unit has two connection positions 110, 120 as shown in FIG. 18A. When the unit is inserted to the machine configuration tree as FIG. 18B, the parent node is connected to the connection point 120, and the child node is connected to the connection point 110. The unit has a conversion matrix from the connection point 120 to the connection point 110. The conversion matrix is represented by a coordinate value of each node included in the unit. For example, in a case of a machine configuration as FIG. 19, when a homogeneous matrix representing position and posture in the connection point 120 is set to be MA, and a homogeneous matrix representing position and posture in the connection point 110 is set to be MB, a conversion formula between these matrixes is represented as below using coordinate values $x_1$, $x_2$ of each straight axis node included in the unit.
When it is assumed that $$\theta = \sin^{-1}\left(\frac{x_1^2 - x_2^2}{4L_1L_2}\right)$$

$$L = L_1 \cos\theta + \sqrt{0.5x_1^2 + 0.5x_2^2 - L_2^2 - L_1^2\sin^2\theta}$$

it is represented by $$M_B = TM_A$$

where $$T = \begin{pmatrix} \sin\theta & 0 & \cos\theta & L\cos\theta \\ 0 & 1 & 0 & 0 \\ -\cos\theta & 0 & \sin\theta & L\sin\theta \\ 0 & 0 & 0 & 1 \end{pmatrix}$$

The unit representing this machine configuration has a homogeneous conversion matrix such as T in a formula of [Formula 1] described above. The homogeneous matrix is a 4×4 matrix that can collectively represent position and posture, as the formula of [Formula 2] below.

$$\begin{pmatrix} \overset{\text{Posture}}{\begin{array}{|ccc|} \hline \cos\theta & -\sin\theta & 0 \\ \sin\theta & \cos\theta & 0 \\ 0 & 0 & 1 \\ \hline \end{array}} & \overset{\text{Position}}{\begin{array}{|c|} \hline x \\ y \\ z \\ \hline \end{array}} \\ 0 \quad 0 \quad 0 & 1 \end{pmatrix}$$

Even when the parent-child relationship is not mutual, in order to make calculation processing and setting easy, a unit in which a plurality of nodes are collected in one in advance may be defined and configured in the machine configuration tree.

As described above, in the present embodiment, the graph of the machine configuration can include a unit in which a plurality of axes are collected into one as a component.

[3. Automatic Insertion of Control Point and Coordinate Value]

In order to designate various positions in a machine configuration, as control points, and set coordinate systems of various points in the machine configuration, a method below is performed by using the machine configuration tree generated in "2. Generation of machine configuration tree".

Figure 20A:
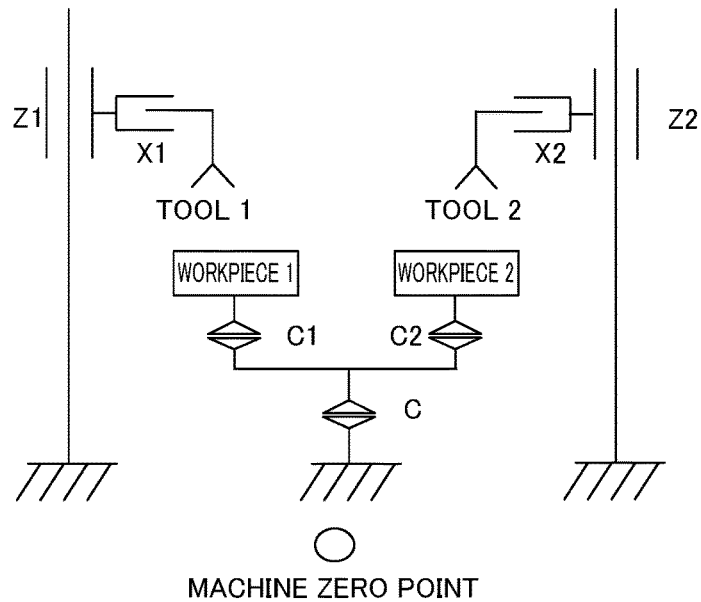
FIG. 20A is a diagram showing an example of a machine that is a generation target of the machine configuration tree.
Figure 20B:
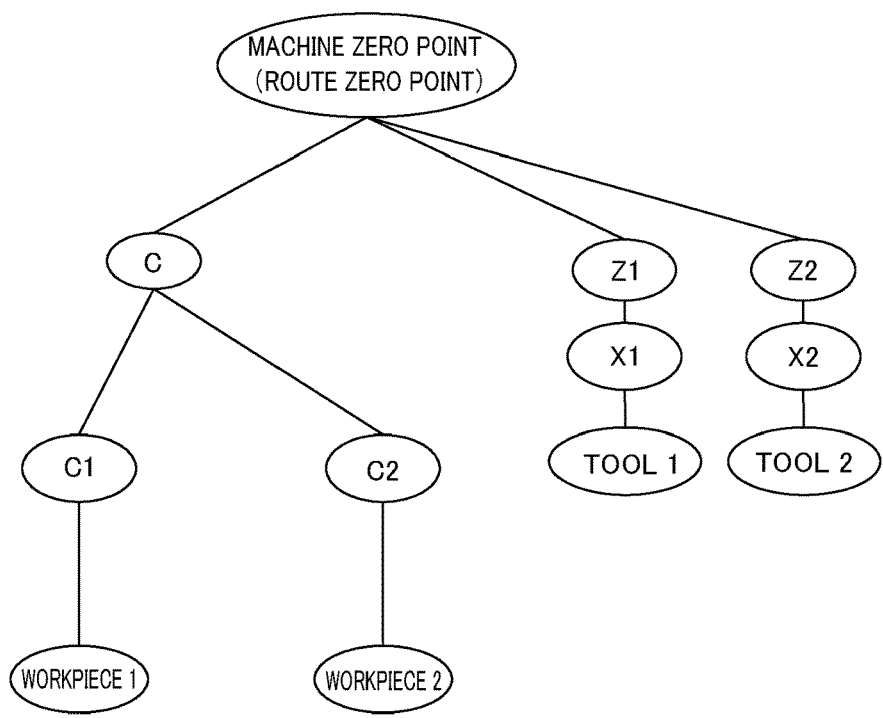
FIG. 20B is a diagram showing an example of a machine configuration tree corresponding to the machine that is the generation target of the machine configuration tree.

For example, in a rotary index machine 300 shown in FIG. 20A, an X1 axis is set perpendicular to a Z1 axis, and the tool 1 is installed in the X1 axis. A X2 axis is set perpendicular to a Z2 axis, and the tool 2 is installed in the X2 axis. In a table, it is assumed that a C1 axis and a C2 axis are set in parallel in a C axis, and a workpiece 1 and a workpiece 2 are installed in each of the C1 axis and the C2 axis. When being represented by a machine configuration tree, this machine configuration is the machine configuration tree shown in FIG. 20B.

Figure 21:
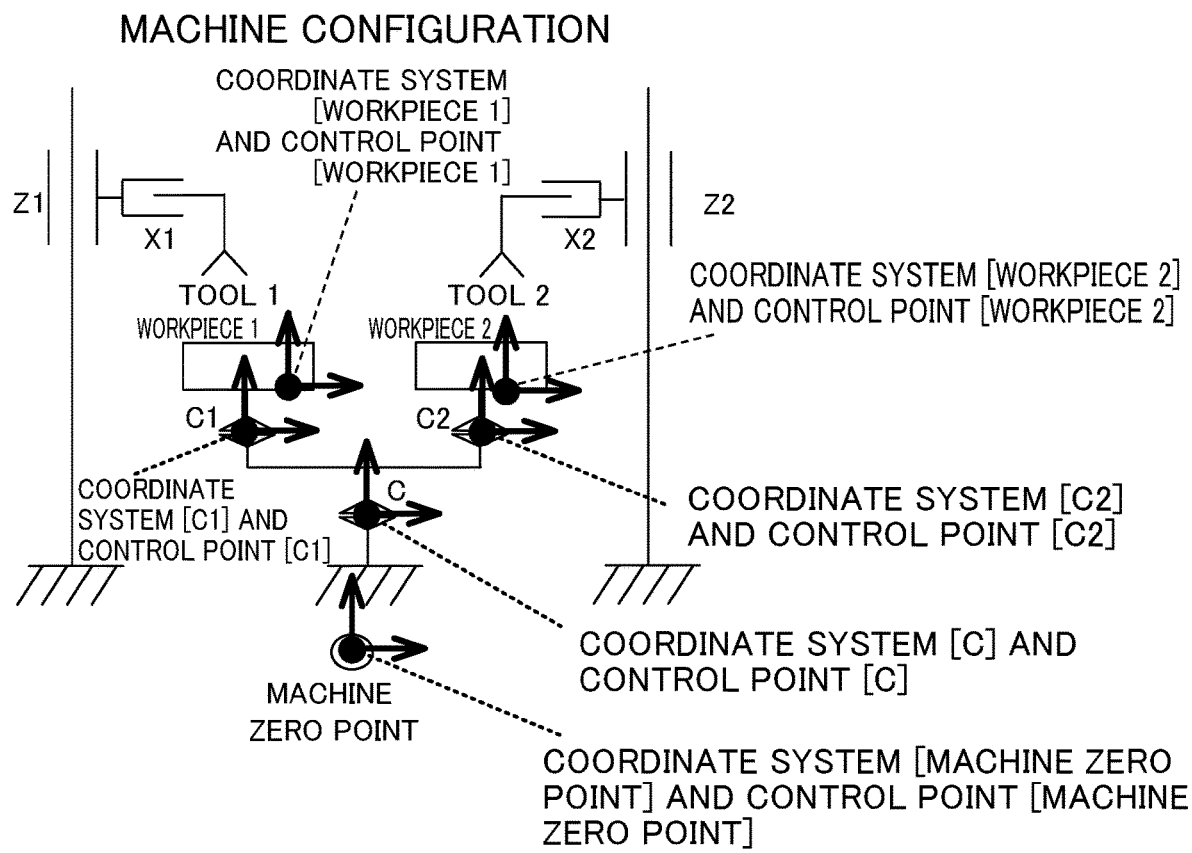
FIG. 21 is a diagram showing an example in which a coordinate system and a control point are inserted to each node of the machine.
Figure 22:
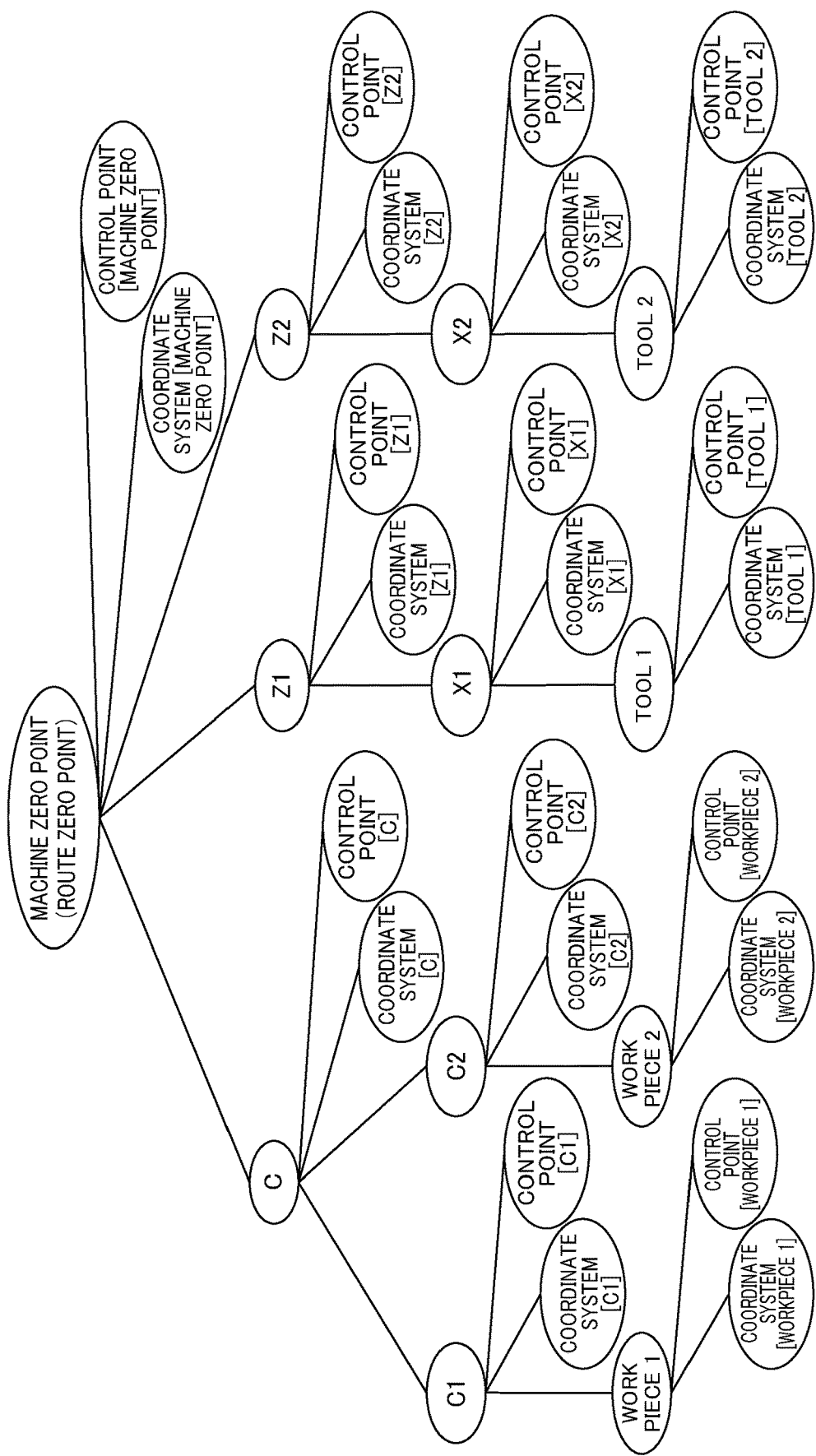
FIG. 22 is a diagram showing an example of a machine configuration tree in which the coordinate system and the control point are inserted.

When a series of nodes that continues from each workpiece to a machine zero point is considered as an example, as shown in FIG. 21, a coordinate system and a control point are automatically inserted to each of the machine zero point, the C axis, the C1 axis, the C2 axis, the workpiece 1, and the workpiece 2. This is performed not only to the table, but also to all of the series of nodes that continues from each tool to the machine zero point, that is, the X1 axis, the X2 axis, the Z1 axis, the Z2 axis, the tool 1, and the tool 2. As a result, as shown in FIG. 22, a control point and a coordinate system corresponding to each node is automatically inserted to all nodes composing the machine configuration tree. Normally, when machining is performed, a coordinate system is designated in a workpiece, and a tool is designated as a control point. Thereby, various cases, for example, when a control point is required to be designated in the workpiece in order to move the workpiece itself to a predetermined position, and when a coordinate system is required to be set in a tool itself in order to polish another tool by one tool, can be dealt with.

Figure 23A:
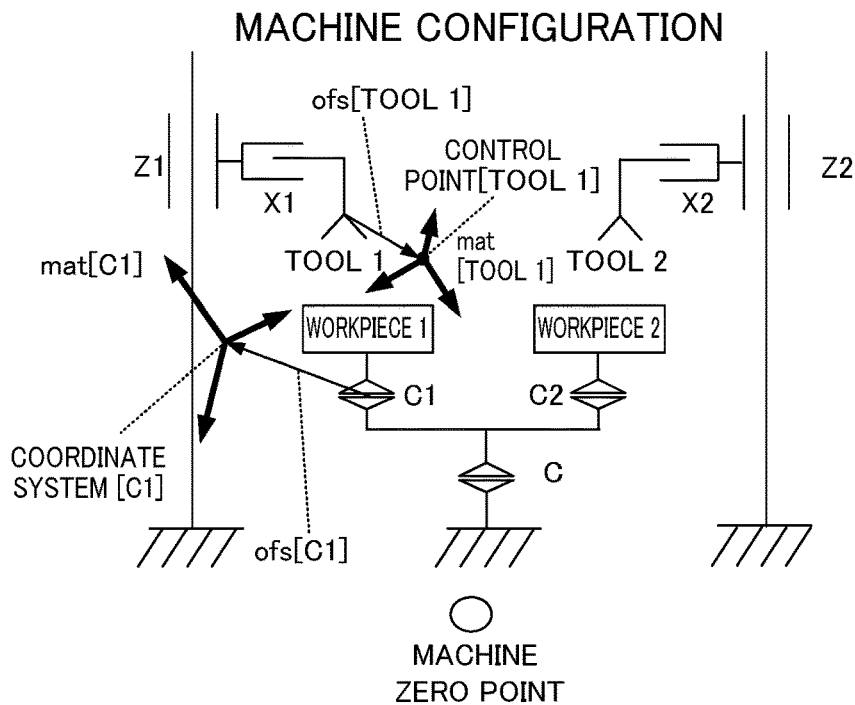
FIG. 23A is a diagram showing an example of the machine in which an offset and a posture matrix are inserted to each node.
Figure 23B:
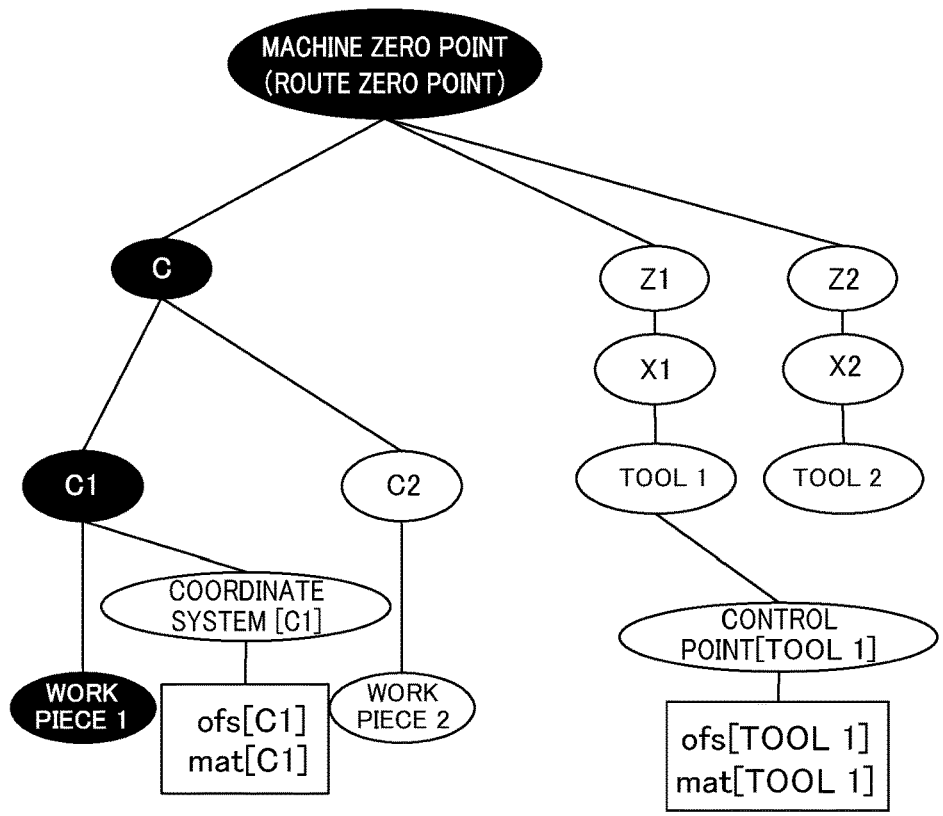
FIG. 23B is a diagram showing an example in which the offset and the posture matrix are inserted to each node of the machine.

As shown in FIG. 23A, each of control point and coordinate system has an offset. Thus, a point apart from a node center can be set to be the control point and the coordinate system zero point. Each of the control points and the coordinate system have a posture matrix. The posture matrix represents a posture (direction and inclination) of the control point when being a posture matrix of the control point, and represents a posture of the coordinate system when being a posture matrix of the coordinate system. In the machine configuration tree shown in FIG. 23B, the offset and the posture matrix are represented in a form associated with corresponding node. Each of the control points and the coordinate system have information on whether the "movement" and the "cross-offset" of the node existing in a path to a route of the machine configuration are added, and can set the "movement" and the "cross-offset".

Figure 24:
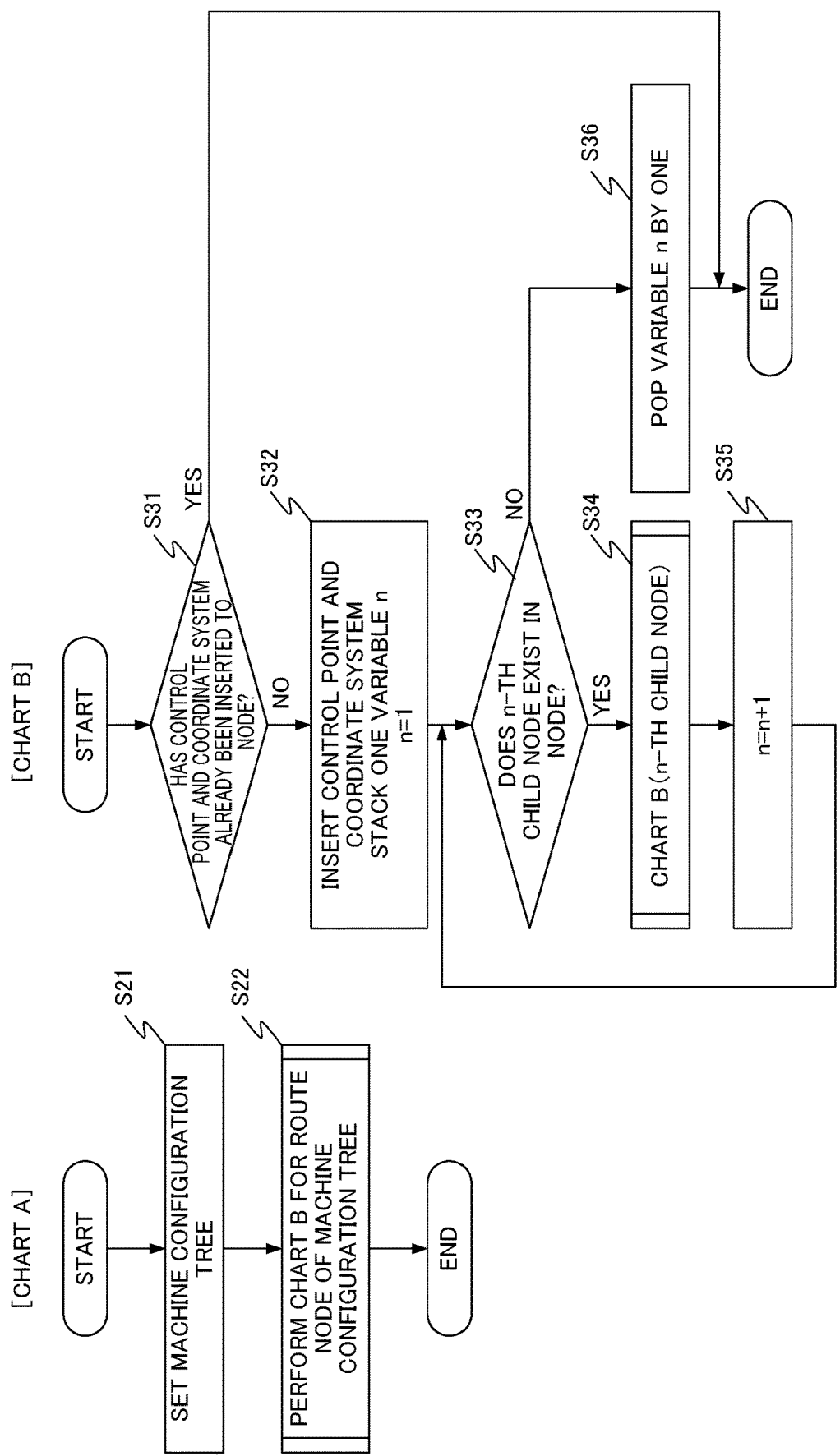
FIG. 24 is a diagram showing generation operation in which the control point is inserted to the machine configuration tree in the embodiment of the present invention.

FIG. 24 shows a flowchart in which the automatic insertion method of the control point described above is generalized. Particularly, this flowchart has a configuration in which a chart A and a chart B are included, and the chart B is performed in a middle of the chart A, as described later.

First, the chart A will be described. At step S21, the graph generation unit 111 sets the machine configuration tree. At step S22, the chart B is performed, and a flow of the chart A ends.

Next, the chart B will be described. At step S31 of the chart B, when the control point and the coordinate system have already been inserted to the node (S31: YES), the flow ends. When the control point and the coordinate system have not inserted to the node (S31: NO), the processing proceeds to step S32.

At step S32, the control point coordinate system insertion unit 112 inserts the control point and the coordinate system to the node, and stacks one variable n. n is set to be n=1.

At step S33, when n-th child node exists in the node (S33: YES), the processing proceeds to step S34. When n-th child node does not exist in the node (S33: NO), the processing proceeds to step S36.

At step S34, for the n-th child node, the chart B itself is recursively performed.

At step S35, n is incremented by only 1. That is, n is set to be n=n+1, and the processing returns to step S33.

At step S36, the variable n is popped by 1, and the flow of the chart B ends.

Figure 25:
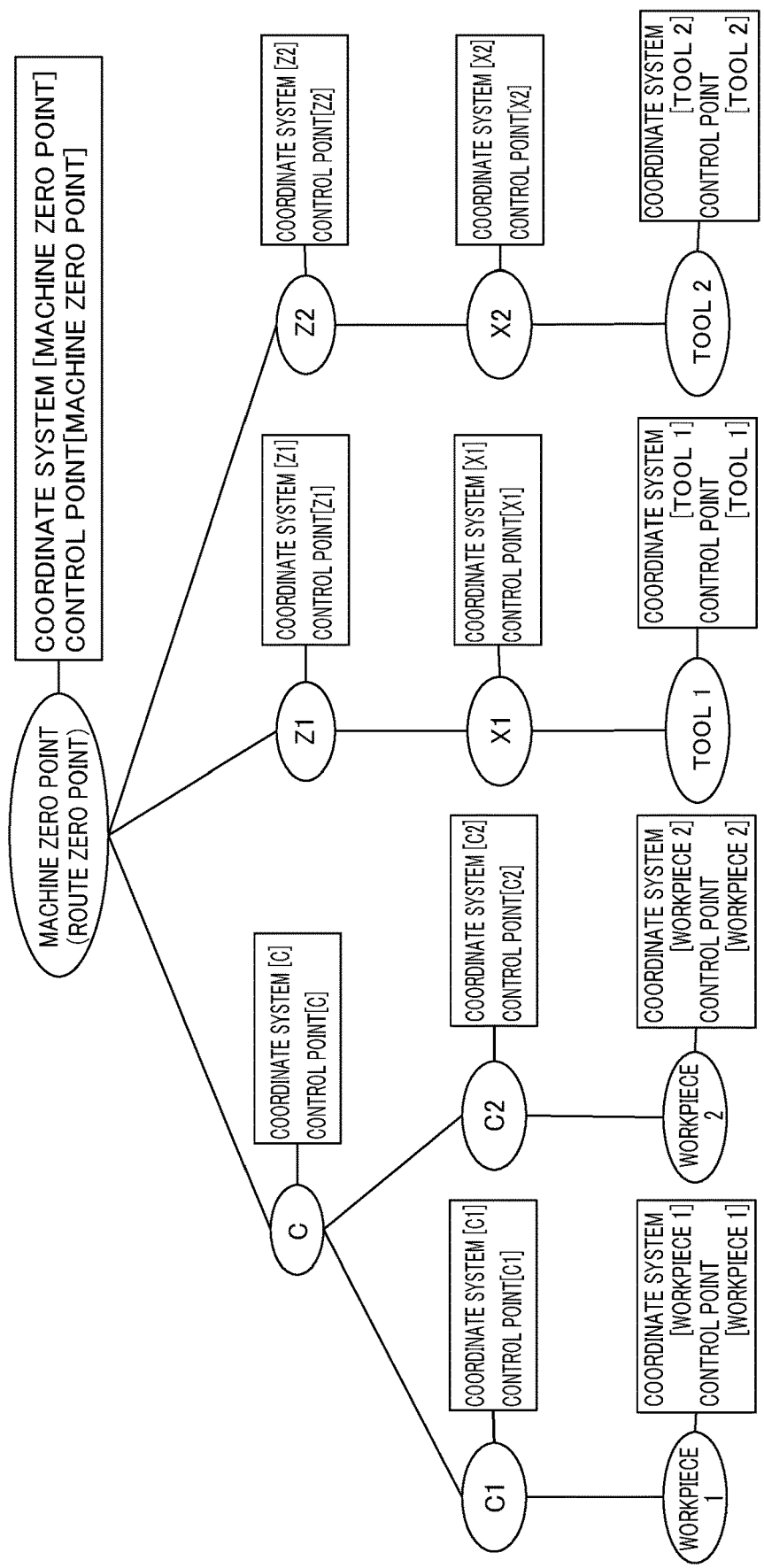
FIG. 25 is a diagram showing an example of the machine configuration tree to which the coordinate system and the control point are inserted in the embodiment of the present invention.

The control point coordinate system insertion unit 112 inserts the control point and the coordinate system to each node of the graph of the machine configuration, as nodes, by the method described above. An example of when the control point and the coordinate system are added as nodes is described above. However, as shown in FIG. 25, an embodiment in which the control point coordinate system insertion unit 112 causes each node of the graph of the machine configuration to have the control point and the coordinate system as information.

[4. Synchronous and Superimposed Control Method]

When the control point of the master is set to be the "first control point", and the control point of the slave is set to be the "second control point", and, in addition, when a "first" is added to each element related to the master, and a "second" is added to each element related to the slave, the synchronous and superimposed control method according to the present invention has a flow of control (hereinafter, also referred to as "flexible synchronous control") using a relationship formula defined in association with the first control point and the second control point, and a flow of control not using the relationship formula. However, in both flows, the synchronous and superimposed control is performed by a method below.

That is, the numerical controller 100 has the machine configuration information of the machine that is the control target, in a graph form, by the method described above. The control point and the coordinate system are defined in all nodes in the graph.

First, the first control point, the first coordinate system, the second control point, and the second coordinate system in the machine configuration graph are designated, and a command of control start is issued. Next, the first command value is imparted to the first control point, and the first each axis movement destination of each axis composing the first control point and the first coordinate system is determined. When the second command value is imparted to the second control point, the second each axis movement destination of each axis composing the second control point and the second coordinate system is determined from the first each axis movement destination and the second command value. Then, movement is performed so that each axis composing the first control point and the first coordinate system is in the first each axis movement destination, and movement is performed so that each axis composing the second control point and second coordinate system is in the second each axis movement destination. The second control point and the second coordinate system may be the same as the first control point and the first coordinate system, respectively, or may be different.

Figure 26:
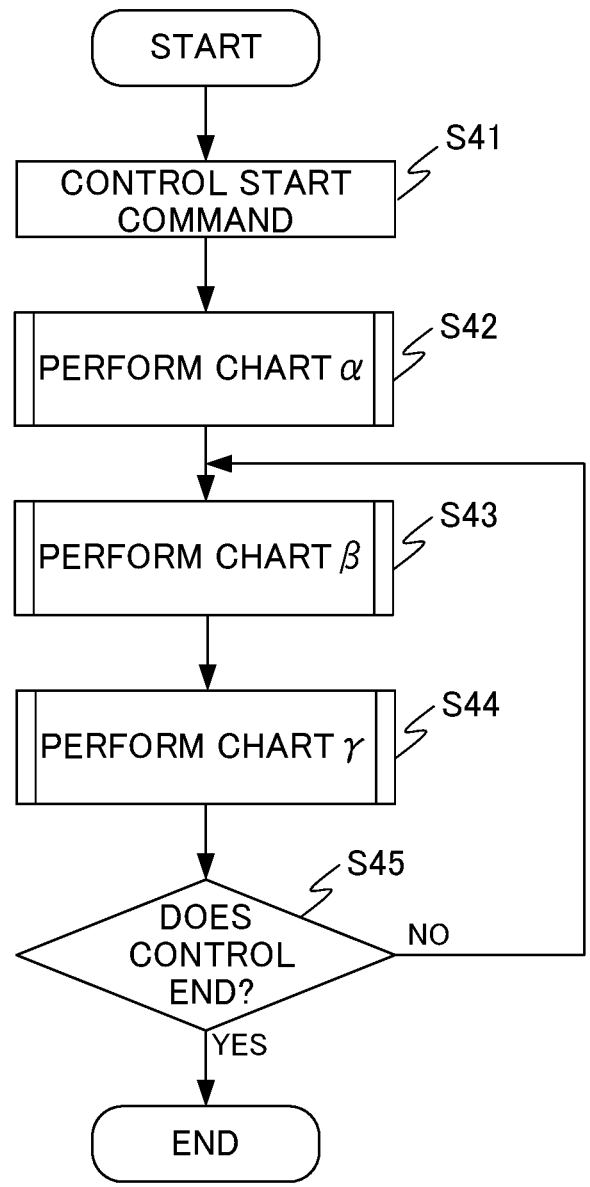
FIG. 26 is a flowchart showing synchronous and superimposed control method in the embodiment of the present invention.

The control method described above will be described in detail with reference to FIG. 26 to FIG. 63B. FIG. 26 is a flowchart in which the control method described above is reflected.

At step S41, a command of start of control is issued. More particularly, the first control point, the first coordinate system, the second control point, and the second coordinate system are designated, a command of control start is issued, and thereby, control is started. The second command value on the second coordinate system may be imparted to the second control point. For the designation of the first control point and the first coordinate system, FIG. 27A shows a sentence example of a command of the control start command. Although it is repeating of description of FIG. 27A, a command content of each line in the program will be described below. The first coordinate system is selected by "G54.0 coordinate system $y_{M0}$" in the first line. The first control point is selected by "G43.0 control point $x_{N0}$" in the second line. Control is started with respect to the first control point on the first coordinate system by "G99.0" in the third line. The first command value is imparted to the first control point, on the first coordinate system by "G01 X_Y_Z_" in the fourth line. Designation of the second control point and the second coordinate system and a control start command with respect to the second control point on the second coordinate system may be performed after the control with respect to the first control point is started.

For the designation of the second control point and the second coordinate system, FIG. 27B shows a sentence example of a command of the control start command. Although it is repeating of description of FIG. 27B, a command content of each line in the program will be described below.

The second coordinate system is selected by "G54.9 coordinate system $y_{M1}$" in the first line. The second control point is selected by "G43.9 control point $x_N$" in the second line. Control is started with respect to the second control point on the second coordinate system by "G99.0" in the third line. The second command value is imparted to the second control point, on the second coordinate system by "G01 X_Y_Z_" in the fourth line.

Otherwise, control may be started after a conversion matrix with respect to the second command value is set (when there is no designation, a unit matrix may be set), as FIG. 27C. Although it is repeating of description of FIG. 27C, a command content of each line in the program will be described below.

The second coordinate system is selected by "G54.9 coordinate system $y_{M1}$" in the first line. The second control point is selected by "G43.9 control point $x_N$" in the second line. A position changing matrix $M_M$ is set by "G99.6 [1, 0, 0, 0][0, 1, 0, 0,][0, 0, −1, 0][0, 0, 0, 1]" in the third line. A posture changing matrix $M_P$ is set by "G99.7 [1, 0, 0, 0][0, 1, 0, 0,][0, 0, −1, 0][0, 0, 0, 1]" in the fourth line. Control is started with respect to the second control point on the second coordinate system by "G99.0" in the fifth line. The second command value is imparted to the second control point, on the second coordinate system by "G01 X_Y_Z_" in the sixth line.

Otherwise, the first command value imparted to the first control point may be set to the second command value on the second coordinate system, with respect to the second control point, as FIG. 27D. Although it is repeating of description of FIG. 27D, a command content of each line in the program will be described below.

The second coordinate system is selected by "G54.9 coordinate system $y_{M1}$" in the first line. The second control point is selected by "G43.9 control point $x_N$" in the second line. A command on the first coordinate system $Y_{M2}$, with respect to the first control point $Z_L$ is set to be the second command value by "G99.8 control point $Z_L$ coordinate system $y_{M2}$" in the third line. Control is started with respect to the second control point on the second coordinate system by "G99.9" in the fourth line. In this line, even when there is no command value, the first command value is automatically set to be the second command value.

At step S42, the elements relationship setting unit 113 performs a chart α. At step S43, the elements relationship output calculation unit 114 performs a chart β. At step S44, the elements relationship control unit 115 performs a chart γ. At step S45, when the control ends (S45: YES), the processing ends. When the control does not end (S45: NO), the processing returns to step S43.

Figure 28:
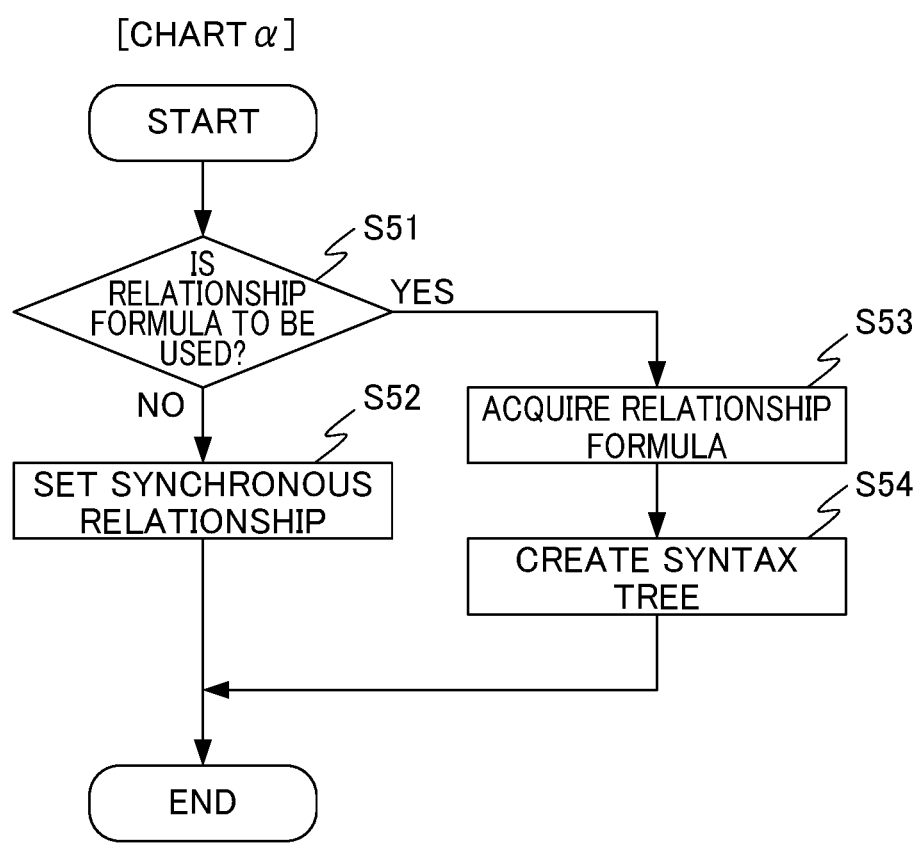
FIG. 28 is a flowchart showing the synchronous and superimposed control method in the embodiment of the present invention.

FIG. 28 shows a flow of the chart α. At step S51, when the relationship formula is not used (S51: NO), the processing proceeds to step S52. At step S51, when the relationship formula is used (S51: YES), the processing proceeds to step S53. At step S52, the elements relationship setting unit 113 sets a synchronous relationship by setting the first control point imparted in the command to be the first element, and the second control point to be the second element, and the processing of the chart α ends. When the relationship formula is not used, in a flowchart hereafter, whether it is synchronous control or superimposed control is determined by presence of the second command value. However, the control may be determined by a command such as "control start <synchronous>" or "control start <superimposed>". At step S53, the elements relationship setting unit 113, acquires a relationship formula designated by a command, for example, "control start <relationship formula 0001>", and the processing proceeds to step S54. At step S54, the elements relationship setting unit 113 creates the syntax tree from the relationship formula, and the processing of the chart α ends. Details of steps S53 and S54 described above will be described later.

Figure 29:
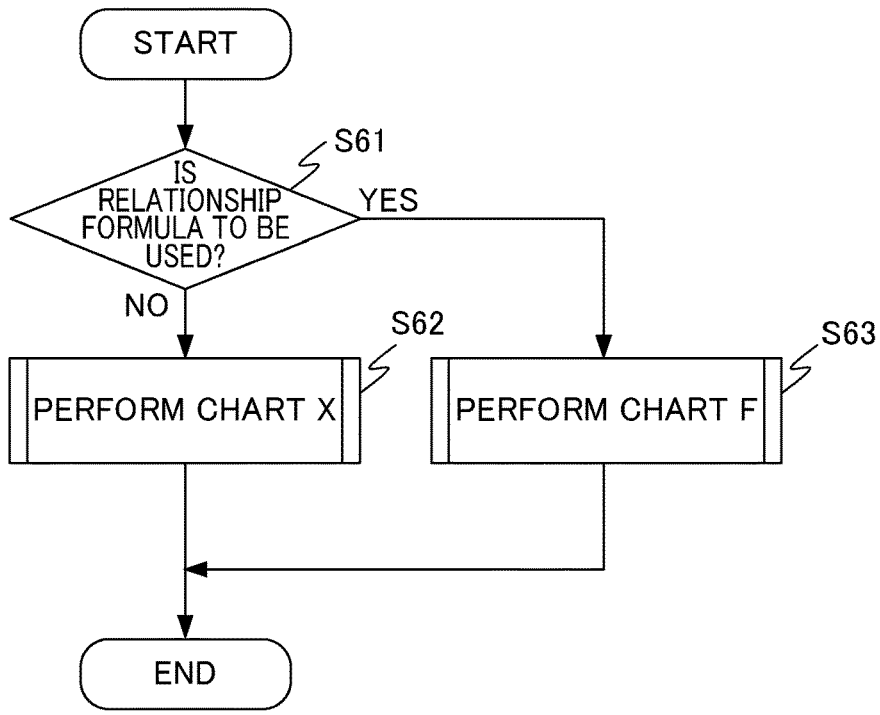
FIG. 29 is a flowchart showing the synchronous and superimposed control method in the embodiment of the present invention.

FIG. 29 shows a flow of the chart β. At step S61, when the relationship formula is not used (S61: NO), the processing proceeds to step S62. At step S61, when the relationship formula is used (S61: YES), the processing proceeds to step S63. At step S62, the elements relationship output calculation unit 114 performs a chart X, and the processing of the chart β ends. At step S63, the elements relationship output calculation unit 114 performs a chart F, and the processing of the chart ends.

Figure 30:
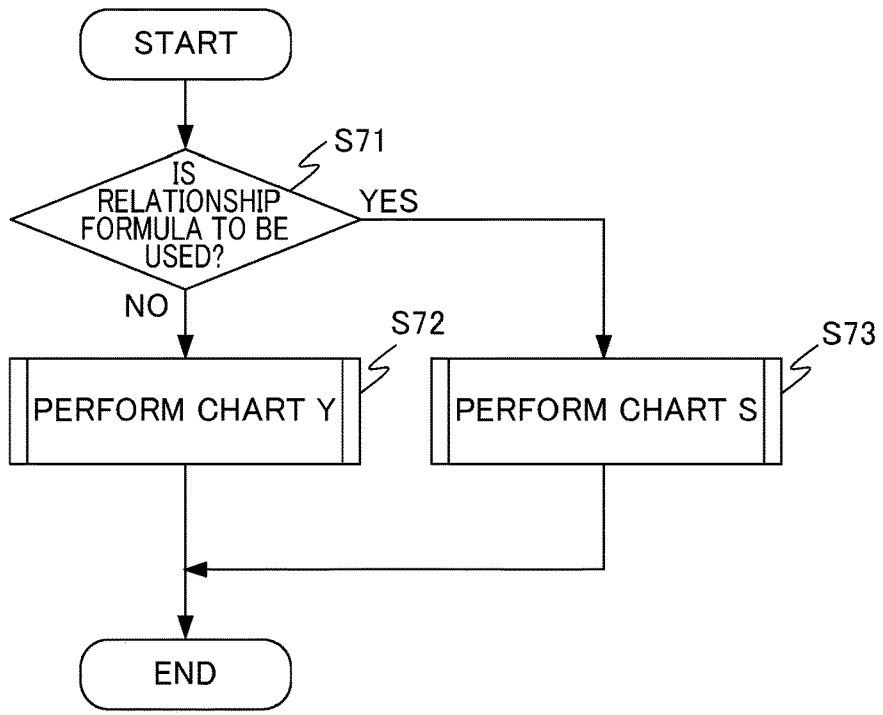
FIG. 30 is a flowchart showing the synchronous and superimposed control method in the embodiment of the present invention.

FIG. 30 shows a flow of the chart γ. At step S71, when the relationship formula is not used (S71: NO), the processing proceeds to step S72. At step S71, when the relationship formula is used (S71: YES), the processing proceeds to step S73. At step S72, the elements relationship control unit 115 performs a chart Y, and the processing of the chart γ ends. At step S73, the elements relationship control unit 115 performs a chart S, and the processing of the chart γ ends.

In a flowchart described in FIG. 26, the chart α is performed at step S42, the chart β is performed at step S43, and the chart γ is performed at step S44. However, embodiments of the present invention are not limited thereto. For example, when the relationship formula is not used, after the elements relationship output calculation unit 114 performs a flow of part of the chart X in the chart β, the elements relationship control unit 115 may perform a flow of part of the chart Y in the chart γ, and then the elements relationship output calculation unit 114 may perform another flow of the chart X in the chart β. Similarly, when the relationship formula is used, after the elements relationship output calculation unit 114 performs a flow of part of the chart F in the chart β, the elements relationship control unit 115 may perform flows of part of the chart S in the chart γ, and then, the elements relationship output calculation unit 114 may perform another flow of the chart F in the chart β.

[4.1 Control of when Relationship Formula is not Used]

[4.1.1 Operation Flow]

As described above, when the relationship formula is not used, after step S41 is performed, and steps S51, S52 of the chart α are performed, the chart X is performed in step S62 of the chart β, and the chart Y is performed in step S72 of the chart γ.

Figure 31:
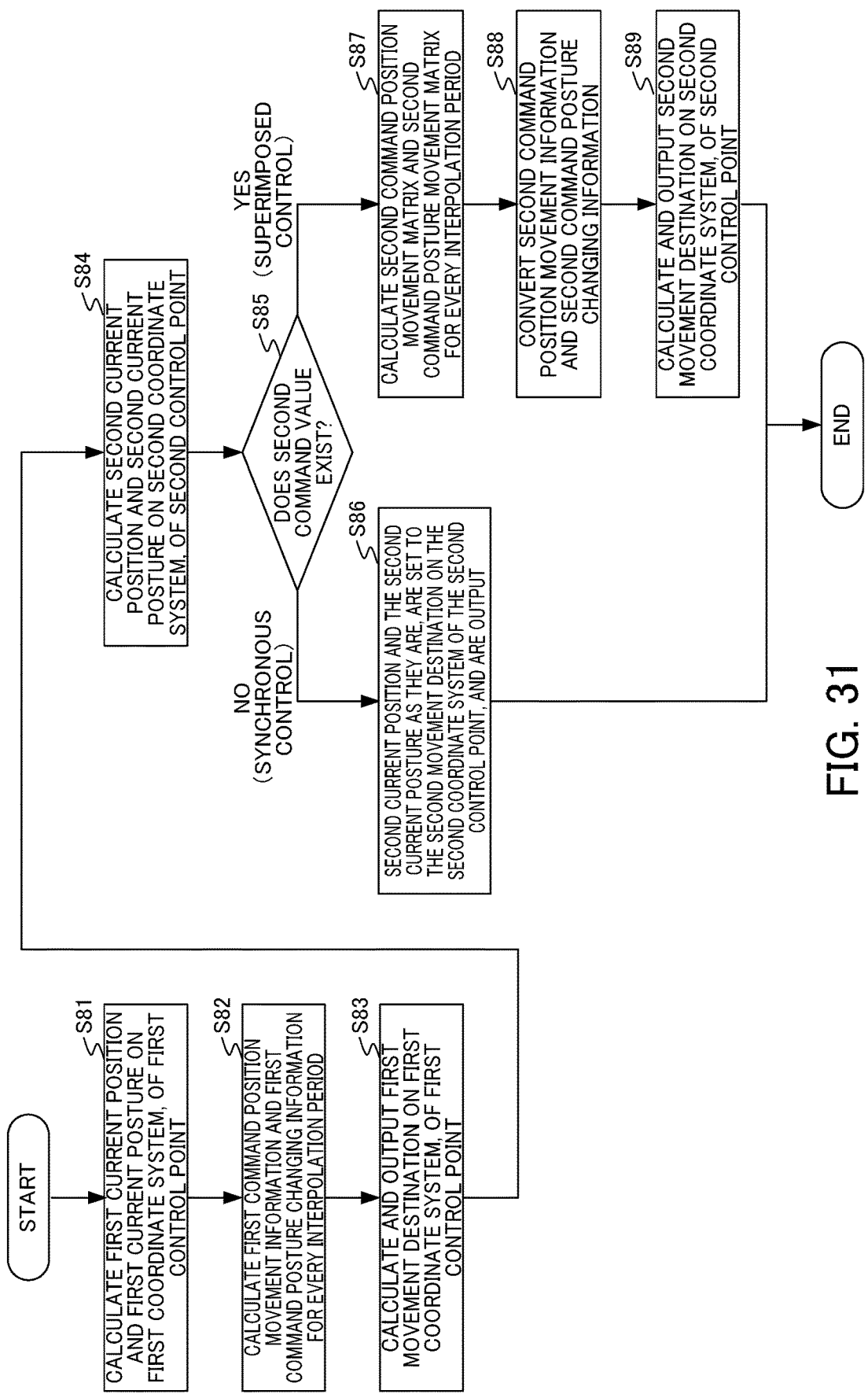
FIG. 31 is a flowchart showing the synchronous and superimposed control method in the embodiment of the present invention.

FIG. 31 shows a flow of the chart X. At step S81, the first current position calculation unit 151 calculates the first current position on the first coordinate system of the first control point, and the first current posture calculation unit 152 calculates the first current posture on the first coordinate system of the first control point.

Figure 32A:
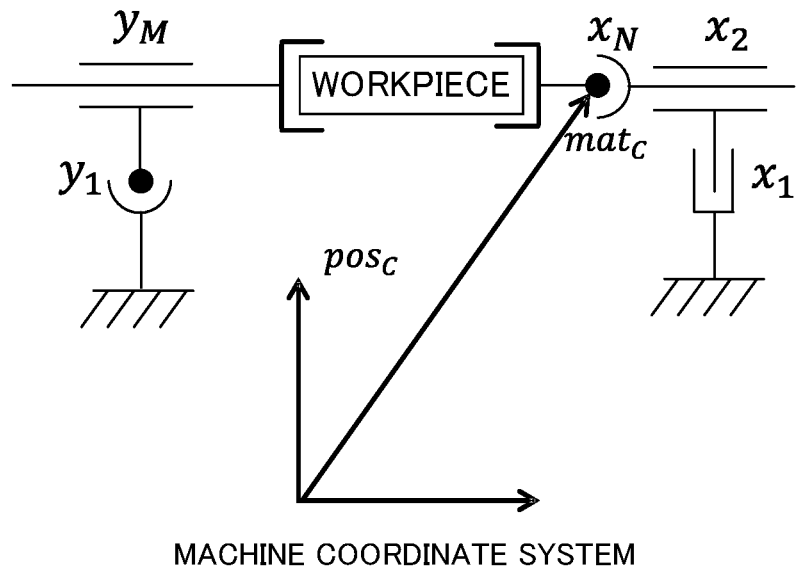
FIG. 32A is a machine configuration example in the embodiment of the present invention.
Figure 32B:
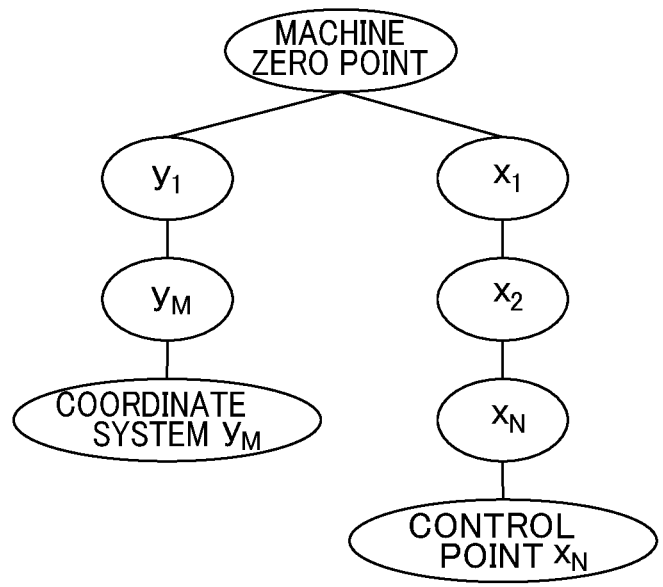
FIG. 32B is a setting example of the machine configuration tree in the embodiment of the present invention.
Figure 33A:
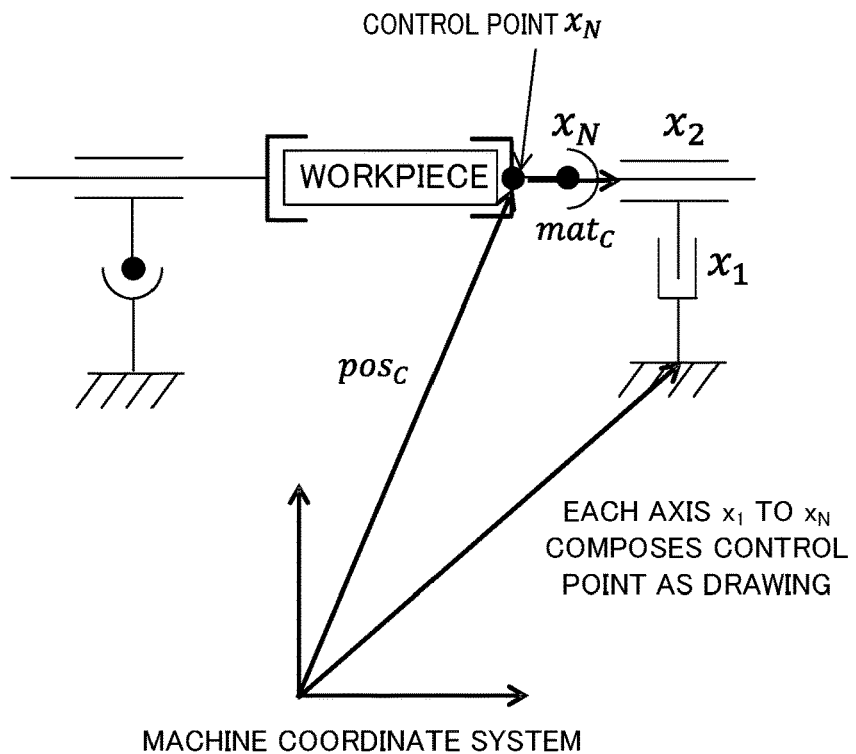
FIG. 33A is a machine configuration example in the embodiment of the present invention.
Figure 33B:
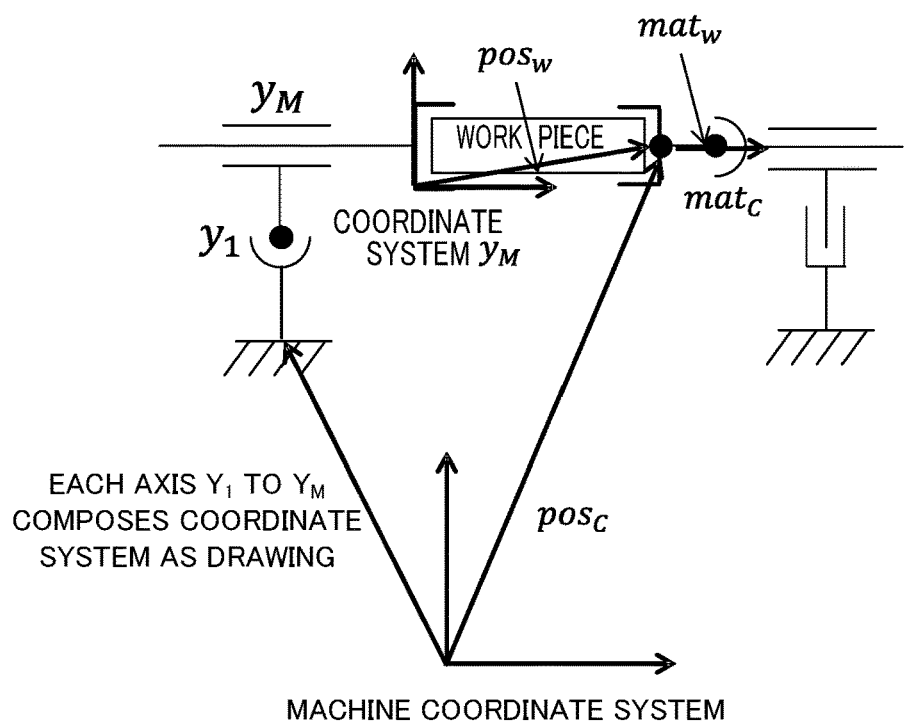
FIG. 33B is a machine configuration example in the embodiment of the present invention.

More particularly, for example, when the machine configuration tree is set as FIG. 32B, with respect to the machine as FIG. 32A, and a control point $x_N$ is designated as the control point and a coordinate system $y_M$ is designated as the coordinate system, as shown in FIG. 33A and FIG. 33B, each axis $x_1$ to $x_N$ compose the control point, and each axis $y_1$ to $y_M$ composes the coordinate system. At this time, a control point position $pos_c$ and a control point posture $mat_c$ with respect to the route of the machine configuration tree (machine coordinate system) of the designated control point are determined from each axis position composing the control point, generally by the formulae below.

$$pos_c = \left\{ \prod_{i=1}^{N} T(ofs_{x_i}, \text{offset}_{x_i}) S(x_i, d_{x_i}, v_{x_i}, \text{move}_{x_i}) \right\} ofs_{[ctrl]} \quad \text{[Formula 3]}$$

$$mat_c = \left\{ \prod_{i=1}^{N} S'(x_i, d_{x_i}, v_{x_i}, \text{move}_{x_i}) \right\} mat_{[ctrl]} \quad \text{[Formula 4]}$$

Meaning of symbols are as below.

$$\prod_{i=1}^{n} M_i = M_1 M_2 \ldots M_n \quad \text{[Formula 5]}$$

$ofs_{x_i}$: the cross-offset of the node $x_i$;
$\text{offset}_{x_1}$: whether the cross-offset of the node $x_i$ is added;
$d_{x_i}$: a flag that determines whether the node $x_i$ is a straight axis or a rotary axis;
$v_{x_i}$: an axis direction of the node $x_i$;
$\text{move}_{x_i}$: whether movement of the node $x_i$ is added;
$ofs_{[ctrl]}$ the crossing matrix of the control point;
$mat_{[ctrl]}$: the posture matrix of the control point;
T(ofs, 0): a unit matrix;
T(ofs, 1): a parallel movement matrix for ofs;
S(x, *, v, 0): a unit matrix;
S(x, straight, v, 1): a parallel movement matrix of moving by x in a direction v; and
S(x, rotation, v, 1): a rotation movement matrix of rotating by x around the direction v.

The control point position pose and the control point posture $mat_c$ with respect to the route of the machine configuration tree (machine coordinate system) determined as above can be converted to a control point position $pos_w$ and a control point posture $mat_w$ with respect to the designated coordinate system by the formulae below.

$$pos_w = T(-ofs_{coord}, \text{offset}_{coord}) \quad \text{[Formula 6]}$$

$$\left\{ \prod_{i=1}^{M-1} S(-y_{M-i}, d_{y_{M-i}}, v_{y_{M-i}}, \text{move}_{y_{M-i}}) \right.$$

$$\left. T(-ofs_{y_{M-i}}, \text{offset}_{y_{M-i}}) \right\} pos_c$$

$$mat_W = \left\{ \prod_{i=1}^{M-1} S(-y_{M-i}, d_{y_{M-i}}, v_{y_{M-i}}, \text{move}_{y_{M-i}}) \right\} mat_C \quad \text{[Formula 7]}$$

Meaning of symbols are as below.

$ofs_{[coord]}$: the cross-offset of the coordinate system; and
$mat_{[coord]}$: the posture matrix of the coordinate system;

Accordingly, the current position and the current posture in the designated coordinate system can be determined from each axis position of the designated control point and the coordinate system, by the calculation up to here. The first current position and the first current posture on the first coordinate system of the first control point can be determined by this method.

Even when the machine configuration tree is not set, similar calculation can be performed by considering a correspondence relationship between the machine configuration and the axis as fixed relationship, and selecting from the control point and the coordinate system that are fixed.

At step S82, the first interpolation information generation unit 153 calculates the first command position movement matrix and the first command posture movement matrix for every interpolation period, for the first command value on the first coordinate system imparted to the first control point.

More particularly, when a current position matrix in a designated coordinate system of a designated control point is set to be $M_{pos1}$, and next interpolation position matrix is set to be $M_{pos2}$, a command position movement matrix $M_{pos}$ is represented by a parallel movement matrix below.

$$M_{pos} = M_{pos2} M_{pos1}^{-1} \quad \text{[Formula 8]}$$

When the current posture matrix in the designated coordinate system of the designated control point is set to be $M_{mat1}$, and next interpolation posture matrix is set to be $M_{mat2}$, the command posture changing matrix $M_{mat}$ is represented by the matrix below.

$$M_{mat} = M_{mat2} M_{mat1}^{-1} \quad \text{[Formula 9]}$$

$M_{pos1}$, $M_{pos2}$, $M_{mat1}$, and $M_{mat2}$ are defined as below by the current position, the current posture, and next interpolation position and next interpolation posture determined at step S81.

$$M_{pos1} = \begin{pmatrix} 1 & 0 & 0 & \\ 0 & 1 & 0 & \vec{p_1} \\ 0 & 0 & 1 & \\ 0 & 0 & 0 & 1 \end{pmatrix} \quad M_{mat1} = \begin{pmatrix} & & & 0 \\ & U_1 & & 0 \\ & & & 0 \\ 0 & 0 & 0 & 1 \end{pmatrix} \quad \text{[Formula 10]}$$

$$M_{pos2} = \begin{pmatrix} 1 & 0 & 0 & \\ 0 & 1 & 0 & \vec{p_2} \\ 0 & 0 & 1 & \\ 0 & 0 & 0 & 1 \end{pmatrix} \quad M_{mat2} = \begin{pmatrix} & & & 0 \\ & U_2 & & 0 \\ & & & 0 \\ 0 & 0 & 0 & 1 \end{pmatrix}$$

-continued $\vec{p_1}$ : Current position of first control point $\vec{p_2}$ : Next interpolation position of first control point $U_1$: Current position of first control point $U_2$: Next interpolation posture of first control point Details of the calculation method of next interpolation position and next interpolation posture will be described in "4.1.2 Calculation method of next interpolation position and next interpolation posture" below.

At step S83, the first control point movement destination generation unit 131 calculates and outputs the first movement destination on the first coordinate system of the first control point from the first current position, the first current posture, the first command position movement matrix, and the first command posture movement matrix.

More particularly, next interpolation position $M_{pos}$ and next interpolation posture $M_{mat}$ on the first coordinate system are determined by the formula below from the current position $pos_w$ and the current posture $mat_w$ on the first coordinate system of the first control point, and the first command position movement matrix $M_{pos}$, the first command posture changing matrix $M_{mat}$, determined at step S82.

$$pos = M_{pos}pos_w$$

$$mat = M_{mat}mat_w \quad \text{[Formula 11]}$$

At step S84, the second current position calculation unit 161 calculates the second current position on the second coordinate system of the second control point, and the second current posture calculation unit 162 calculates the second current posture on the second coordinate system of the second control point.

More particularly, the second current position and the second current posture on the second coordinate system of the second control point are acquired by a similar method as step S81.

At step S85, when there is no second command value (S85: NO), the processing proceeds to step S86 for synchronous control. At step S85, when there is a second command value (S85: YES), the processing proceeds to step S87 for superimposed control.

At step S86, the second current position and the second current posture as they are, are set to the second movement destination on the second coordinate system of the second control point, and are output.

At step S87, the second interpolation information generation unit 163 calculates the second command position movement matrix and the second command posture movement matrix for every interpolation period, for the second command value on the second coordinate system imparted to the second control point.

More particularly, the second command position movement matrix and the second command posture movement matrix are acquired by a similar method as step S82.

At step S88, the second command position movement information conversion unit 181 converts the second command position movement matrix by a position conversion matrix $M_M$, and the second command posture changing information conversion unit 182 coverts the second command posture changing matrix by the posture conversion matrix $M_P$.

More particularly, the second command position movement information conversion unit 181 converts the second command position movement matrix by the position conversion matrix $M_M$, and the second command posture changing information conversion unit 182 converts the second command posture changing matrix by the posture conversion matrix $M_P$, by the formula below.

$$M_{pos}' = M_P M_{pos} M_P^{-1}$$

$$M_{mat}' = M_M M_{mat} M_M^{-1} \quad \text{[Formula 12]}$$

At step S89, the second control point movement destination generation unit 132 calculates the second movement destination on the second coordinate system of the second control point from the second current position, the second current posture, the second command position movement matrix, and the second command posture movement matrix.

More particularly, next interpolation position pose and next interpolation posture mate are determined by the formula below from the second current position $pos_{w2}$ and the second current posture $mat_{w2}$ determined at step S84, the second command position movement matrix $M_{pos}'$ and the second command posture changing matrix $M_{mat}'$ determined at S88.

$$pos_2 = M_{pos}'pos_{w2}$$

$$mat_2 = M_{mat}'mat_{w2} \quad \text{[Formula 13]}$$

Figure 34:
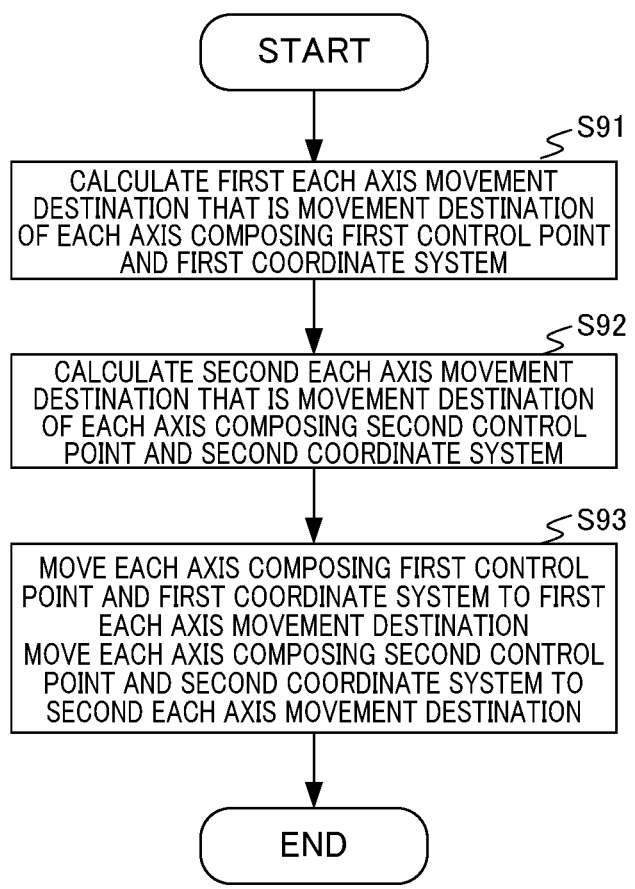
FIG. 34 is a flowchart showing a synchronous and superimposed control method in the embodiment of the present invention.

FIG. 34 shows a flow of the chart Y. At step S91, the first each axis movement destination generation unit 141 calculates the first each axis movement destination of each axis composing the first control point and the first coordinate system from the first movement destination on the first coordinate system of the first control point.

More particularly, the simultaneous equation below is satisfied for next interpolation position pos on the first coordinate system of the first control point, next interpolation posture mat, the each axis coordinate value $x_i$ of the first control point, the each axis coordinate value $y_i$ of the first coordinate system, and the interpolation position poste with respect to the route of the machine configuration tree (machine coordinate system) of the first control point.

$$\left\{\prod_{i=1}^{N} T(ofs_{x_i}, \text{offset}_{x_i}) S(x_i, d_{x_i}, v_{x_i}, \text{move}_{xi})\right\} ofs_{ctrl} = \quad \text{[Formula 14]}$$

$$\left\{\prod_{i=1}^{M} T(ofs_{y_i}, \text{offset}_{y_i}) S(y_i, d_{y_i}, v_{y_i}, \text{move}_{yi})\right\}$$

$$T(ofs_{coord}, \text{offset}_{coord}) pos$$

$$\left\{\prod_{i=1}^{N} S(x_i, d_{x_i}, v_{x_i}, \text{move}_{xi})\right\} mat_{ctrl} = \quad \text{[Formula 15]}$$

$$\left\{\prod_{i=1}^{M} S(y_i, d_{y_i}, v_{y_i}, \text{move}_{yi})\right\} mat$$

The each axis coordinate value $x_i$ of the first control point and the each axis coordinate value $y_i$ of the first coordinate system can be determined by solving the simultaneous equation described above. A solution to the simultaneous equation is acquired by determining Gröbner basis. Details are described later in "4.1.2 Calculation method of next interpolation position and next interpolation posture" below.

At step S92, the second each axis movement destination generation unit 142 calculates the second each axis movement destination of the second control point and the second coordinate system from the second movement destination on the second coordinate system of the second control point and the first each axis movement destination of the first control point.

More particularly, as similar to step S91, the second each axis movement destination can be determined by setting a simultaneous equation for the second control point and the second coordinate system, and solving the simultaneous equation. When the first each axis movement destinations are included in the second control point and the second coordinate system, the first each axis movement destinations are used as a solution of the simultaneous equation, and a solution is determined for each axis other than the first each axis movement destinations.

At step S93, the first movement performing unit 143 moves each axis composing the first control point and the first coordinate system to the first each axis movement destination, and the second movement performing unit 144 moves each axis composing the second control point and the second coordinate system to the second each axis movement destination.

[4.1.2 Calculation Method of Next Interpolation Position and Next Interpolation Posture]

Figure 35:
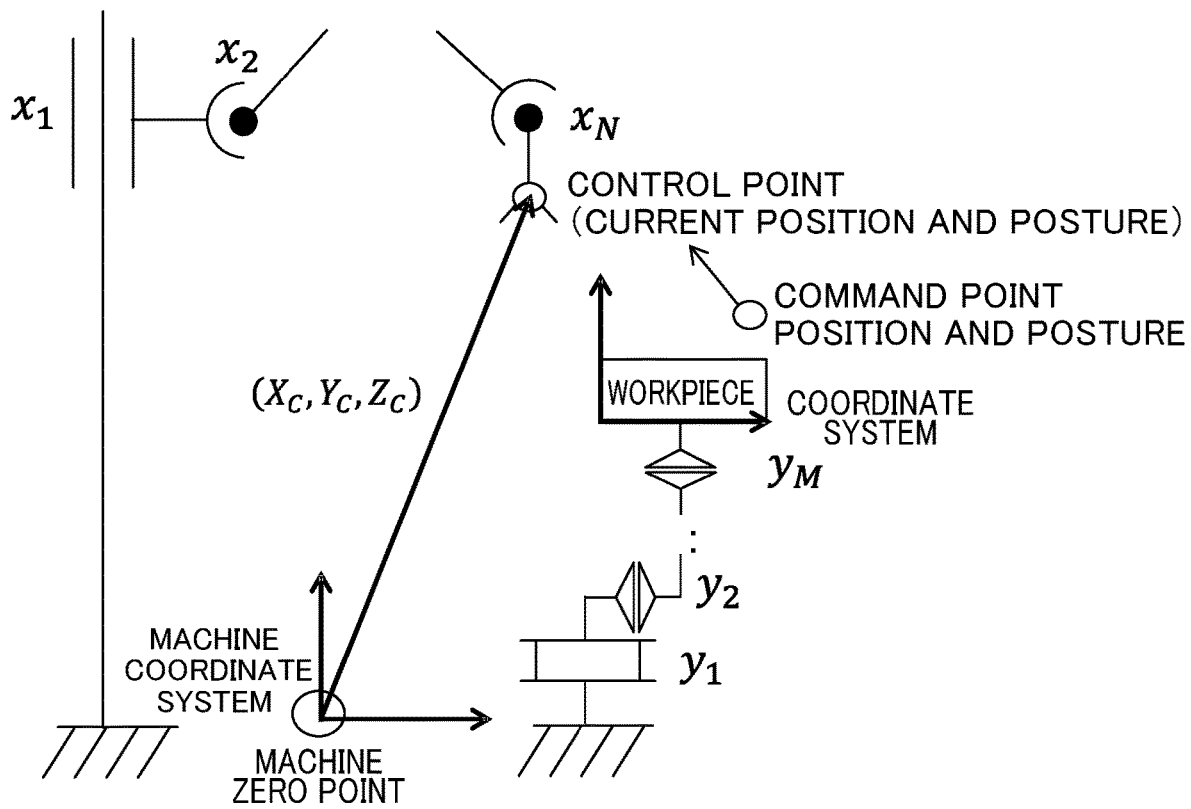
FIG. 35 is an explanation diagram of a calculation method of next interpolation position and next interpolation posture in the embodiment of the present invention.

In FIG. 35, a control point current position $(X_c, Y_c, Z_c)$ in the machine coordinate system is determined by the formula below.

$$(X_C, Y_C, Z_C) = \left\{ \prod_{i=1}^{N} T(ofs_{x_i}) S(x_i, d_{x_i}, v_{x_i}) \right\} ofs_{ctrl} \quad \text{[Formula 16]}$$

Meaning of symbols are as below. T(ofs): the parallel movement matrix for ofs; and
S(x, straight, v): the parallel movement matrix of moving by x in the direction v; and
S(x, rotation, v): the rotation movement matrix of rotating by x around the direction v.

Figure 36:
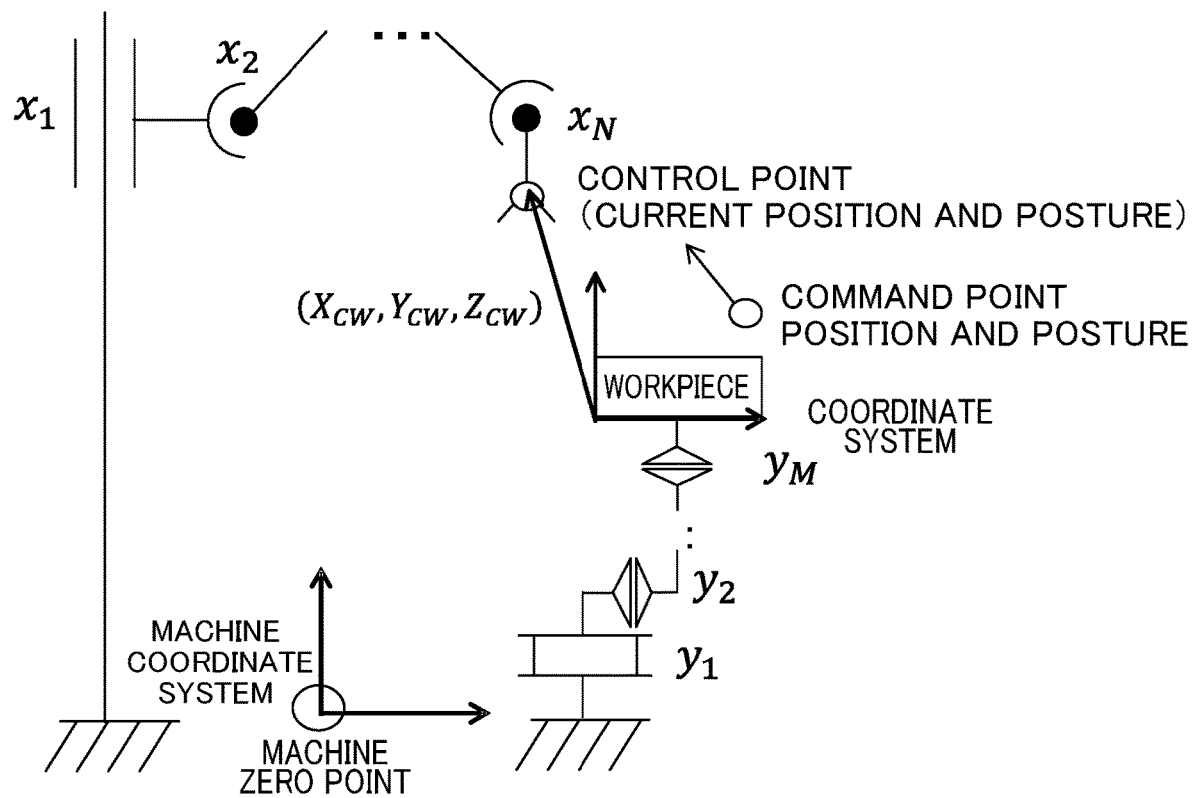
FIG. 36 is an explanation diagram of the calculation method of next interpolation position and next interpolation posture in the embodiment of the present invention.

In FIG. 36, a control point current position $(X_{CW}, Y_{CW}, Z_{CW})$ in the designated coordinate system is determined by the formula below by using $(X_C, Y_C, Z_C)$.

$$(X_{CW}, Y_{CW}, Z_{CW}) = T(-ofs_{coord}) \quad \text{[Formula 17]}$$

$$\left\{ \prod_{i=0}^{M-1} S(-y_{M-i}, d_{y_{M-i}}, v_{y_{M-i}}) T(-ofs_{y_{M-i}}) \right\} (X_C, Y_C, Z_C)$$

Figure 37:
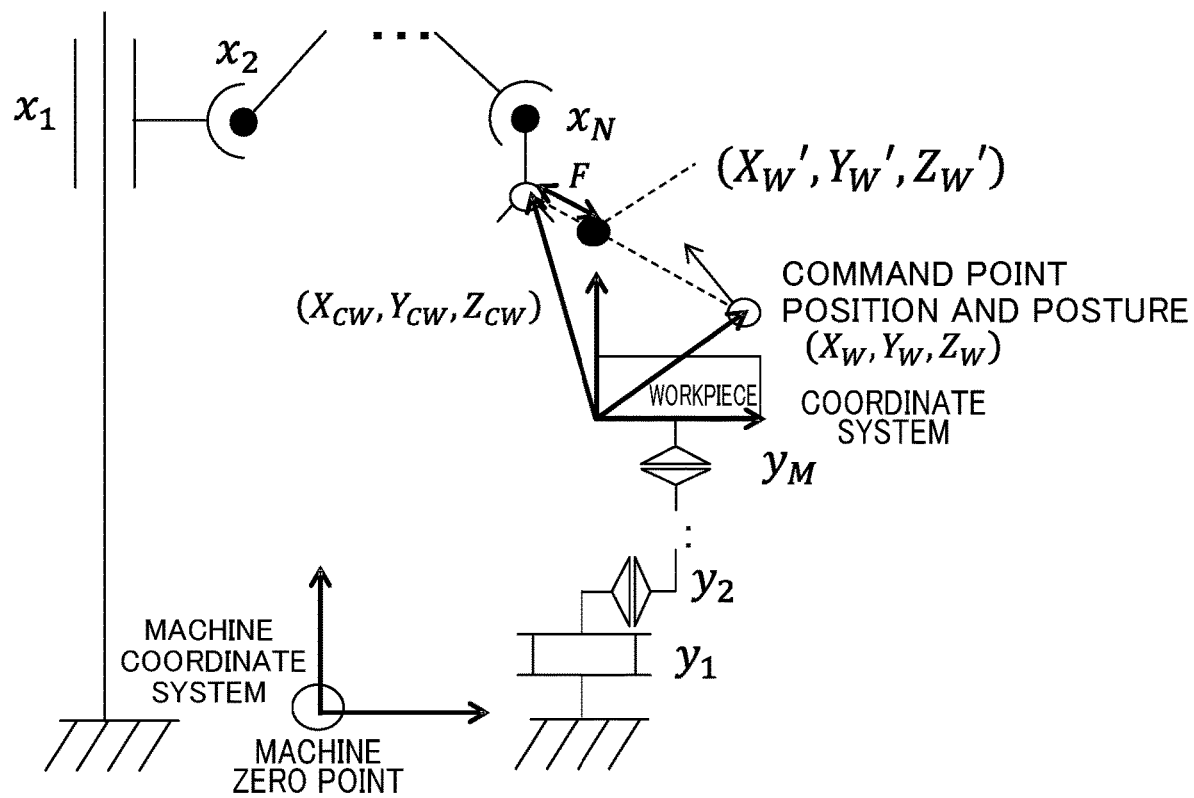
FIG. 37 is an explanation diagram of the calculation method of next interpolation position and next interpolation posture in the embodiment of the present invention.

In FIG. 37, next interpolation position $(X_W', Y_W', Z_W')$ in the designated coordinate system is determined by the formula below by using $(X_{CW}, Y_{CW}, Z_{CW})$.

$$(X_W', Y_W', Z_W') = (X_{CW}, Y_{CW}, Z_{CW}) + \quad \text{[Formula 18]}$$
$$F \frac{(X_W, Y_W, Z_W) - (X_{CW}, Y_{CW}, Z_{CW})}{\|(X_W, Y_W, Z_W) - (X_{CW}, Y_{CW}, Z_{CW})\|}$$

Meaning of symbols are as below. F: Movement speed for every interpolation period.

Figure 38:
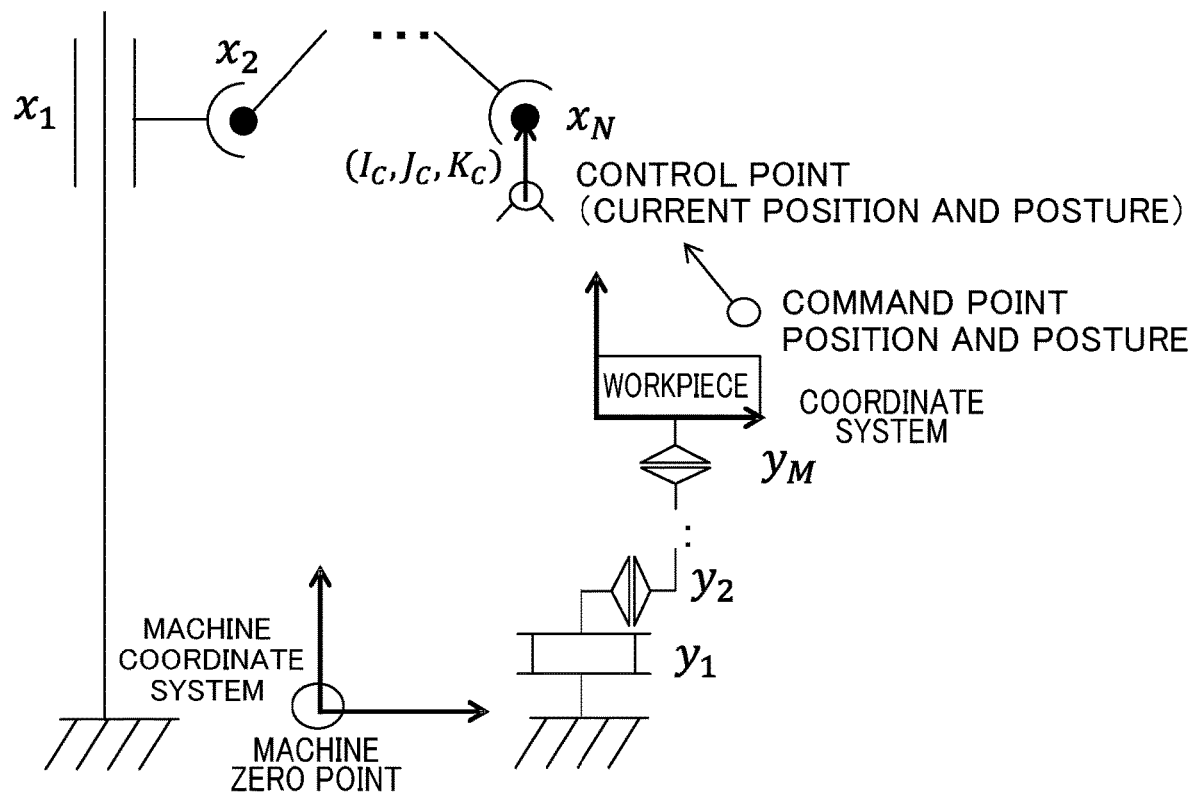
FIG. 38 is an explanation diagram of the calculation method of next interpolation position and next interpolation posture in the embodiment of the present invention.

In FIG. 38, a control point current posture $(I_C, J_C, K_C)$ in the machine coordinate system is determined by the formula below.

$$(I_C, J_C, K_C) = \left\{ \prod_{i=1}^{N} S'(x_i, d_{x_i}, v_{x_i}) \right\} v_{ctrl} \quad \text{[Formula 19]}$$

Meaning of symbols are as below. S'(x, straight, v): a unit matrix (nothing is performed); and
S'(x, rotation, v): a rotation movement matrix of rotating by x around the direction v.

Figure 39:
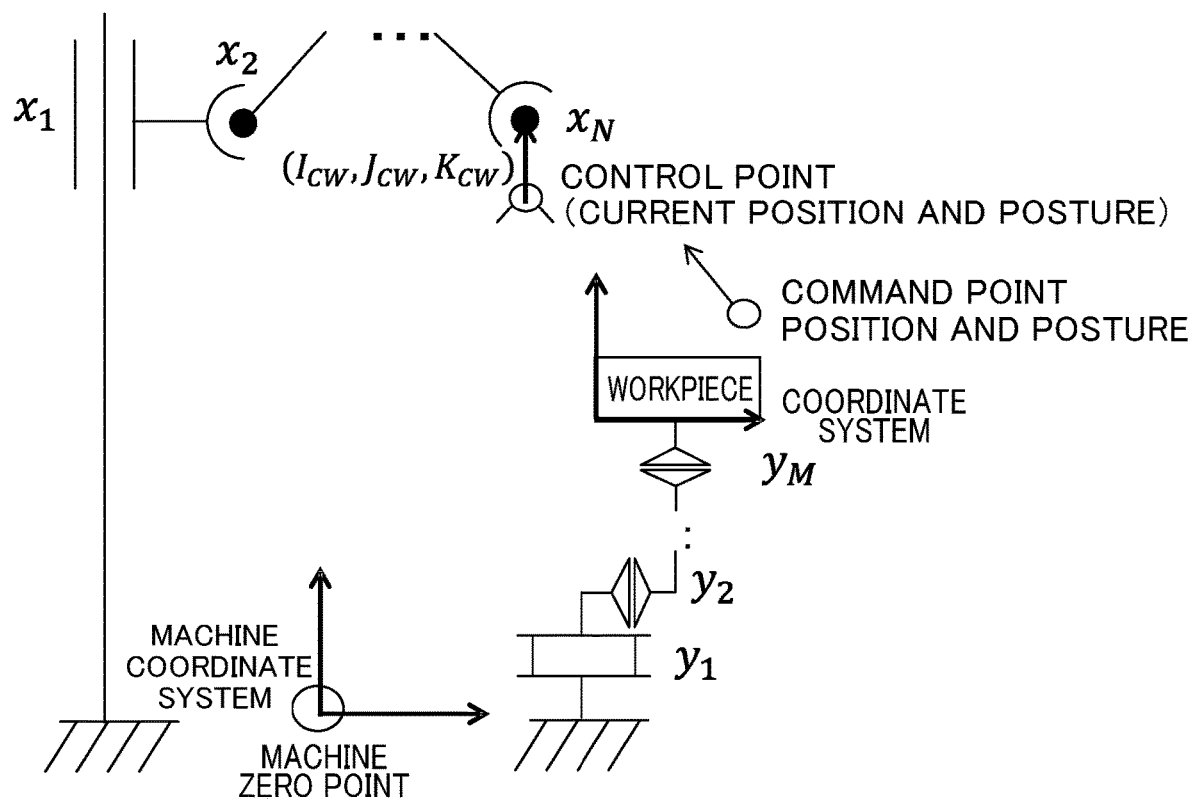
FIG. 39 is an explanation diagram of the calculation method of next interpolation position and next interpolation posture in the embodiment of the present invention.

Accordingly, in FIG. 39, a control point current posture $(I_{CW}, J_{CW}, K_{CW})$ in the designated coordinate system is determined by the formula below.

$$(I_{CW}, J_{CW}, K_{CW}) = \quad \text{[Formula 20]}$$
$$\left\{ \prod_{i=0}^{M-1} S'(-y_{M-i}, d_{y_{M-i}}, v_{y_{M-i}}) \right\} (I_C, J_C, K_C)$$

Figure 40:
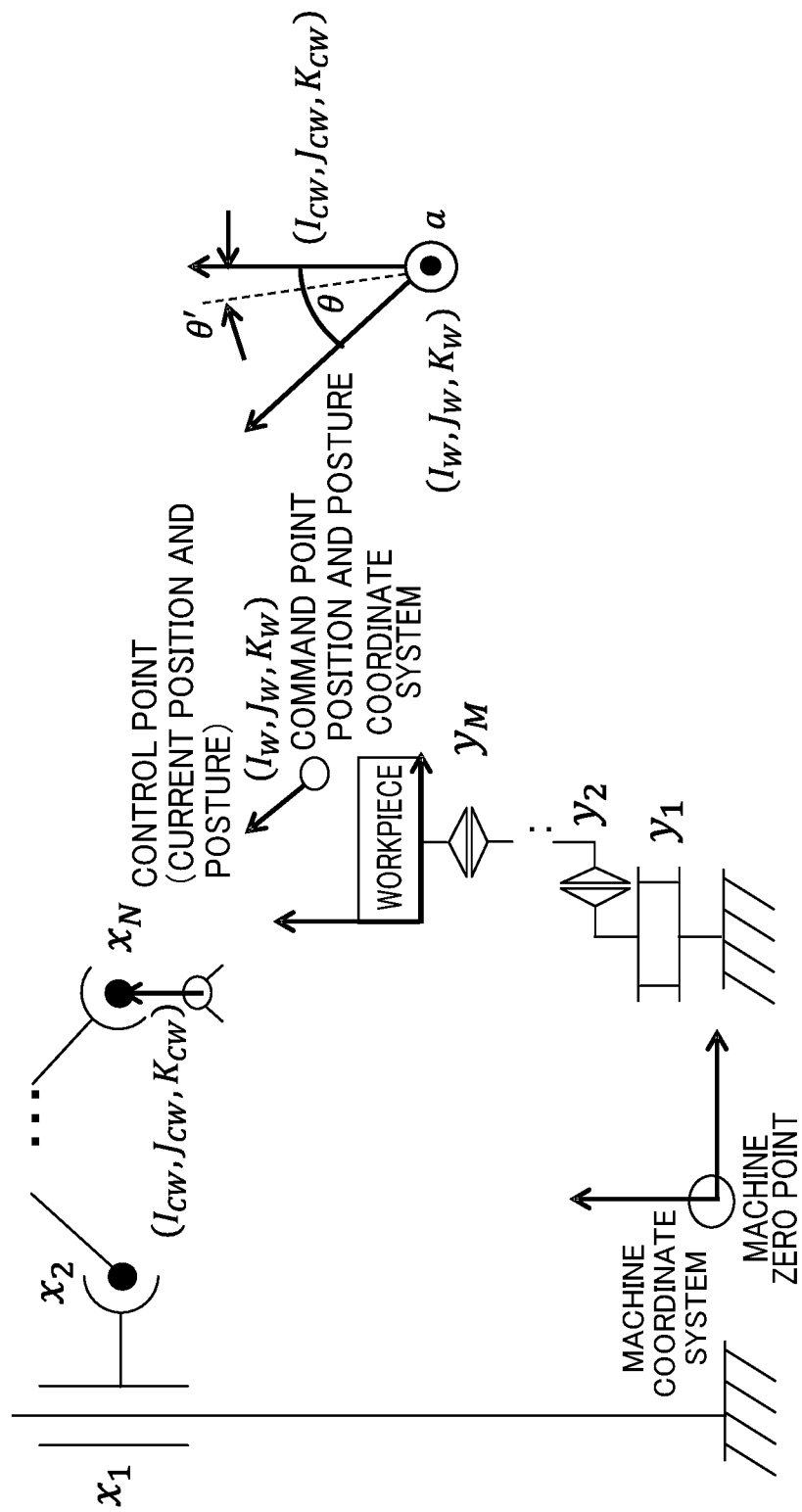
FIG. 40 is an explanation diagram of the calculation method of next interpolation position and next interpolation posture in the embodiment of the present invention.

Accordingly, in FIG. 40, next interpolation posture $(I_{W'}, J_{W'}, K_{W'})$ in the designated coordinate system is determined by the formula below.

$$\theta = \cos^{-1}(I_{CW}, J_{CW}, K_{CW}) \cdot (I_W, J_W, K_W) \quad \text{[Formula 21]}$$

$$a = \frac{(I_{CW}, J_{CW}, K_{CW}) \cdot (I_W, J_W, K_W)}{\|(I_{CW}, J_{CW}, K_{CW}) \cdot (I_W, J_W, K_W)\|}$$

$$\theta' = \frac{\|(X_W', Y_W', Z_W') - (X_{CW}, Y_{CW}, Z_{CW})\|}{\|(X_W, Y_W, Z_W) - (X_{CW}, Y_{CW}, Z_{CW})\|} \theta$$

$$(I_W', J_W', K_W') = S(\theta', \text{Rotation}, a)(I_{CW}, J_{CW}, K_{CW})$$

After the next interpolation position (XW', YW', ZW') and the interpolation posture (IW', JW', KW') are determined as above, a simultaneous equation is set as below for each of the control point position and the control point posture.

$$\left\{ \prod_{i=1}^{M-1} T(ofs_{y_i}) S(y_i', d_{y_i}, v_{y_i}) \right\} T(ofs_{coord})(X_W', Y_W', Z_W') = \quad \text{[Formula 22]}$$

$$\left\{ \prod_{i=1}^{N} T(ofs_{x_i}) S(x_i' d_{x_i}, v_{x_i}) \right\} ofs_{ctrl}$$

$$\left\{ \prod_{i=1}^{M} S'(y_i', d_{y_i}, v_{y_i})(I_W', J_W', K_W') = \right.$$

$$\left\{ \prod_{i=1}^{N} S'(x_i, d_{x_i}, v_{x_i}) \right\} v_{ctrl}$$

Next interpolation position of each axis is determined by solving the simultaneous equation for each $x_i'$, $y_i'$. At this time, when Gröbner basis of the simultaneous equation is determined on the basis of a dictional type order $x_1' > x_2' > \ldots > x_N' > y_1' > y_2' > \ldots > y_M'$, a single variable multidimensional equation for the lowest order $y_M'$ is determined. A solution of $y_M'$ is determined by solving this, and a solution of the simultaneous equation for each $x_i'$, $y_i'$ can be determined by sequentially solving formulae for other Gröbner basis by using the solution of $y_M'$. The Gröbner basis can be determined by Buchburger algorithm. However, other algorithms may be used.

[4.1.3 Application Example]

[4.1.3.1 Synchronous Control]

When nothing is particularly performed at step S87 and step S88 described above, that is, when the second command position movement matrix, the second command posture movement matrix, the position conversion matrix, and the posture conversion matrix are set to be unit matrixes, control (synchronous control) of rotating to follow, by maintaining a positional relationship with respect to the second coordinate system of the second control point is realized.

Figures 41A, 41B:
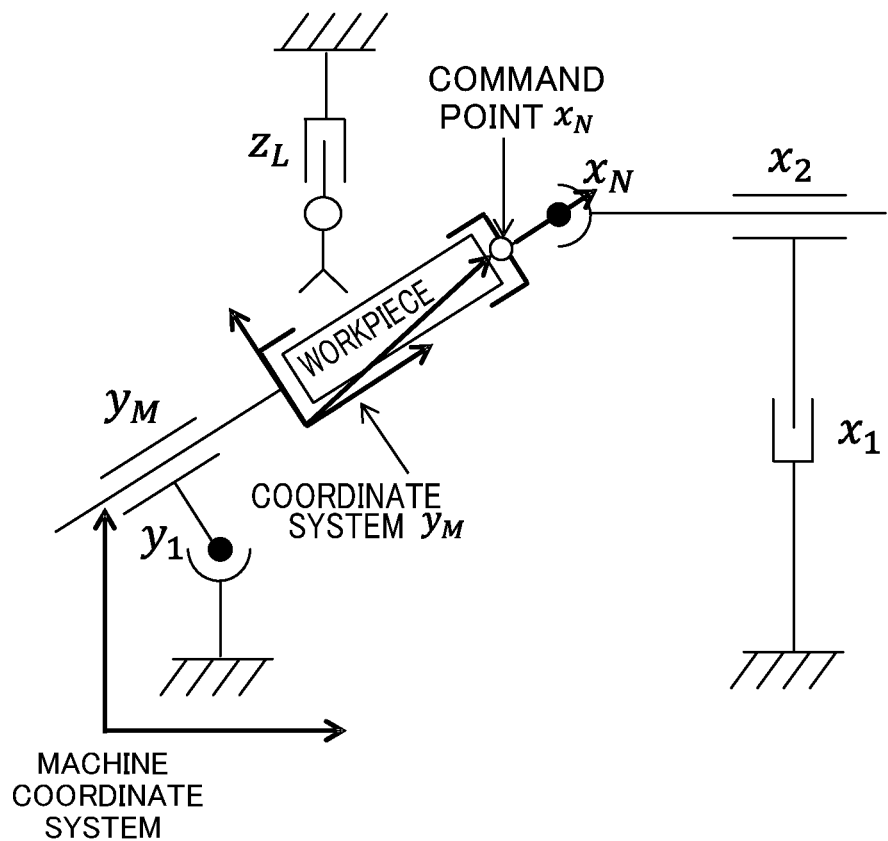
FIG. 41A is an explanation diagram of synchronous control as an application example of the embodiment of the present invention.
FIG. 41B is a command example of synchronous control as an application example of the embodiment of the present invention.

In the example of FIG. 41A, the coordinate system $y_M$ dynamically changes by the movement command or the like on the coordinate system $y_M$ with respect to the control point $Z_L$. However, the movement of the control point $x_N$ is controlled to rotate to follow the change of the coordinate system $y_M$. FIG. 41B shows a command example of a case of synchronous control.

[4.1.3.2 Superimposed Control]

When nothing is particularly performed at step S88 described above, that is, the position conversion matrix and the posture conversion matrix are set to be unit matrixes, control (superimposed control) is realized so that the second control point moves for the second command value on the second coordinate system.

Figures 42A, 42B:
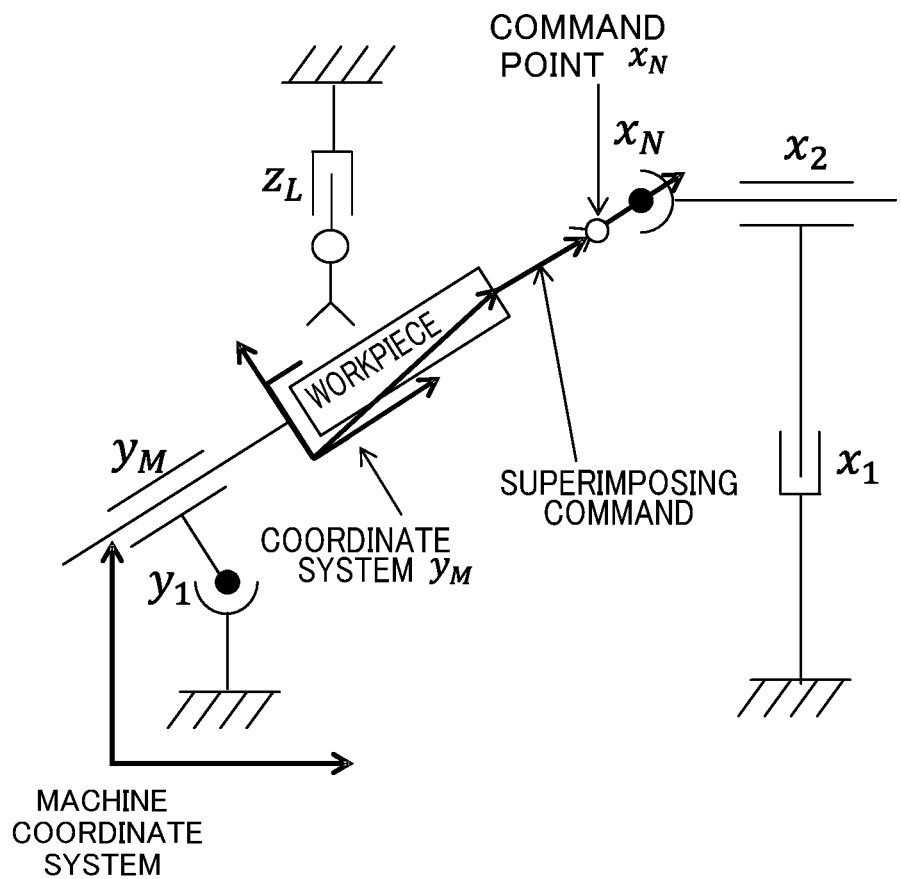
FIG. 42A is an explanation diagram of superimposed control as an application example of the embodiment of the present invention.
FIG. 42B is a command example of superimposed control as an application example of the embodiment of the present invention.

In an example of FIG. 42A, the coordinate system $y_M$ dynamically changes by the movement command or the like on the coordinate system $y_M$ with respect to the control point $Z_L$. However, the movement of the control point $x_N$ is controlled so as to circulate a path with which a superimposing command is issued by the second command value on the coordinate system $y_M$ that dynamically changes. FIG. 42B shows a command example of a case of the superimposed control.

[4.1.3.3 Balance Cut]

The command with respect to the first control point as it is, is set to be the command with respect to the second control point, and the position conversion matrix $M_M$ and the posture conversion matrix $M_P$ are set, for example, as below.

$$M_P = M_M = \begin{pmatrix} 1 & 0 & 0 & 0 \\ 0 & 1 & 0 & 0 \\ 0 & 0 & -1 & 0 \\ 0 & 0 & 0 & 1 \end{pmatrix} \quad \text{[Formula 23]}$$

Figures 43A, 43B:
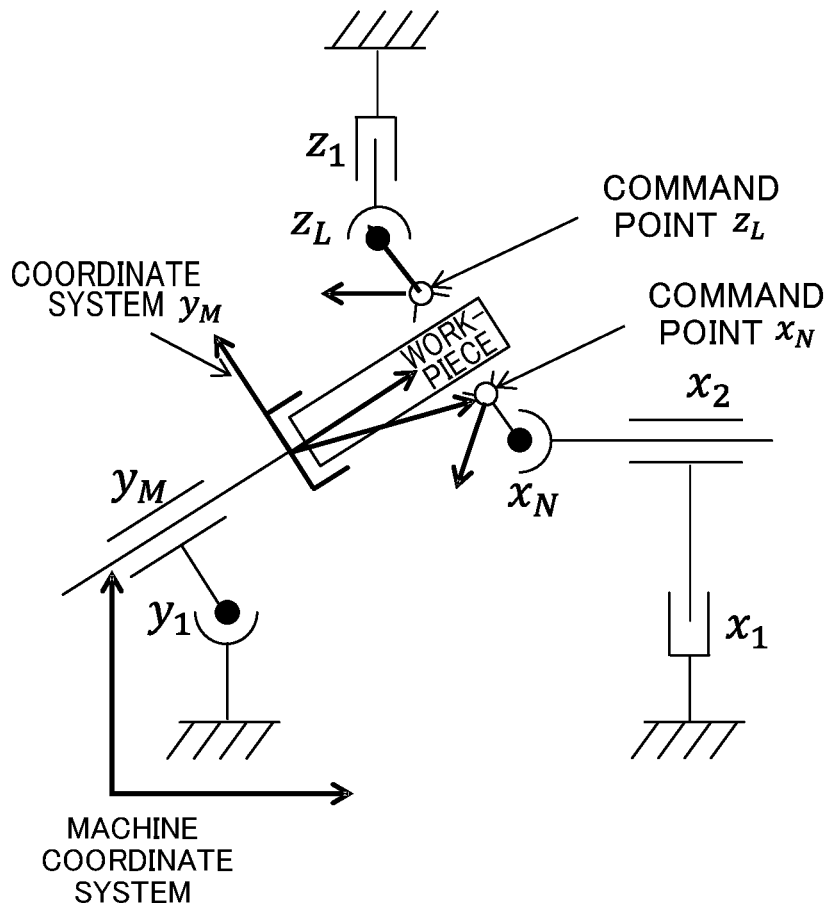
FIG. 43A is an explanation diagram of balance cut as an application example of the embodiment of the present invention.
FIG. 43B is a command example of the balance cut as an application example of the embodiment of the present invention.

In this case, the second control point moves plane symmetrically with respect to the first control point, and both-surface machining (balance cut) of the workpiece is realized. In an example of FIG. 43A, the coordinate system $y_M$ dynamically changes by the movement command and the like on the coordinate system $y_M$ with respect to the control point $Z_L$. However, the movement of the control point $x_N$ is controlled so as to circulate a path that is plane symmetry with the control point $Z_L$ on the coordinate system $y_M$ that dynamically changes. FIG. 43B shows a command example of a case of balance cut.

[4.1.3.4 Simultaneous Multi-Face 5-Axes Machining (9-Axes Impeller Machining)]

The command to the first control point is set to be the command to the second control point, and the position conversion matrix $M_M$ and the posture conversion matrix $M_P$ are set, for example, as below.

$$M_P = M_M = \begin{pmatrix} -1 & 0 & 0 & 0 \\ 0 & -1 & 0 & 0 \\ 0 & 0 & 1 & 0 \\ 0 & 0 & 0 & 1 \end{pmatrix} \quad \text{[Formula 24]}$$

Figures 44A, 44B:
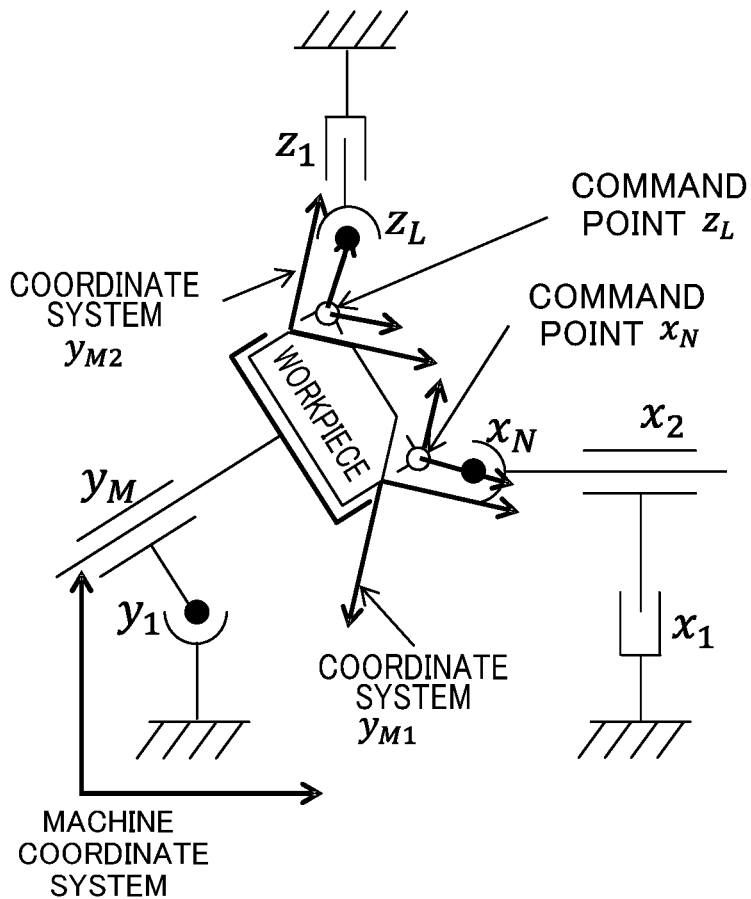
FIG. 44A is an explanation diagram of simultaneous multi-surface 5-axes machining as an application example of the embodiment of the present invention.
FIG. 44B is a command example of the simultaneous multi-surface 5-axes machining as an application example of the embodiment of the present invention.

In this case, the second control point moves axis symmetrically with the first control point, and simultaneous multi-face 5-axes machining is performed. In an example of FIG. 44A, the coordinate system $y_{M1}$ dynamically changes by the movement command and the like on the coordinate system $y_{M2}$ with respect to the control point $Z_L$. However, the movement of the control point $x_N$ is controlled so as to circulate a path that is axis symmetrical with the control point $Z_L$ on the coordinate system $y_{M1}$ that dynamically changes. FIG. 44B shows a command example of a case of the simultaneous multi-face 5-axes machining (9-axes impeller machining).

[4.2 Control when Relationship Formula is Used]

[4.2.1 Operation Flow]

As described above, when the relationship formula is used, after step S41 is performed, and steps S51, S53, S54 of the chart α are performed, the chart F is performed at step S63 of the chart β, and the chart S is performed at step S73 of the chart γ.

At step S41, flexible synchronous control starts. More particularly, for example, command of control start is issued by a command such as "G99.1<equation001>. At this time, a relationship of flexible synchronous control defined by a name, equation001, is acquired. FIG. 45 is an example of the relationship formula of the flexible synchronous control defined by the name, equation001.

The relationship formula of the flexible synchronous control is composed of a coordinate value in a specific coordinate system of a specific control point, various control syntaxes, arithmetic operation, and the like. The flexible synchronous control is started by the command in above description. However, the flexible synchronous control may be started without a command, for example, by automatically starting a plurality of flexible synchronous control relationship formulae stored in a predetermined folder, at a time of power supply input.

Figure 46:
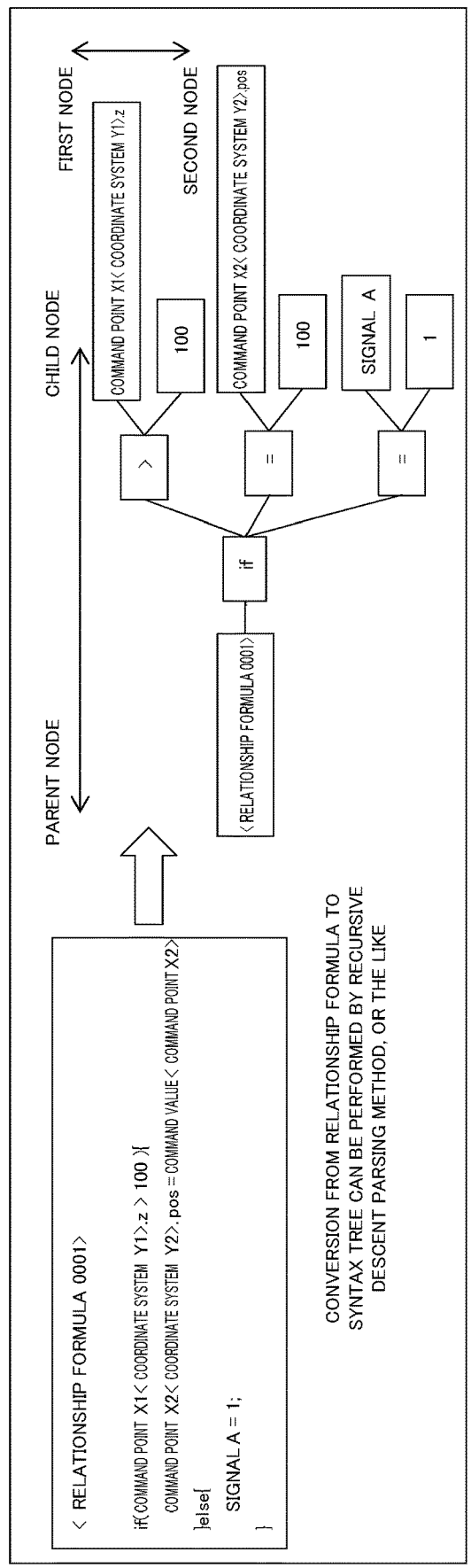
FIG. 46 is an example of a relationship formula and a syntax tree corresponding to the relationship formula in the embodiment of the present invention.

At step S54, the syntax analysis unit 122 creates a syntax tree from the relationship formula acquired at step S53. More particularly, as a syntax analysis method, a syntax tree can be acquired by a recursive descent parsing method, or the like. Other syntax analysis methods may be used. FIG. 46 is an example of a relationship formula and a syntax tree corresponding to the relationship formula.

The synchronous control according to the relationship formula can be realized by performing processing while recursively circulating by the chart F. A target of the synchronous control is not limited only to axis movement, and may include signal output, communication output, and the like.

Figure 47:
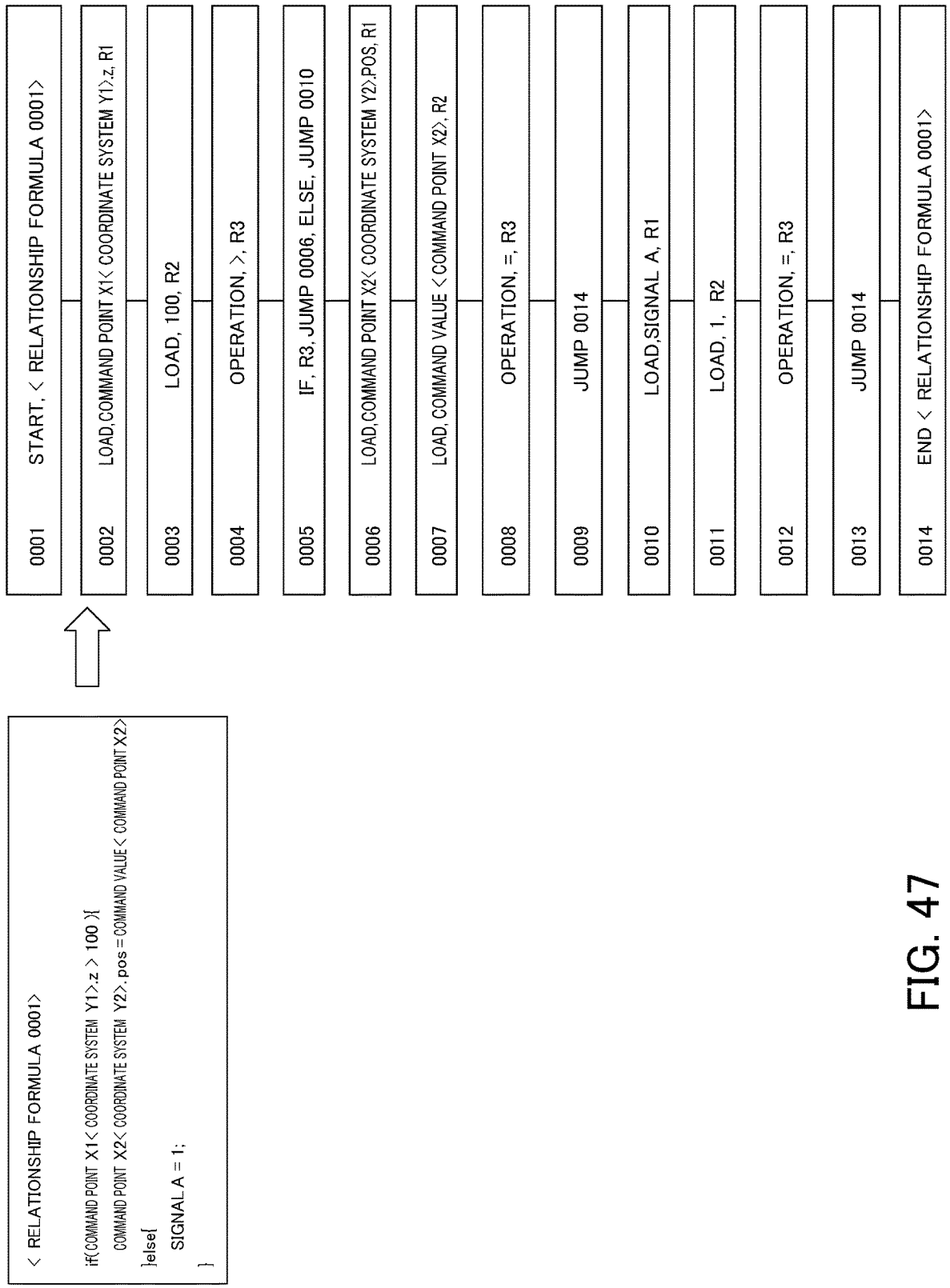
FIG. 47 is an example of the relationship formula and the syntax tree corresponding to the relationship formula in the embodiment of the present invention.

Otherwise, the syntax analysis unit 122 may generate a syntax list in which analysis results are arranged in an order of processing. FIG. 47 is an example of the relationship formula, and the syntax list corresponding to the relationship formula. In this syntax list, for example, a line of 0004 indicates that comparison between values of registers R1, R2 is performed, and a comparison result is stored in a register R3. A line of 0005 indicates that JUMP0006 is performed when the register R3 is positive, and JUMP0010 is performed when the register R3 is negative.

In this flowchart, in order to make explanation easy, an example is shown by using "=" and ">" as operators, "if" as a control syntax, a command value, a coordinate value, and the like as information. However, these are not limitation, practically. The relationship formula may include position information, other control syntaxes such as "switch", "for", and "while", arithmetic operation instructions such as four arithmetic operations and "sin/cos", inside state information of the numerical controller, input information such as feedback information from a signal, a sensor output, and connected equipment to the numerical controller, and output information from the numerical controller such as a command pulse to a motor, a signal output, and communication information. When the relationship formula includes these, these can be dealt with by defining behavior to these and similarly incorporating the definition to a flowchart.

Figure 48:
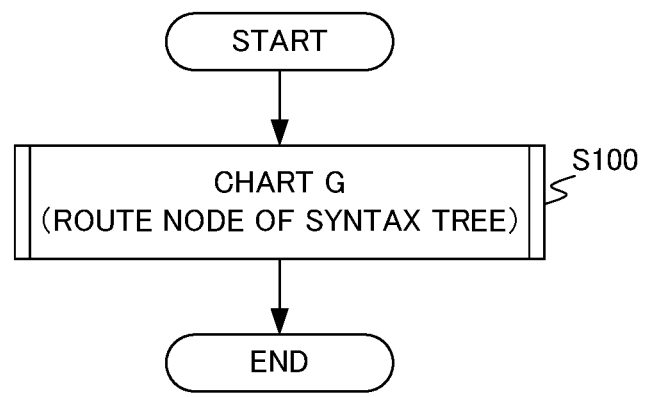
FIG. 48 is a flowchart showing a synchronous and superimposed control method in the embodiment of the present invention.

FIG. 48 indicates the flow of the chart F. At step S100, a chart G described later is performed to a route node of the syntax tree, and processing ends.

Figure 49:
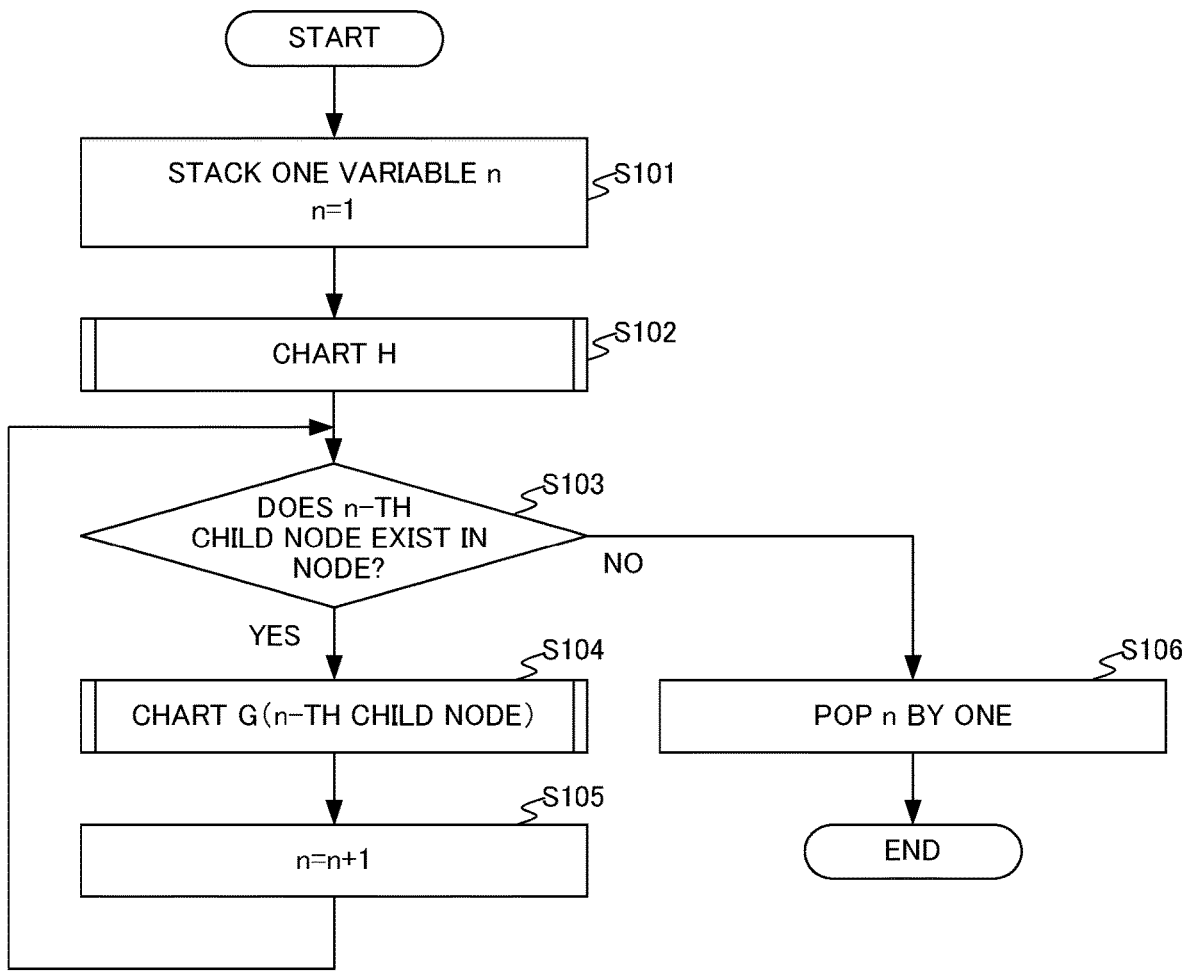
FIG. 49 is a flowchart showing the synchronous and superimposed control method in the embodiment of the present invention.

FIG. 49 shows a flow of the chart G. At step S101, the elements relationship output calculation unit 114 stacks one variable n and sets n to be n=1. At step S102, the elements relationship output calculation unit 114 performs a chart H described later, and processes each node.

At step S103, when n-th child node exists in the node that is the current processing target (S103: YES), the processing proceeds to step S104. When n-th child node does not exist (S103: NO), the processing proceeds to step S106.

At step S104, the elements relationship output calculation unit 114 performs recursively the chart G itself having the n-th child node as the processing target.

At step S105, the elements relationship output calculation unit 114 adds 1 to n. After that, the processing proceeds to step S103. At step S106, the elements relationship output calculation unit 114 pops n by 1, and processing ends.

Figure 50A:
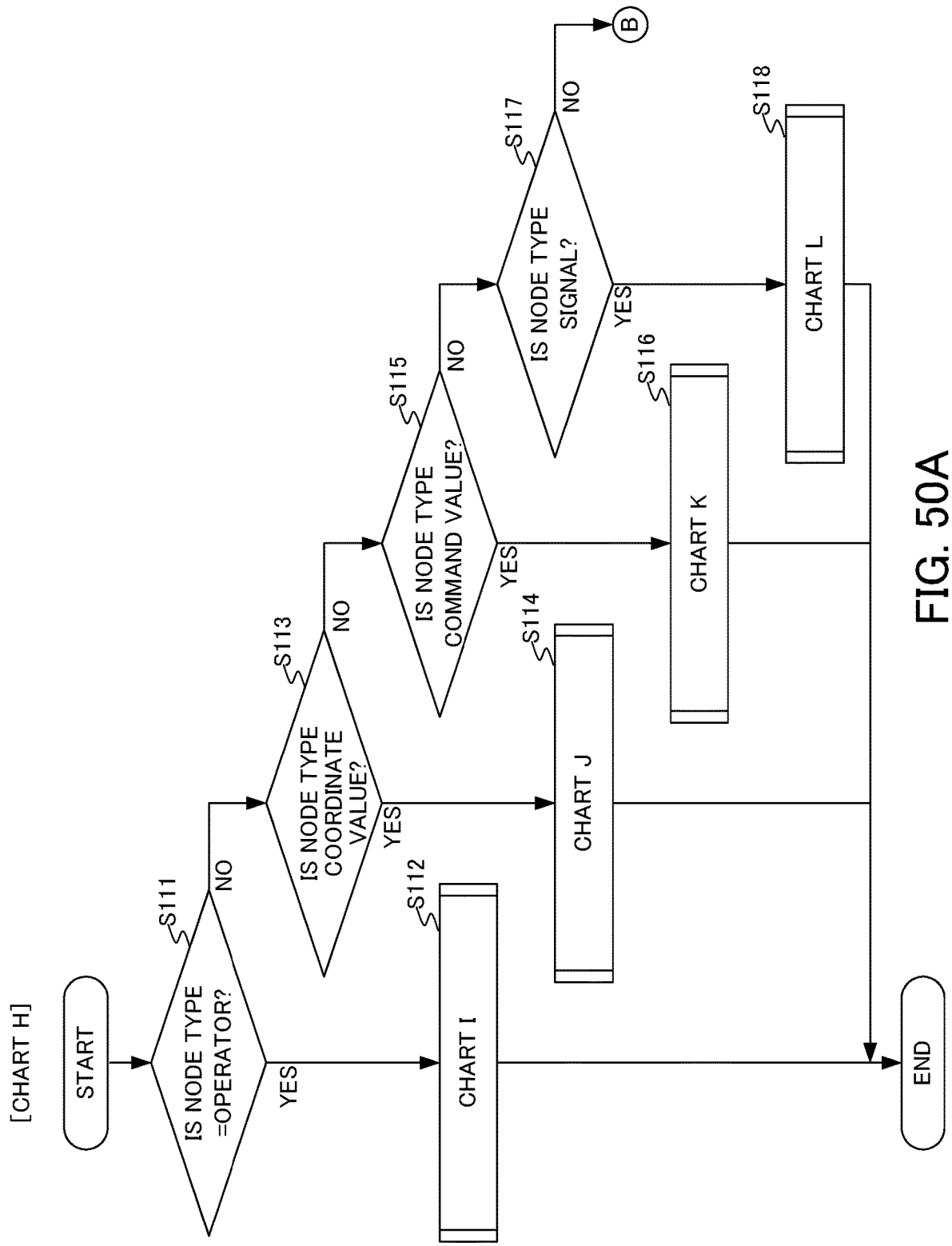
FIG. 50A is a flowchart showing the synchronous and superimposed control method in the embodiment of the present invention.
Figure 50B:
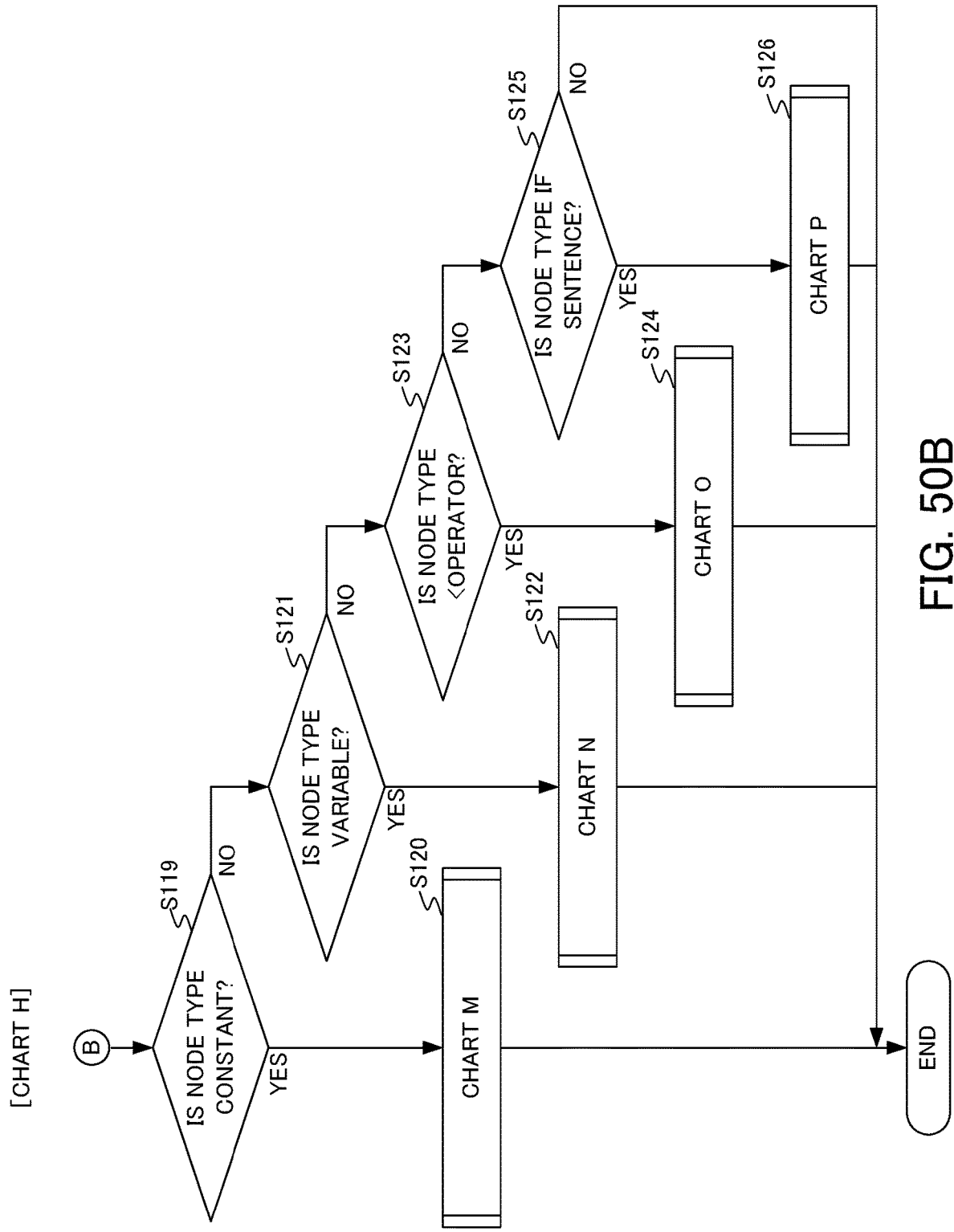
FIG. 50B is a flowchart showing the synchronous and superimposed control method in the embodiment of the present invention.

FIG. 50A and FIG. 50B show a flow of the chart H. At step S111, when the node type is an "=" operator (S111: YES), the processing proceeds to step S112. When the node type is not an "=" operator (S111: NO), the processing proceeds to step S113. At step S112, the elements relationship output calculation unit 114 performs a flow of a chart I described later.

At step S113, when the node type is a coordinate value on the coordinate system $Y_i$ of the control point $X_i$ (S113: YES), the processing proceeds to step S114. When the node type is not a coordinate value on the coordinate system $Y_i$ of the control point $X_i$ (S113: NO), the processing proceeds to step S115. At step S114, the elements relationship output calculation unit 114 performs a flow of a chart J described later.

At step S115, when the node type is a command value (S115: YES), the processing proceeds to step S116. When the node type is not a coordinate value (S115: NO), the processing proceeds to step S117. At step S116, the elements relationship output calculation unit 114 performs a flow of a chart K described later.

At step S117, when the node type is a signal (S117: YES), the processing proceeds to step S118. When the node type is not a signal (S117: NO), the processing proceeds to step S119. At step S118, the elements relationship output calculation unit 114 performs a flow of a chart L described later.

At step S119, when the node type is a constant (S119: YES), the processing proceeds to step S120. When the node type is not a constant (S119: NO), the processing proceeds to step S121. At step S120, the elements relationship output calculation unit 114 performs a flow of a chart M described later.

At step S121, when the node type is a variable (S121: YES), the processing proceeds to step S122. When the node type is not a variable (S121: NO), the processing proceeds to step S123. At step S122, the elements relationship output calculation unit 114 performs a flow of a chart N described later.

At step S123, when the node type is a "<" operator (S123: YES), the processing proceeds to step S124. When the node type is not a "<" operator (S123: NO), the processing proceeds to step S125. At step S124, the elements relationship output calculation unit 114 performs a flow of a chart O described later.

At step S125, when the node type is an "if" sentence (S125: YES), the processing proceeds to step S126. When the node type is not an "if" sentence (S125: NO), the processing ends. At step S126, the elements relationship output calculation unit 114 performs a flow of a chart P described later, and processing ends.

Figure 51:
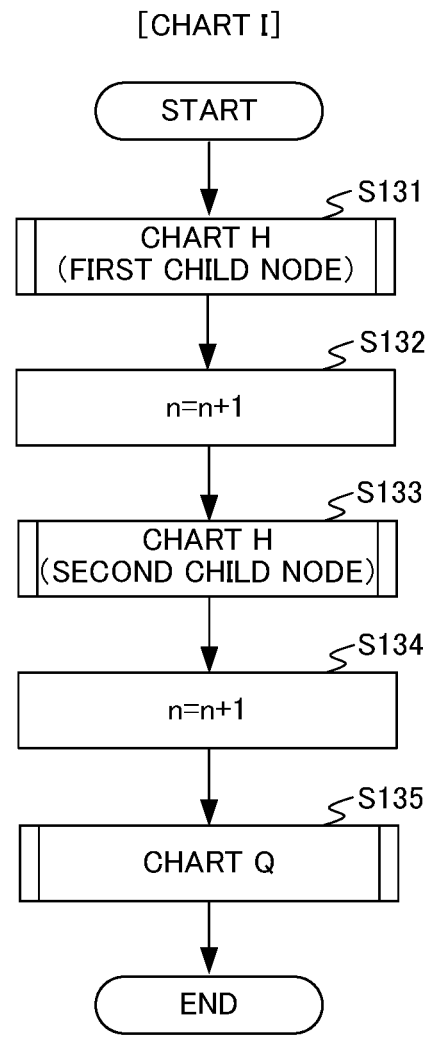
FIG. 51 is a flowchart showing the synchronous and superimposed control method in the embodiment of the present invention.

FIG. 51 shows a flow of the chart I. At step S131, the elements relationship output calculation unit 114 recursively performs the chart H for the first child node, and then, the processing proceeds to step S132. At step S132, the elements relationship output calculation unit 114 adds 1 to n, and the processing proceeds to step S133. At step S133, the elements relationship output calculation unit 114 recursively performs the chart H for the second child node, and then, the processing proceeds to step S134. At step S134, the elements relationship output calculation unit 114 adds 1 to n, and the processing proceeds to step S135. At step S135, the elements relationship output calculation unit 114 performs a chart Q described later, and the processing ends.

Figure 52:
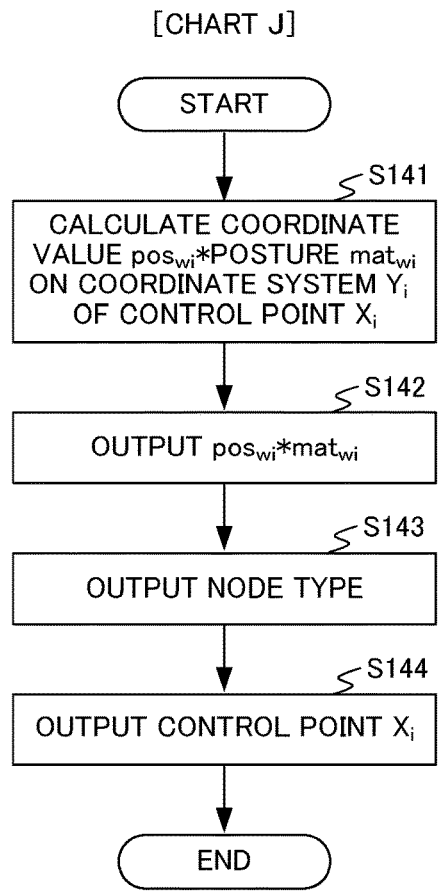
FIG. 52 is a flowchart showing the synchronous and superimposed control method in the embodiment of the present invention.

FIG. 52 shows a flow of the chart J. At step S141, the elements relationship output calculation unit 114 calculates a coordinate value $pos_{wi}$ and a posture $mat_{wi}$ on the coordinate system $Y_i$ of the control point $X_i$. At step S142, the elements relationship output calculation unit 114 outputs $pos_{wi}$ and $mat_{wi}$. At step S143, the elements relationship output calculation unit 114 outputs the node type. At step S144, the elements relationship output calculation unit 114 outputs the control point $X_i$, and the processing ends.

Figure 53:
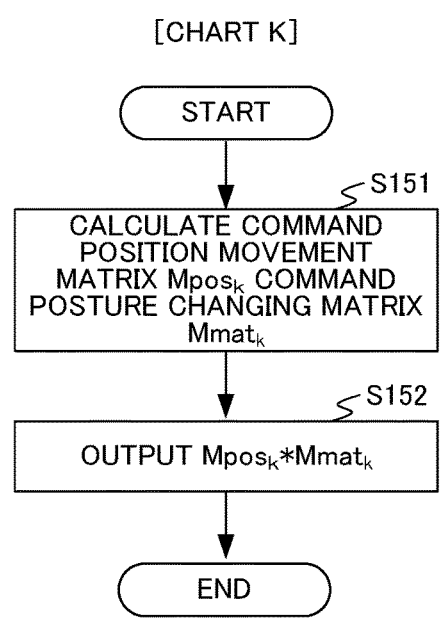
FIG. 53 is a flowchart showing the synchronous and superimposed control method in the embodiment of the present invention.

FIG. 53 shows a flow of the chart K. At step S151, the elements relationship output calculation unit 114 calculates a command position movement matrix $Mpos_k$ and a command posture changing matrix $Mmat_k$. At step S152, the elements relationship output calculation unit 114 outputs $Mpos_k$ and $Mmat_k$, and processing ends.

Figure 54:
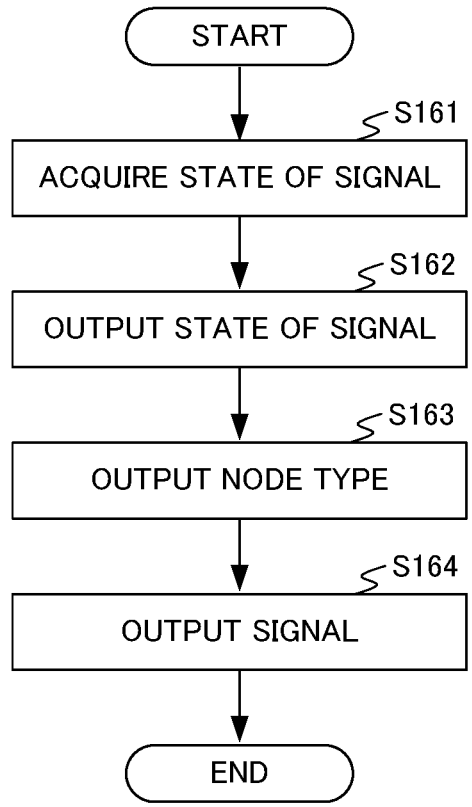
FIG. 54 is a flowchart showing the synchronous and superimposed control method in the embodiment of the present invention.

FIG. 54 shows a flow of the chart L. At step S161, the elements relationship output calculation unit 114 acquires a state of the signal. At step S162, the elements relationship output calculation unit 114 outputs the state of the signal. At step S163, the elements relationship output calculation unit 114 outputs the node type. At step S164, the elements relationship output calculation unit 114 outputs the signal, and processing ends.

Figure 55:
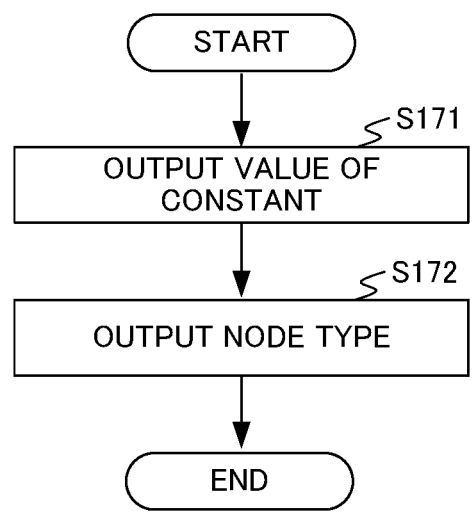
FIG. 55 is a flowchart showing the synchronous and superimposed control method in the embodiment of the present invention.

FIG. 55 shows a flow of the chart M. At step S171, the elements relationship output calculation unit 114 outputs a value of the constant. At step S172, the elements relationship output calculation unit 114 outputs the node type, and processing ends.

Figure 56:
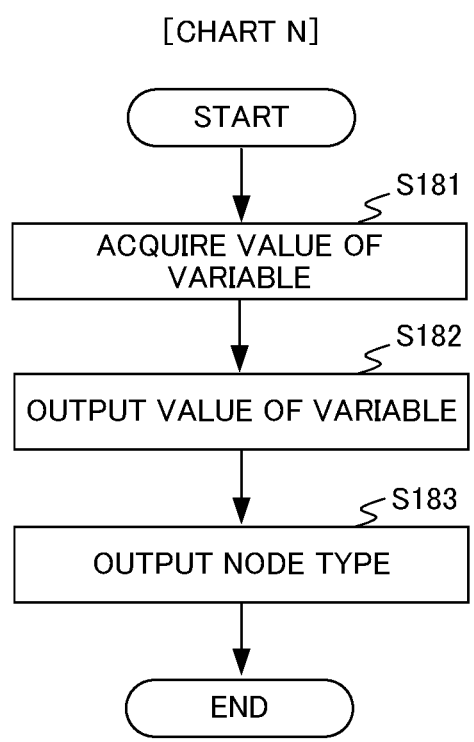
FIG. 56 is a flowchart showing the synchronous and superimposed control method in the embodiment of the present invention.

FIG. 56 shows a flow of the chart N. At step S181, the elements relationship output calculation unit 114 acquires a value of the variable. At step S182, the elements relationship output calculation unit 114 outputs the value of the variable. At step S183, the elements relationship output calculation unit 114 outputs the node type, and processing ends.

Figure 57:
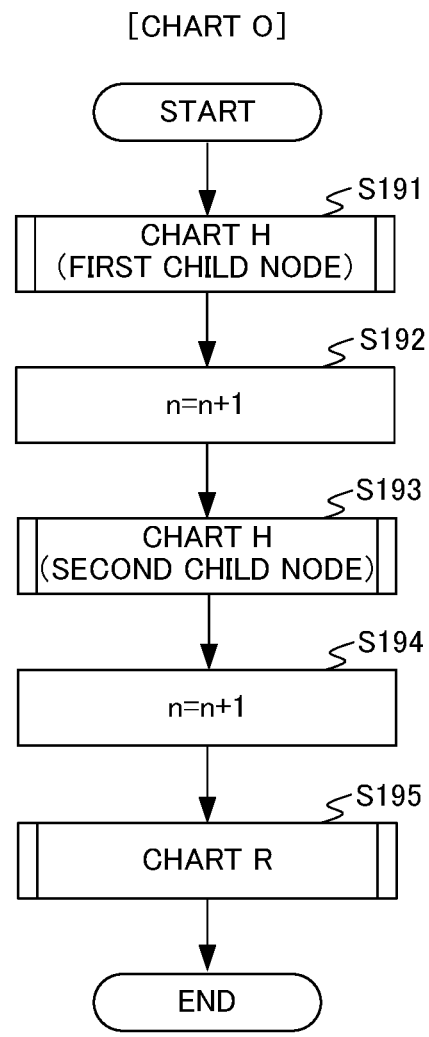
FIG. 57 is a flowchart showing the synchronous and superimposed control method in the embodiment of the present invention.

FIG. 57 shows a flow of the chart O. At step S191, the elements relationship output calculation unit 114 recursively performs the chart H for the first child node, and then, the processing proceeds to step S192. At step S192, the elements relationship output calculation unit 114 adds 1 to n, and the processing proceeds to step S193. At step S193, the elements relationship output calculation unit 114 recursively performs the chart H for the second child node, and then, the processing proceeds to step S194. At step S194, the elements relationship output calculation unit 114 adds 1 to n, and the processing proceeds to step S195. At step S195, the elements relationship output calculation unit 114 performs the chart R described later, and the processing ends.

Figure 58:
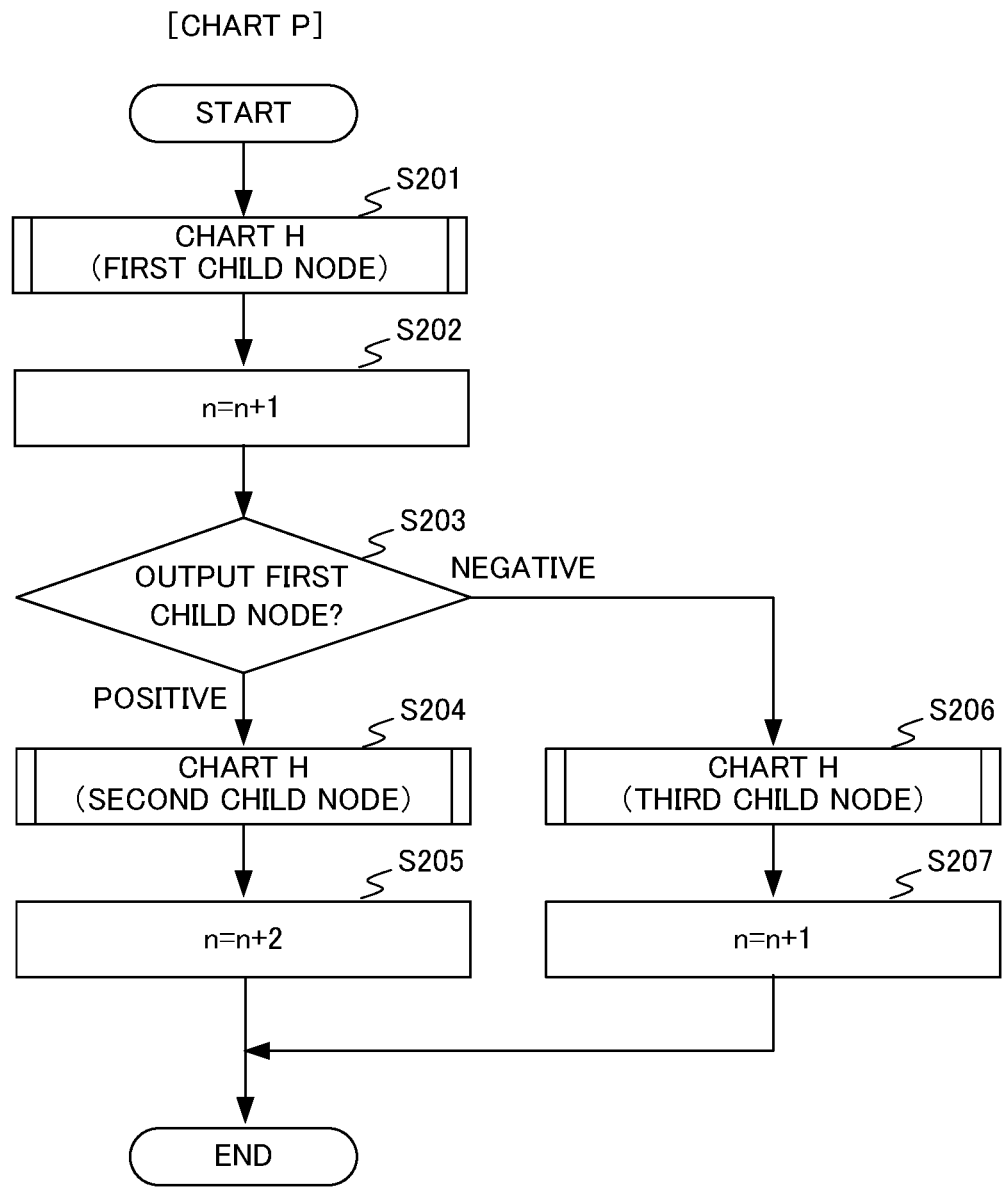
FIG. 58 is a flowchart showing the synchronous and superimposed control method in the embodiment of the present invention.

FIG. 58 shows a flow of the chart P. At step S201, the elements relationship output calculation unit 114 recursively performs the chart H for the first child node. At step S202, the elements relationship output calculation unit 114 adds 1 to n. At step S203, the processing proceeds to step S204 when an output of the first child node is "positive" (S203: "Positive"). When the output of the first child node is "negative" (S203: "Negative"), the processing proceeds to step S206. At step S204, the elements relationship output calculation unit 114 recursively performs the chart H for the second child node. At step S205, the elements relationship output calculation unit 114 adds 2 to n, and the processing ends. At step S206, the elements relationship output calculation unit 114 recursively performs the chart H for the third child node. At step S207, the elements relationship output calculation unit 114 adds 1 to n, and the processing ends.

Figure 59:
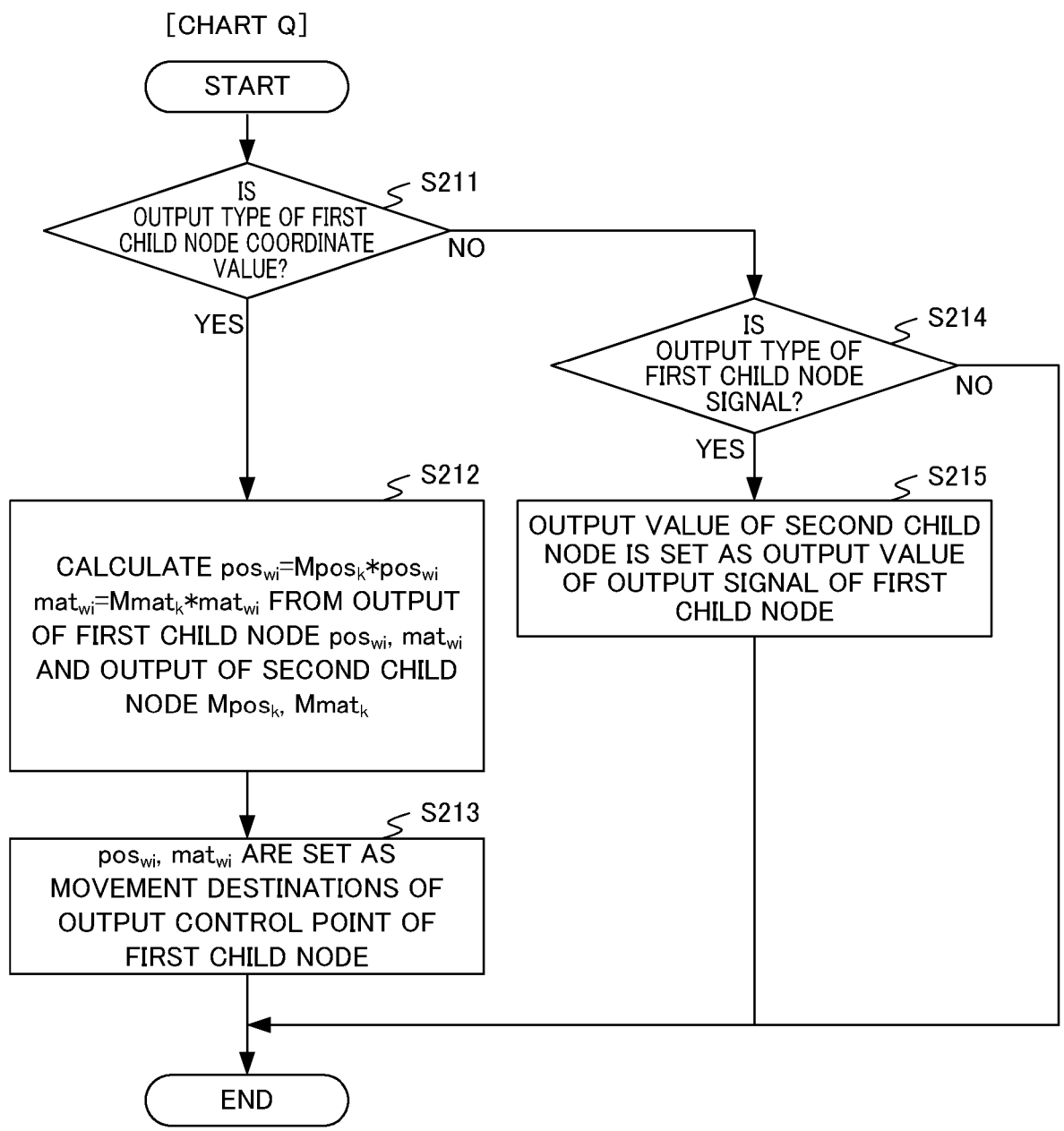
FIG. 59 is a flowchart showing the synchronous and superimposed control method in the embodiment of the present invention.

FIG. 59 shows a flow of the chart Q. At step S211, when the output type of the first child node is a coordinate value (S211: YES), the processing proceeds to step S212. When the output type of the first child node is not a coordinate value (S211: NO), the processing proceeds to step S214. At step S212, the elements relationship output calculation unit 114 calculates $$pos_{wi} = Mpos_k * pos_{wi}$$

$$mat_{wi} = Mmat_k * mat_{wi}$$

from outputs $pos_{wi}$, $mat_{wi}$ of the first child node, and outputs $Mpos_k$, $Mmat_k$ of the second child node. At step S213, the elements relationship output calculation unit 114 sets $pos_{wi}$ and $mat_{wi}$ as the movement destination of the output control point of the first child node, and the processing ends. At step S214, when the output type of the first child node is a signal (S214: YES), the processing proceeds to step S215. When the output type of the first child node is not a signal (S214: NO), the elements relationship output calculation unit 114 ends the processing. At step S215, the elements relationship output calculation unit 114 sets the output value of the second child node as an output value of an output signal of the first child node, and the processing ends.

Figure 60:
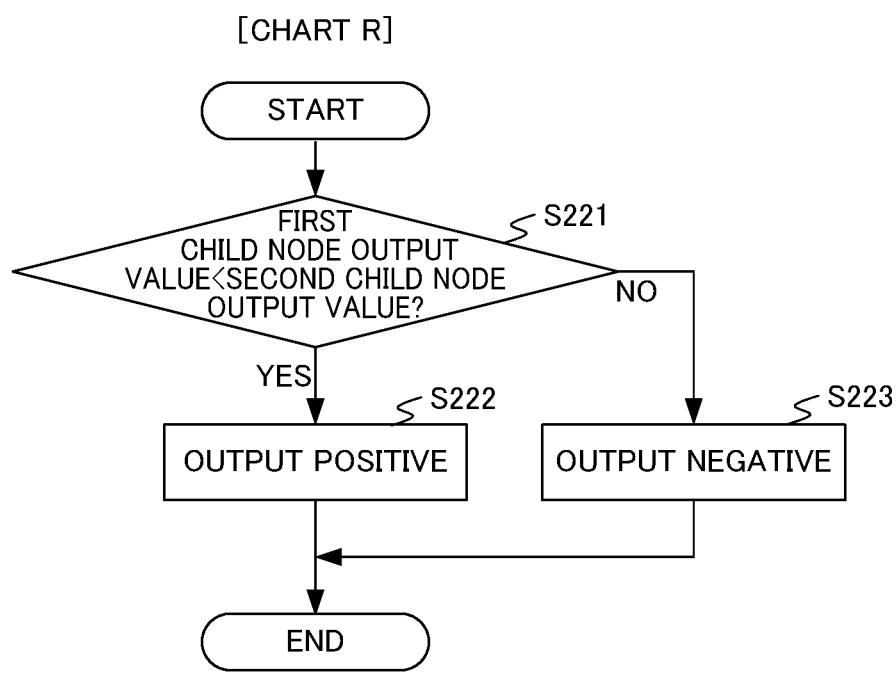
FIG. 60 is a flowchart showing the synchronous and superimposed control method in the embodiment of the present invention.

FIG. 60 shows a flow of the chart R. At step S221, when the output value of the first child node is below the output value of the second child node (S221: YES), the processing proceeds to step S222. When the output value of the first child node is the output value of the second child node or more (S221: NO), the processing proceeds to step S223. At step S222, the elements relationship output calculation unit 114 outputs "positive", and the processing ends. At step S223, the elements relationship output calculation unit 114 outputs "negative", and the processing ends.

Figure 61:
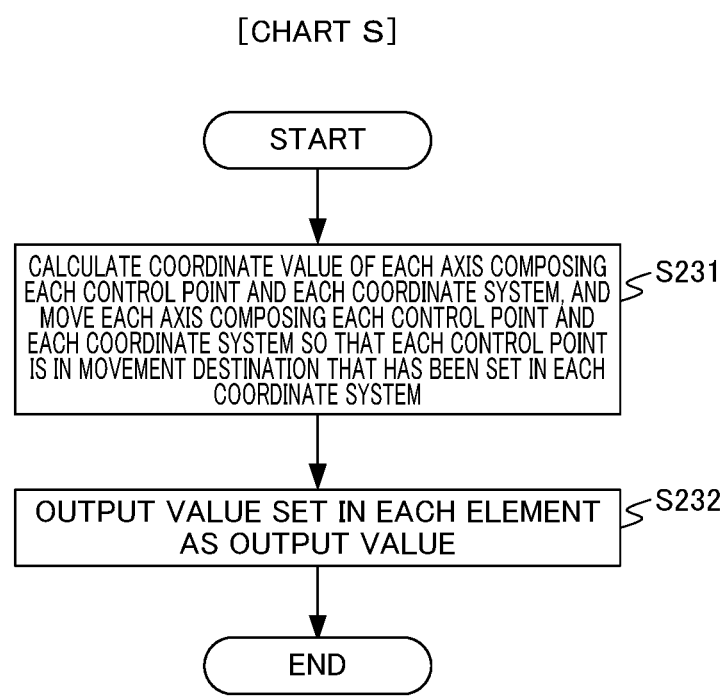
FIG. 61 is a flowchart showing the synchronous and superimposed control method in the embodiment of the present invention.

FIG. 61 shows a flow of the chart S. At step S231, as similar to steps S91 to S93 in the chart Y, the elements relationship control unit 115 calculates the coordinate value of each axis composing each control point and each coordinate system, and moves each axis in each control point and each coordinate system so that each control point is in a movement destination that has been set in each coordinate system.

At step S232, the elements relationship control unit 115 outputs a value set in each element, as an output value.

[4.2.2 Application Example]

4.2.2.1 Automatic Door Opening and Closing by Approaching of Robot

An application example when flexible synchronous control is started by defining a relationship formula of a coordinate value in the machine coordinate system of the control point $x_N$, and a coordinate value on the coordinate system $y_1$ of the control point $y_M$ will be described.

Figures 62A, 62B:
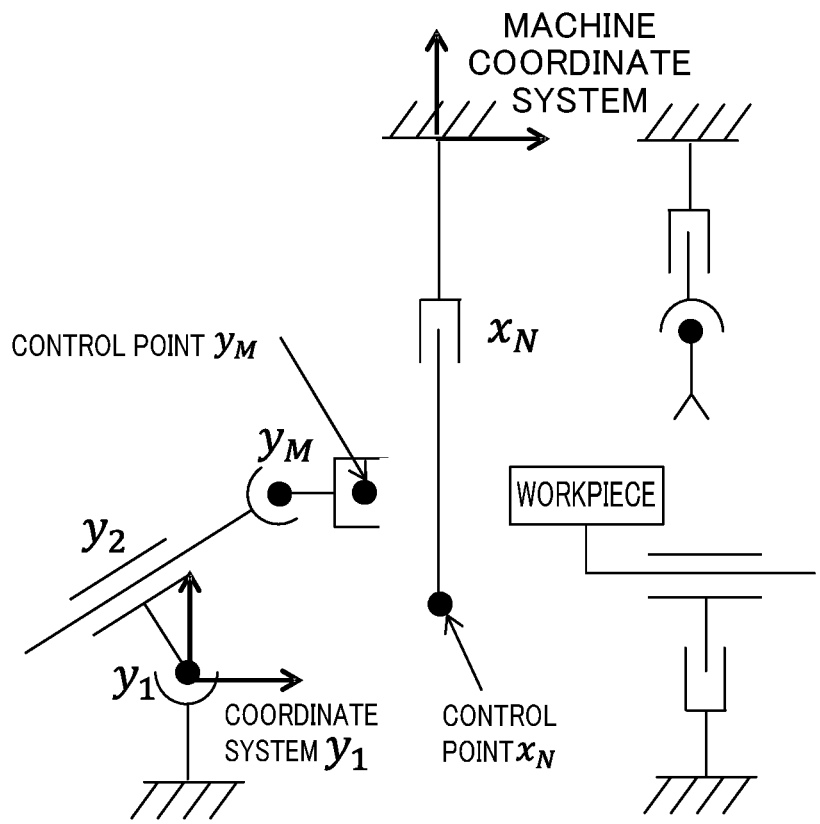
FIG. 62A is a diagram showing an application example of the synchronous and superimposed control method in the embodiment of the present invention.
FIG. 62B is a diagram showing an example of a relationship formula used in the synchronous and superimposed control method in the embodiment of the present invention.

As shown in FIG. 62A, it is assumed that a straight axis $X_N$ composing the control point $X_N$ of a door is installed. It is assumed that a straight axis $y_2$ is installed in a rotary axis $y_1$ composing the coordinate system $y_1$, and a rotary axis $y_M$ composing the control point $y_M$ that is a finger of a robot is installed in the straight axis $y_2$.

At this time, it is assumed that flexible synchronous control using the relationship formula shown in FIG. 62B is performed. Particularly, the relationship formula indicates that the x coordinate on the coordinate system $y_1$ of the control point $y_M$ exceeds 100 and less than 200, the z coordinate in the machine coordinate system of the control point $x_N$ is a value obtained by subtracting 200 from the x coordinate on the coordinate system $y_1$ of the control point $y_M$. When the x coordinate on the coordinate system $y_1$ of the control point $y_M$ is 200 or more, the z coordinate in the machine coordinate system of the control point $x_N$ is 0.

Thereby, for example, when the finger of the robot approaches to or moves away from the door, the door can be automatically opened or closed. Thus, it is not necessary to program opening and closing of the door. Thus, a burden of creating a program is reduced, and an error such as forgetting to issue a program command can be prevented. Thereby, convenience is improved.

[4.2.2.2 Automatic Coolant on/Off by Approaching of Workpiece]

An application example when flexible synchronous control is started by defining a relationship formula between a coordinate value in a coordinate system A of a control point B, and a signal A, will be described in detail with reference to FIG. 63A and FIG. 63B.

Figures 63A, 63B:
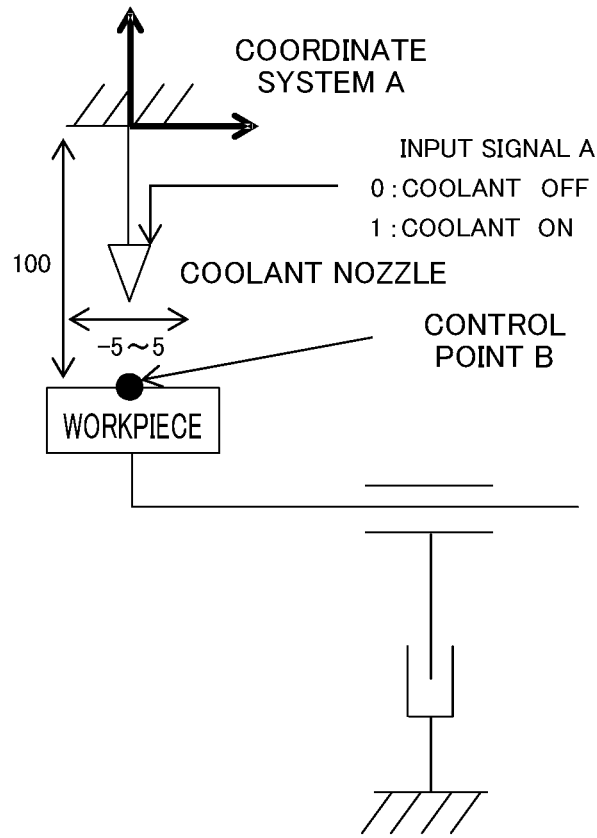
FIG. 63A is a diagram showing an application example of the synchronous and superimposed control method in the embodiment of the present invention.
FIG. 63B is a diagram showing an example of the relationship formula used in the synchronous and superimposed control method in the embodiment of the present invention.
Figure 64:
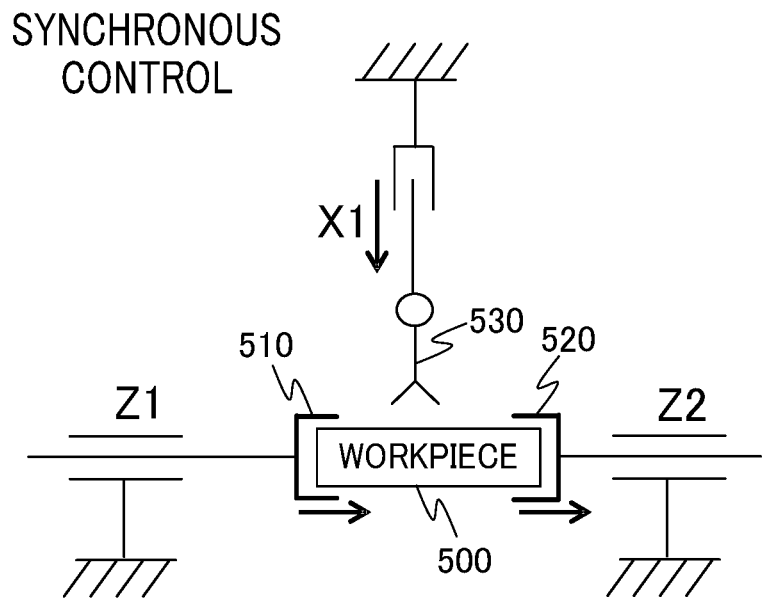
FIG. 64 is a diagram showing an example of a conventional synchronous control method.
Figure 65:
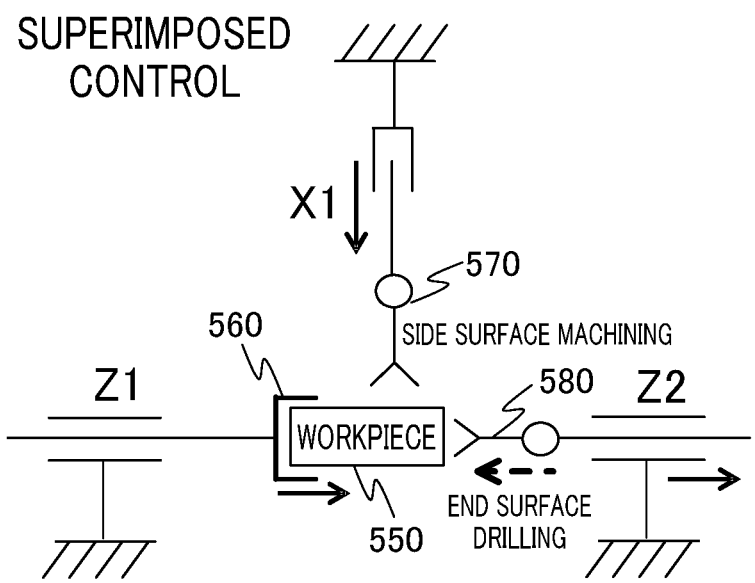
FIG. 65 is a diagram showing an example of a conventional superimposed control method.
Figure 66:
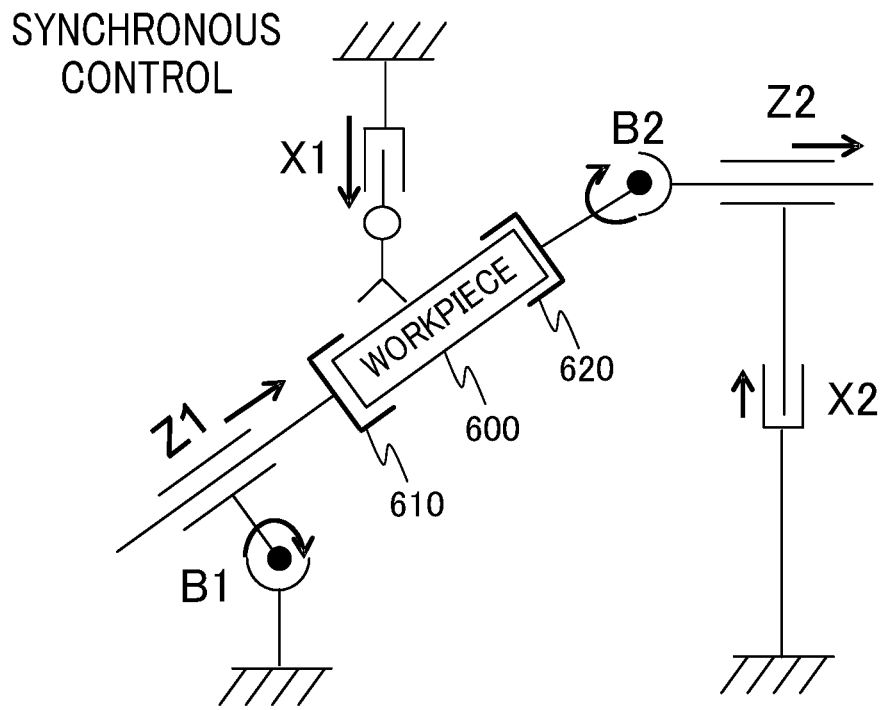
FIG. 66 is a diagram showing a complicated machine configuration example.
Figure 67:
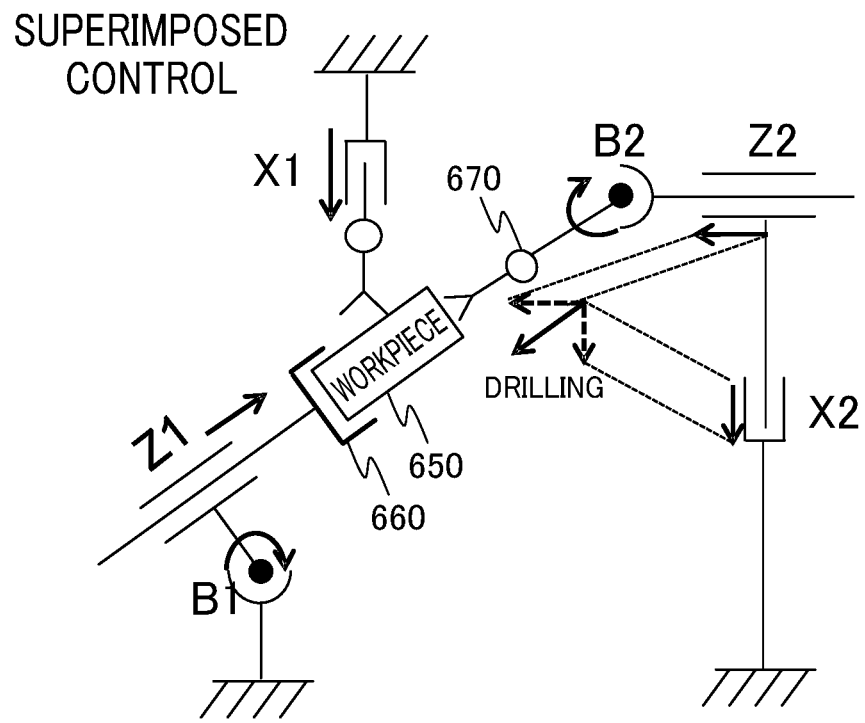
FIG. 67 is a diagram showing the complicated machine configuration example.

As shown in FIG. 63A, a coolant nozzle extends from a base in an upper portion. A coolant is turned off when an input signal to the coolant nozzle is A=0, and the coolant is turned on when the input signal is A=1. It is assumed that the first axis is set on a base in a lower portion, the second axis is further installed thereon, a workpiece is installed on the second axis, and the control point B is designated on the workpiece.

It is assumed that flexible synchronous control using a relationship formula shown in FIG. 63B is performed at this time. Particularly, the relationship formula indicates that the signal A=1 when the x coordinate on the coordinate system A of the control point B exceeds −5 and less than 5, and the z coordinate on the coordinate system A of the control point B exceeds −100, and the signal A=0 in other cases.

Thereby for example, the coolant can be automatically turned on/off when the workpiece approaches a certain range from the coolant nozzle. Thereby, a burden of creation of a program for coolant control is reduced, a physical sensor switch for detecting approaching to a certain range is not necessary, and control can be performed by only using a position sensor that has already included in a control target.

Thus, additional hardware is not required, and there is a merit in costs. In this way, convenience is improved.

[5. Effect of Embodiment]

Even in a complicated machine configuration, a desired object can be achieved by designating the coordinate system and the control point, and imparting the movement command value and the synchronous control command to the coordinate system and the control point, or defining a preferable relationship formula as needed. Thus, convenience is improved.

In the above description, for convenience of description, two sets of control point and coordinate system are described. However, synchronous control may be performed to three or more sets of control point and coordinate system.

The embodiment of the present invention is described above. However, the present invention is not limited to the embodiment described above. Effects described in the present embodiment are only listed of the most preferable effects generated from the present invention. The effects by the present invention is not limited to the effects described in the present embodiment.

A control method by the numerical controller 100 is realized by software. When the control method is realized by software, programs composing the software is installed in a computer (the numerical controller 100). These programs may be recorded in a removable media and distributed to a user, or may be downloaded to a computer of a user via a network to be distributed. These programs may be provided to a computer (the numerical controller 100) of a user as a Web service via a network, without being downloaded.

EXPLANATION OF REFERENCE NUMERALS

11 CPU (Control unit)
100 Numerical controller
111 Graph generation unit
112 Control point coordinate system insertion unit
113 Elements relationship setting unit
114 Elements relationship output calculation unit
115 Elements relationship control unit
121 Relationship formula acquisition unit
122 Syntax analysis unit
131 First control point movement destination generation unit
132 Second control point movement destination generation unit
133 Relationship circulation unit
134 Relationship output processing unit
141 First each axis movement destination generation unit
142 Second each axis movement destination generation unit
143 First movement performing unit
144 Second movement performing unit
145 Output operation unit
151 First current position calculation unit
152 First current posture calculation unit
153 First interpolation information generation unit
161 Second current position calculation unit
162 Second current posture calculation unit
163 Second interpolation information generation unit
171 First command position movement information conversion unit
172 First command posture changing information conversion unit
181 Second command position movement information conversion unit
182 Second command posture changing information conversion unit
191 Syntax list generation unit
192 Syntax tree generation unit
193 Syntax conversion unit
201 Control point information processing unit
202 Coordinate system information processing unit
203 Control point position information processing unit
204 Control syntax processing unit
205 Arithmetic operation processing unit
206 Constant processing unit
207 Variable processing unit
208 Type information processing unit
209 Control point command value processing unit
210 Inside information processing unit
211 Input information processing unit
212 Output information processing unit
221 Control point movement unit
222 Signal control unit
223 Variable control unit
224 Communication information control unit

What is claimed is:

1. A numerical controller comprising:
a memory; and
a processor, wherein the processor executes a program stored in the memory to perform operations comprising:
setting a relationship between a first element and a second element;
calculating a relationship output from the relationship between the first element and the second element;
performing relationship control on the basis of the relationship output; and
moving a first workpiece or tool associated with the first element and a second workpiece or tool associated with the second element based on the relationship control,
wherein machine configuration information is included in a tree-structure graph form, and a control point and a coordinate system are defined in all nodes of the tree-structure graph, and
wherein the first element and the second element are the control point or the coordinate system defined in the nodes of the tree-structure graph.

2. The numerical controller according to claim 1, wherein:
on setting the relationship, the processor performs:
setting a first control point as the first element, and
setting a second control point as the second element,
on calculating the relationship, the processor performs:
generating a first movement destination on a first coordinate system of the first control point,
generating a second movement destination on a second coordinate system of the second control point, and
outputting the first movement destination and the second movement destination as a relationship output, and
on performing relationship control, the processor performs:
generating from the first movement destination a first each axis movement destination that is a movement destination of each axis composing the first control point and the first coordinate system,
generating from the second movement destination and the first each axis movement destination a second each axis movement destination that is a movement destination of each axis composing the second control point and the second coordinate system, moving each axis composing the first control point and the first coordinate system to the first each axis movement destination, and moving each axis composing the second control point and the second coordinate system to the second each axis movement destination.

3. The numerical controller according to claim 2, wherein:
on generating the first movement destination, the processor performs:
calculating a first current position on the first coordinate system of the first control point,
calculating a first current posture on the first coordinate system of the first control point,
generating from a first command value imparted on the first coordinate system with respect to the first control point, first command position movement information and first command posture changing information for every interpolation period, and
calculating the first movement destination from the first current position, the first current posture, the first command position movement information, and the first command posture changing information, and
on generating the second movement destination, the processor performs:
calculating a second current position on the second coordinate system of the second control point,
calculating a second current posture on the second coordinate system of the second control point, and
calculating the second movement destination from the second current position and the second current posture.

4. The numerical controller according to claim 2, wherein:
on generating a first movement destination, the processor performs:
calculating a first current position on the first coordinate system of the first control point,
calculating a first current posture on the first coordinate system of the first control point,
generating from a first command value imparted on the first coordinate system with respect to the first control point, first command position movement information and first command posture changing information for every interpolation period, and
calculating the first movement destination from the first current position, the first current posture, the first command position movement information, and the first command posture changing information, and
on generating the second movement destination, the processor performs:
calculating a second current position on the second coordinate system of the second control point,
calculating a second current posture on the second coordinate system of the second control point,
generating from a second command value imparted on the second coordinate system with respect to the second control point, second command position movement information and second command posture changing information for every interpolation period, and
calculating the second movement destination from the second current position, the second current posture, the second command position movement information, and the second command posture changing information.

5. The numerical controller according to claim 3, wherein, on generating from the first command value, the processor performs:

converting the first command position movement information by position conversion information, and
converting the first command posture changing information by posture conversion information.

6. The numerical controller according to claim 4, wherein, on generating from the second command value, the processor performs:
converting the second command position movement information by position conversion information, and
converting the second command posture changing information by posture conversion information.

7. The numerical controller according to claim 4, wherein the first command value is set to be the second command value.

8. The numerical controller according to claim 2, wherein the first coordinate system and the second coordinate system are the same.

9. The numerical controller according to claim 1, wherein:
on setting the relationship, the processor performs:
acquiring a relationship formula,
analyzing the relationship formula, and
setting an analysis result of the syntax analysis unit to be a relationship between the first element and the second element,
on calculating the relationship, the processor performs:
circulating in each relationship formula element of the relationship between the first element and the second element, and
on circulating in each relationship formula element of the relationship, the processor performs:
relationship output processing in accordance with a type of the each relationship formula element that the relationship circulation unit has reached.

10. The numerical controller according to claim 9, wherein the relationship formula comprises
as the relationship formula element, at least any one of information of a first control point as the first element, information of a first coordinate system as the first element, information of a second control point as the second element, information of a second coordinate system as the second element,
first position relationship information on the first coordinate system of the first control point,
second position relationship information on the second coordinate system of the second control point,
a control syntax,
an arithmetic operation instruction,
a constant,
a variable,
type information of the variable, and
command value information with respect to a control point,
information representing an inside state of the numerical controller,
input information to the numerical controller, and
output information from the numerical controller.

11. The numerical controller according to claim 9, wherein, on analyzing the relationship formula, the processor performs:
generating a syntax tree as an analysis result, and
recursively circulating in each relationship formula element of the syntax tree.

12. The numerical controller according to claim 11, wherein, on analyzing the relationship formula, the processor performs:
generating a syntax list,
converting the syntax list to a syntax tree, and
setting the syntax tree to be an analysis result.

13. The numerical controller according to claim 9, wherein:
  on analyzing the relationship formula, the processor performs:
    generating a syntax list as an analysis result, and
  on circulating in each relationship formula element of the relationship, the processor performs:
    sequentially circulating each relationship formula element of the syntax list.

14. The numerical controller according to claim 13, wherein, on analyzing the relationship formula, the processor performs:
  generating a syntax tree,
  converting the syntax tree to a syntax list, and
  setting the syntax list to be an analysis result.

15. The numerical controller according to claim 9, wherein, on circulating in each relationship formula element of the relationship, the processor performs:
  processing control point information,
  processing coordinate system information,
  processing position information of a control point,
  processing a control syntax,
  processing an arithmetic operation instruction,
  processing a constant,
  processing a variable,
  processing type information of the variable,
  processing a command value with respect to a control point,
  processing inside information of the numerical controller,
  processing input information to the numerical controller, and
  processing output information from the numerical controller.

16. The numerical controller according to claim 1, wherein, on performing relationship control, the processor performs:
  operating output information of the numerical controller on the basis of the relationship output calculated by the elements relationship output calculation unit.

17. The numerical controller according to claim 16, wherein:
  the relationship output comprises an axis movement output, and
  on operating output information, the processor performs:
    calculating a coordinate value of each axis composing the each control point and the each coordinate system, and
    moving the each axis so that each control point is in a movement destination that has been set in each coordinate system on the basis of the axis movement output.

18. The numerical controller according to claim 16, wherein:
  the relationship output comprises a signal output, and
  on operating output information, processor performs:
    controlling so that an output value is a value in which each signal is set on the basis of the signal output.

19. The numerical controller according to claim 16, wherein:
  the relationship output comprises a variable output, and
  on operating output information, the processor performs:
    controlling so that an output value is a value in which each variable is set on the basis of the variable output.

20. The numerical controller according to claim 16, wherein:
  the relation output comprises a communication information output, and
  on operating output information, the processor performs:
    controlling so that an output value is a value in which each piece of communication information is set on the basis of the communication information output.

21. The numerical controller according to claim 1, wherein a first coordinate system as the first element, and a second coordinate system as the second element are defined in the same node.

* * * * *